(12) United States Patent
Lynn et al.

(10) Patent No.: US 12,269,603 B2
(45) Date of Patent: *Apr. 8, 2025

(54) VEHICLE CABIN THERMAL MANAGEMENT SYSTEM AND METHOD

(71) Applicant: Joby Aero, Inc., Santa Cruz, CA (US)

(72) Inventors: Robert Lynn, Santa Cruz, CA (US); Ernest Villanueva, Santa Cruz, CA (US); Nathaniel Martin, Santa Cruz, CA (US); JoeBen Bevirt, Santa Cruz, CA (US); Jonathan Wagner, Santa Cruz, CA (US); Kevin Witt, Santa Cruz, CA (US); Brian Uznanski, Santa Cruz, CA (US); Austin Newman, Santa Cruz, CA (US)

(73) Assignee: JOBY AERO, INC., Santa Cruz, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/240,829

(22) Filed: Aug. 31, 2023

(65) Prior Publication Data

US 2024/0059417 A1    Feb. 22, 2024

Related U.S. Application Data

(63) Continuation of application No. 17/547,995, filed on Dec. 10, 2021, now Pat. No. 11,794,905, which is a
(Continued)

(51) Int. Cl.
*B64D 13/08* (2006.01)
*B60L 1/00* (2006.01)
(Continued)

(52) U.S. Cl.
CPC ............. *B64D 13/08* (2013.01); *B60L 1/003* (2013.01); *B60L 1/08* (2013.01); *B60L 3/0046* (2013.01);
(Continued)

(58) Field of Classification Search
CPC ........ B64D 13/08; B64D 27/24; B64D 33/08; B64D 13/06; B64D 2013/0614;
(Continued)

(56) References Cited

U.S. PATENT DOCUMENTS

| 1,386,713 A | 8/1921 | Leinweber et al. |
| 1,496,723 A | 6/1924 | Miller |

(Continued)

FOREIGN PATENT DOCUMENTS

| CN | 102239321 A | 11/2011 |
| CN | 102245878 A | 11/2011 |

(Continued)

OTHER PUBLICATIONS

"Ailerons", NASA student page., 3 pages, Nov. 1, 2018, downloaded from: https://https://www.grc.nasa.gov/www/k-12/airplane/alr.html.

(Continued)

*Primary Examiner* — Donald J Wallace
*Assistant Examiner* — Jalal C Coduroglu
(74) *Attorney, Agent, or Firm* — Dority & Manning, P.A.

(57) ABSTRACT

The system can include an on-board thermal management subsystem. The system 100 can optionally include an off-board (extravehicular) infrastructure subsystem. The on-board thermal management subsystem can include: a battery pack, one or more fluid loops, and an air manifold. The system 100 can additionally or alternatively include any other suitable components.

19 Claims, 17 Drawing Sheets

Related U.S. Application Data continuation of application No. 17/033,549, filed on Sep. 25, 2020, now Pat. No. 11,230,384, which is a continuation-in-part of application No. 16/857,003, filed on Apr. 23, 2020, now Pat. No. 10,960,785.

(60) Provisional application No. 62/905,810, filed on Sep. 25, 2019, provisional application No. 62/837,504, filed on Apr. 23, 2019.

(51) Int. Cl.
| | | |
|---|---|---|
| *B60L 1/08* | (2006.01) | |
| *B60L 3/00* | (2019.01) | |
| *B60L 58/26* | (2019.01) | |
| *B60L 58/27* | (2019.01) | |
| *B64D 13/06* | (2006.01) | |
| *B64D 27/24* | (2024.01) | |
| *B64D 33/08* | (2006.01) | |
| *H01M 10/48* | (2006.01) | |
| *H01M 10/613* | (2014.01) | |
| *H01M 10/617* | (2014.01) | |
| *H01M 10/625* | (2014.01) | |
| *H01M 10/637* | (2014.01) | |
| *H01M 10/6555* | (2014.01) | |
| *H01M 10/658* | (2014.01) | |
| *H01M 10/663* | (2014.01) | |
| *H01M 50/249* | (2021.01) | |

(52) U.S. Cl.
CPC ............ *B60L 3/0092* (2013.01); *B60L 58/26* (2019.02); *B60L 58/27* (2019.02); *B64D 27/24* (2013.01); *B64D 33/08* (2013.01); *H01M 10/486* (2013.01); *H01M 10/613* (2015.04); *H01M 10/617* (2015.04); *H01M 10/625* (2015.04); *H01M 10/637* (2015.04); *H01M 10/6555* (2015.04); *H01M 10/658* (2015.04); *H01M 10/663* (2015.04); *H01M 50/249* (2021.01); *B60L 2200/10* (2013.01); *B60L 2240/34* (2013.01); *B60L 2240/545* (2013.01); *B60L 2240/662* (2013.01); *B64D 13/06* (2013.01); *B64D 2013/0614* (2013.01); *B64D 2013/0674* (2013.01); *B64D 2013/0688* (2013.01); *H01M 2220/20* (2013.01); *Y02E 60/10* (2013.01); *Y02T 10/70* (2013.01); *Y02T 50/50* (2013.01); *Y02T 50/60* (2013.01)

(58) Field of Classification Search
CPC .... B64D 2013/0674; B64D 2013/0688; B60L 1/003; B60L 1/08; B60L 3/0046; B60L 3/0092; B60L 58/26; B60L 58/27; B60L 2200/10; B60L 2240/34; B60L 2240/545; B60L 2240/662; B60L 1/02; H01M 10/486; H01M 10/613; H01M 10/617; H01M 10/625; H01M 10/637; H01M 10/6555; H01M 10/658; H01M 10/663; H01M 50/249; H01M 2220/20; Y02E 60/10; Y02T 10/70; Y02T 50/50; Y02T 50/60; Y02T 10/72; Y02T 90/16
See application file for complete search history.

(56) References Cited

U.S. PATENT DOCUMENTS

| | | | |
|---|---|---|---|
| 1,794,202 | A | 2/1931 | Pickard |
| D171,509 | S | 2/1954 | Lightbourn et al. |
| 2,868,476 | A | 1/1959 | Schlieben |
| 2,969,935 | A | 1/1961 | Price |
| 2,981,339 | A | 4/1961 | Kaplan |
| 3,002,712 | A | 10/1961 | Sterling |
| 3,035,789 | A | 5/1962 | Young |
| 3,059,876 | A | 10/1962 | Platt |
| 3,081,964 | A | 3/1963 | Quenzler |
| 3,082,977 | A | 3/1963 | Melvin |
| 3,089,666 | A | 5/1963 | Quenzler |
| 3,136,499 | A | 6/1964 | Kessler |
| 3,141,633 | A | 7/1964 | Mackay |
| 3,159,361 | A | 12/1964 | Weiland |
| 3,181,810 | A | 5/1965 | Olson |
| 3,231,221 | A | 1/1966 | Platt |
| 3,259,343 | A | 7/1966 | Roppel |
| 3,350,035 | A | 10/1967 | Schlieben |
| 3,360,217 | A | 12/1967 | Trotter |
| 3,404,852 | A | 10/1968 | Sambell et al. |
| 3,592,412 | A | 7/1971 | Glatfelter |
| 3,693,910 | A | 9/1972 | Aldi |
| 3,795,372 | A | 3/1974 | Feldman |
| 3,834,654 | A | 12/1974 | Miranda |
| 3,856,238 | A | 12/1974 | Malvestuto |
| 4,022,405 | A | 5/1977 | Peterson |
| 4,047,840 | A | 9/1977 | Ravenhall et al. |
| 4,053,125 | A | 10/1977 | Ratony |
| 4,146,199 | A | 3/1979 | Wenzel |
| 4,263,786 | A * | 4/1981 | Eng .............. B64D 13/06 62/89 |
| 4,356,546 | A | 10/1982 | Whiteside et al. |
| 4,387,866 | A | 6/1983 | Eickmann |
| 4,519,746 | A | 5/1985 | Wainauski et al. |
| 4,667,909 | A | 5/1987 | Curci |
| 4,742,760 | A * | 5/1988 | Horstman .......... B64D 13/00 454/76 |
| 4,784,351 | A | 11/1988 | Eickmann |
| 4,799,629 | A | 1/1989 | Mori |
| 4,914,657 | A | 4/1990 | Walter et al. |
| 4,925,131 | A | 5/1990 | Eickmann |
| 4,979,698 | A | 12/1990 | Ederman |
| 4,982,914 | A | 1/1991 | Eickmann |
| 5,001,646 | A | 3/1991 | Caldwell et al. |
| 5,031,858 | A | 7/1991 | Schellhase et al. |
| 5,082,079 | A | 1/1992 | Lissaman et al. |
| 5,085,315 | A | 2/1992 | Sambell |
| 5,141,176 | A | 8/1992 | Kress et al. |
| 5,156,363 | A | 10/1992 | Cizewski et al. |
| 5,174,721 | A | 12/1992 | Brocklehurst |
| 5,184,304 | A | 2/1993 | Huddle |
| 5,374,010 | A | 12/1994 | Stone et al. |
| 5,405,105 | A | 4/1995 | Kress |
| 5,419,514 | A | 5/1995 | Duncan |
| 5,472,156 | A | 12/1995 | Bivens et al. |
| 5,515,282 | A | 5/1996 | Jackson |
| 5,715,162 | A | 2/1998 | Daigle |
| 5,806,805 | A | 9/1998 | Elbert et al. |
| 5,823,468 | A | 10/1998 | Bothe |
| 5,839,691 | A | 11/1998 | Lariviere |
| 5,842,667 | A | 12/1998 | Jones |
| 5,868,351 | A | 2/1999 | Stamps et al. |
| 5,899,085 | A * | 5/1999 | Williams ............... B64D 13/06 62/236 |
| 6,098,923 | A | 8/2000 | Peters |
| 6,254,032 | B1 | 7/2001 | Bucher |
| 6,260,796 | B1 | 7/2001 | Klingensmith |
| 6,276,633 | B1 | 8/2001 | Balayn et al. |
| 6,286,783 | B1 | 9/2001 | Kuenkler |
| 6,293,491 | B1 | 9/2001 | Wobben |
| 6,343,127 | B1 | 1/2002 | Billoud |
| 6,402,088 | B1 | 6/2002 | Syrovy et al. |
| 6,460,810 | B2 | 10/2002 | James |
| 6,474,604 | B1 | 11/2002 | Carlow |
| 6,561,455 | B2 | 5/2003 | Capanna |
| 6,625,033 | B1 | 9/2003 | Steinman |
| 6,655,631 | B2 | 12/2003 | Austen-Brown |
| 6,719,244 | B1 | 4/2004 | Gress |
| 6,745,977 | B1 | 6/2004 | Long et al. |
| 6,883,748 | B2 | 4/2005 | Yoeli |
| 6,892,980 | B2 | 5/2005 | Kawai |
| 7,048,505 | B2 | 5/2006 | Segota et al. |
| 7,118,066 | B2 | 10/2006 | Allen |
| 7,147,182 | B1 | 12/2006 | Flanigan |

(56) References Cited

U.S. PATENT DOCUMENTS

| | | |
|---|---|---|
| 7,159,817 B2 | 1/2007 | Vandermey et al. |
| 7,219,013 B1 | 5/2007 | Young et al. |
| 7,263,630 B2 | 8/2007 | Sailer |
| 7,310,573 B2 | 12/2007 | Stickling |
| 7,318,565 B2 | 1/2008 | Page |
| 7,376,088 B2 | 5/2008 | Gambardella et al. |
| 7,802,754 B2 | 9/2010 | Karem |
| 7,822,516 B2 | 10/2010 | Yanaka et al. |
| 7,857,253 B2 | 12/2010 | Yoeli |
| 7,857,254 B2 | 12/2010 | Parks |
| 7,874,513 B1 | 1/2011 | Smith |
| 7,877,627 B1 | 1/2011 | Freydel |
| 7,950,606 B2 | 5/2011 | Atkey et al. |
| 8,016,226 B1 | 9/2011 | Wood |
| 8,016,566 B2 | 9/2011 | Agnihotri et al. |
| 8,020,804 B2 | 9/2011 | Yoeli |
| 8,056,866 B2 | 11/2011 | De |
| 8,152,096 B2 | 4/2012 | Smith |
| 8,275,494 B1 | 9/2012 | Roth |
| 8,311,686 B2 | 11/2012 | Herkes et al. |
| 8,376,264 B1 | 2/2013 | Hong et al. |
| 8,469,306 B2 | 6/2013 | Kuhn |
| 8,485,464 B2 | 7/2013 | Kroo |
| 8,527,233 B2 | 9/2013 | McIntyre |
| 8,602,347 B2 | 12/2013 | Isaac et al. |
| 8,708,273 B2 | 4/2014 | Oliver |
| 8,733,690 B2 | 5/2014 | Bevirt et al. |
| 8,737,634 B2 | 5/2014 | Brown et al. |
| 8,800,912 B2 | 8/2014 | Oliver |
| 8,849,479 B2 | 9/2014 | Walter |
| 8,998,125 B2 | 4/2015 | Hollimon et al. |
| 9,046,109 B2 | 6/2015 | Duke et al. |
| 9,075,144 B1 | 7/2015 | Straub et al. |
| 9,102,401 B2 | 8/2015 | Collins et al. |
| 9,128,109 B1 | 9/2015 | O'Neill |
| 9,205,930 B2 | 12/2015 | Yanagawa |
| 9,316,141 B2 | 4/2016 | Pilavdzic |
| 9,387,928 B1 | 7/2016 | Gentry et al. |
| 9,415,870 B1 | 8/2016 | Beckman et al. |
| 9,422,055 B1 | 8/2016 | Beckman et al. |
| 9,435,661 B2 | 9/2016 | Brenner et al. |
| 9,442,496 B1 | 9/2016 | Beckman et al. |
| 9,550,561 B1 | 1/2017 | Beckman et al. |
| 9,561,857 B2 | 2/2017 | Weber |
| 9,663,237 B2 | 5/2017 | Senkel et al. |
| 9,694,911 B2 | 7/2017 | Bevirt et al. |
| 9,771,157 B2 | 9/2017 | Gagne et al. |
| 9,786,961 B2 | 10/2017 | Dyer et al. |
| 9,802,702 B1 | 10/2017 | Beckman et al. |
| 9,816,529 B2 | 11/2017 | Grissom et al. |
| 9,838,436 B2 | 12/2017 | Michaels |
| 9,851,723 B2 | 12/2017 | Builta |
| 9,855,819 B2 | 1/2018 | Ochocinski et al. |
| 9,856,039 B1 | 1/2018 | Abrams et al. |
| 9,944,386 B1 | 4/2018 | Reichert et al. |
| 9,963,228 B2 | 5/2018 | Mccullough et al. |
| 10,029,808 B2 | 7/2018 | Blanding et al. |
| 10,046,855 B2 | 8/2018 | Bevirt et al. |
| 10,140,873 B2 | 11/2018 | Adler et al. |
| 10,144,503 B1 | 12/2018 | Vander Lind et al. |
| 10,144,504 B1 | 12/2018 | Selwa et al. |
| 10,152,894 B2 | 12/2018 | Adler et al. |
| 10,183,746 B2 | 1/2019 | Mccullough et al. |
| 10,208,676 B2 | 2/2019 | Johnson et al. |
| 10,216,190 B2 | 2/2019 | Bostick et al. |
| 10,237,792 B2 | 3/2019 | Sahlin et al. |
| 10,246,184 B2 | 4/2019 | Ragland |
| 10,247,100 B2 | 4/2019 | Leamy et al. |
| 10,249,200 B1 | 4/2019 | Grenier et al. |
| 10,287,011 B2 | 5/2019 | Wolff et al. |
| 10,304,344 B2 | 5/2019 | Moravek et al. |
| 10,330,482 B2 | 6/2019 | Chen et al. |
| 10,350,960 B1 | 7/2019 | Long |
| 10,364,036 B2 | 7/2019 | Tighe et al. |
| 10,392,107 B2 | 8/2019 | Har et al. |
| 10,407,164 B2 | 9/2019 | Blumer |
| 10,497,996 B1 | 12/2019 | Muniz et al. |
| 10,501,194 B2 | 12/2019 | Knapp et al. |
| 10,513,334 B2 | 12/2019 | Groninga et al. |
| 10,593,215 B2 | 3/2020 | Villa |
| 10,593,217 B2 | 3/2020 | Shannon |
| 10,752,365 B2 | 8/2020 | Galzin |
| 10,759,537 B2 | 9/2020 | Moore et al. |
| 10,768,201 B2 | 9/2020 | Luo et al. |
| 10,780,786 B2 | 9/2020 | Del Core |
| 10,832,581 B2 | 11/2020 | Westervelt et al. |
| 10,836,470 B2 | 11/2020 | Liu et al. |
| 10,913,528 B1 | 2/2021 | Moore et al. |
| 10,948,910 B2 | 3/2021 | Taveira et al. |
| 10,960,785 B2 | 3/2021 | Villanueva et al. |
| 11,130,566 B2 | 9/2021 | Mikic et al. |
| 11,145,211 B2 | 10/2021 | Goel et al. |
| 11,238,745 B2 | 2/2022 | Villa et al. |
| 11,295,622 B2 | 4/2022 | Goel et al. |
| 2002/0153452 A1 | 10/2002 | King et al. |
| 2003/0062443 A1 | 4/2003 | Wagner et al. |
| 2003/0038213 A1 | 5/2003 | Yoel |
| 2003/0080242 A1 | 5/2003 | Kawai |
| 2003/0085319 A1 | 5/2003 | Wagner et al. |
| 2003/0094537 A1 | 5/2003 | Austen-Brown et al. |
| 2003/0106959 A1 | 6/2003 | Fukuyama |
| 2004/0245376 A1 | 2/2004 | Muren |
| 2004/0093130 A1 | 5/2004 | Osder et al. |
| 2004/0126241 A1 | 7/2004 | Zha et al. |
| 2004/0141170 A1 | 7/2004 | Jamieson et al. |
| 2004/0195460 A1 | 10/2004 | Sailer |
| 2004/0261428 A1 | 12/2004 | Murry et al. |
| 2005/0178879 A1 | 8/2005 | Mao |
| 2005/0230524 A1 | 10/2005 | Ishiba |
| 2005/0251328 A1 | 11/2005 | Merwe et al. |
| 2006/0016930 A1 | 1/2006 | Pak |
| 2006/0097103 A1 | 5/2006 | Atmur |
| 2006/0113426 A1 | 6/2006 | Yoeli |
| 2006/0226281 A1 | 10/2006 | Walton |
| 2007/0154314 A1 | 7/2007 | Jarrah et al. |
| 2007/0221779 A1 | 9/2007 | Ikeda |
| 2008/0048065 A1 | 2/2008 | Kuntz |
| 2008/0205416 A1 | 8/2008 | Dechiara |
| 2008/0283673 A1 | 11/2008 | Yoeli |
| 2009/0008499 A1 | 1/2009 | Shaw |
| 2009/0084907 A1 | 4/2009 | Yoeli |
| 2009/0139781 A1* | 6/2009 | Straubel .................. B60L 53/14 |
| | | 701/22 |
| 2009/0140102 A1 | 6/2009 | Yoeli |
| 2009/0159757 A1 | 6/2009 | Yoeli |
| 2009/0200431 A1 | 8/2009 | Konings et al. |
| 2009/0224095 A1 | 9/2009 | Cox et al. |
| 2009/0283629 A1 | 11/2009 | Kroetsch et al. |
| 2010/0025006 A1 | 2/2010 | Zhou |
| 2010/0031953 A1 | 2/2010 | Penev et al. |
| 2010/0052978 A1 | 3/2010 | Tillotson |
| 2010/0072325 A1 | 3/2010 | Sambell |
| 2010/0076625 A1 | 3/2010 | Yoeli |
| 2010/0079342 A1 | 4/2010 | Smith et al. |
| 2010/0100260 A1 | 4/2010 | McIntyre et al. |
| 2010/0161284 A1 | 6/2010 | Wright et al. |
| 2010/0193644 A1 | 8/2010 | Karem |
| 2010/0264257 A1 | 10/2010 | Brunken |
| 2010/0270419 A1 | 10/2010 | Yoel |
| 2010/0270435 A1 | 10/2010 | Karem |
| 2011/0001020 A1 | 1/2011 | Forgac |
| 2011/0042508 A1 | 2/2011 | Bevirt |
| 2011/0042509 A1 | 2/2011 | Bevirt et al. |
| 2011/0042510 A1 | 2/2011 | Bevirt et al. |
| 2011/0049306 A1 | 3/2011 | Yoeli |
| 2011/0049307 A1 | 3/2011 | Yoeli |
| 2011/0139923 A1 | 6/2011 | Papanikolopoulos et al. |
| 2011/0139939 A1 | 6/2011 | Martin et al. |
| 2011/0147533 A1 | 6/2011 | Goossen et al. |
| 2011/0180656 A1 | 7/2011 | Shue et al. |
| 2011/0284201 A1 | 11/2011 | Soenmez et al. |
| 2011/0303795 A1 | 12/2011 | Oliver |
| 2011/0315809 A1 | 12/2011 | Oliver |
| 2012/0025016 A1 | 2/2012 | Methven et al. |

(56) References Cited

U.S. PATENT DOCUMENTS

| | | |
|---|---|---|
| 2012/0061526 A1 | 3/2012 | Brunken |
| 2012/0091257 A1 | 4/2012 | Wolff et al. |
| 2012/0222441 A1* | 9/2012 | Sawada .............. B60H 1/00907 62/238.1 |
| 2012/0234518 A1 | 9/2012 | Brodie et al. |
| 2012/0234968 A1 | 9/2012 | Smith |
| 2012/0327596 A1 | 12/2012 | Anderson-Straley et al. |
| 2013/0060406 A1 | 3/2013 | Christensen et al. |
| 2013/0132548 A1 | 5/2013 | Cabos |
| 2013/0138413 A1 | 5/2013 | Finch et al. |
| 2013/0164578 A1 | 6/2013 | Sweet et al. |
| 2013/0201316 A1 | 8/2013 | Binder et al. |
| 2013/0204544 A1 | 8/2013 | Thomas |
| 2014/0039735 A1 | 2/2014 | Major et al. |
| 2014/0096501 A1* | 4/2014 | Pantalone, III ........ B64D 33/04 60/39.5 |
| 2014/0138492 A1 | 5/2014 | Van Staagen |
| 2014/0174707 A1 | 6/2014 | Lombardo et al. |
| 2014/0179535 A1 | 6/2014 | Stückl et al. |
| 2014/0193683 A1 | 7/2014 | Mardall et al. |
| 2014/0230761 A1* | 8/2014 | Pilavdzic .............. F01P 3/2271 123/41.21 |
| 2014/0236401 A1 | 8/2014 | Tsao et al. |
| 2014/0277869 A1 | 9/2014 | King et al. |
| 2014/0292260 A1 | 10/2014 | Dyer et al. |
| 2014/0299708 A1 | 10/2014 | Green et al. |
| 2014/0339372 A1 | 11/2014 | Dekel et al. |
| 2014/0358333 A1 | 12/2014 | White et al. |
| 2015/0001345 A1 | 1/2015 | Polle |
| 2015/0012154 A1 | 1/2015 | Senkel et al. |
| 2015/0056058 A1 | 2/2015 | Grissom et al. |
| 2015/0102659 A1 | 4/2015 | Liffring et al. |
| 2015/0136897 A1 | 5/2015 | Seibel et al. |
| 2015/0147181 A1 | 5/2015 | Henze et al. |
| 2015/0232178 A1 | 8/2015 | Reiter |
| 2015/0266571 A1 | 9/2015 | Bevirt et al. |
| 2015/0360794 A1 | 12/2015 | Certain et al. |
| 2016/0026190 A1 | 1/2016 | Kowalski et al. |
| 2016/0031555 A1 | 2/2016 | Bevirt et al. |
| 2016/0031556 A1 | 2/2016 | Bevirt et al. |
| 2016/0083073 A1 | 3/2016 | Beckman |
| 2016/0107501 A1 | 4/2016 | Johnston |
| 2016/0107502 A1 | 4/2016 | Johnston |
| 2016/0109882 A1 | 4/2016 | Ouellette et al. |
| 2016/0112151 A1 | 4/2016 | Chedas et al. |
| 2016/0144957 A1 | 5/2016 | Claridge et al. |
| 2016/0167800 A1 | 6/2016 | Joubert |
| 2016/0204488 A1 | 7/2016 | Arai et al. |
| 2016/0209290 A1 | 7/2016 | Shue |
| 2016/0214723 A1* | 7/2016 | Fox ........................ B64D 13/06 |
| 2016/0265556 A1 | 9/2016 | Stadler et al. |
| 2016/0272312 A1 | 9/2016 | Mallard |
| 2016/0294882 A1 | 10/2016 | Michaels |
| 2016/0304194 A1 | 10/2016 | Bevirt et al. |
| 2016/0311529 A1 | 10/2016 | Brotherton-Ratcliffe et al. |
| 2016/0318601 A1* | 11/2016 | Arnold ................... B64C 13/343 |
| 2016/0325841 A1 | 11/2016 | Beckman et al. |
| 2017/0036753 A1 | 2/2017 | Shue |
| 2017/0101176 A1 | 4/2017 | Alber et al. |
| 2017/0104385 A1 | 4/2017 | Salamon et al. |
| 2017/0131716 A1 | 5/2017 | Brekke et al. |
| 2017/0137132 A1* | 5/2017 | Wiegers ................ B64D 13/06 |
| 2017/0179551 A1 | 6/2017 | Shepard et al. |
| 2017/0197710 A1 | 7/2017 | Ma |
| 2017/0213617 A1 | 7/2017 | Patten et al. |
| 2017/0217584 A1 | 8/2017 | Elfeky et al. |
| 2017/0247126 A1 | 8/2017 | Blanding et al. |
| 2017/0274983 A1 | 9/2017 | Beckman et al. |
| 2017/0277152 A1 | 9/2017 | Liu et al. |
| 2017/0283095 A1 | 10/2017 | Koehler et al. |
| 2017/0297407 A1 | 10/2017 | Shan et al. |
| 2017/0297431 A1 | 10/2017 | Epstein et al. |
| 2017/0320373 A1 | 11/2017 | Ochocinski et al. |
| 2017/0357914 A1 | 12/2017 | Tulabandhula et al. |
| 2018/0001994 A1 | 1/2018 | Morrison |
| 2018/0002016 A1 | 1/2018 | McCullough et al. |
| 2018/0018887 A1 | 1/2018 | Sharma et al. |
| 2018/0029483 A1 | 2/2018 | Del Core |
| 2018/0053425 A1 | 2/2018 | Adler et al. |
| 2018/0105279 A1 | 4/2018 | Tighe et al. |
| 2018/0115029 A1 | 4/2018 | Ren et al. |
| 2018/0134400 A1* | 5/2018 | Knapp ................... B64C 11/001 |
| 2018/0148182 A1 | 5/2018 | Fagundes et al. |
| 2018/0183657 A1 | 6/2018 | Beilin et al. |
| 2018/0215475 A1 | 8/2018 | Hurt et al. |
| 2018/0216988 A1 | 8/2018 | Nance |
| 2018/0237148 A1 | 8/2018 | Hehn et al. |
| 2018/0239366 A1 | 8/2018 | Cutler et al. |
| 2018/0244370 A1 | 8/2018 | Lombard |
| 2018/0251226 A1 | 9/2018 | Fenny et al. |
| 2018/0287234 A1 | 10/2018 | Melack et al. |
| 2018/0290736 A1 | 10/2018 | Mikic et al. |
| 2018/0305030 A1 | 10/2018 | Galzin |
| 2018/0308366 A1 | 10/2018 | Goel et al. |
| 2018/0319491 A1 | 11/2018 | Kearney-Fischer |
| 2018/0354615 A1 | 12/2018 | Groninga et al. |
| 2018/0354636 A1 | 12/2018 | Darnell et al. |
| 2018/0356439 A1 | 12/2018 | Luo et al. |
| 2018/0358664 A1 | 12/2018 | Zhang et al. |
| 2018/0362166 A1 | 12/2018 | Marr et al. |
| 2019/0047429 A1 | 2/2019 | Torkelson et al. |
| 2019/0077219 A1 | 3/2019 | Frieling et al. |
| 2019/0097282 A1 | 3/2019 | Melack et al. |
| 2019/0144109 A1 | 5/2019 | Ewing et al. |
| 2019/0146508 A1 | 5/2019 | Dean et al. |
| 2019/0202310 A1* | 7/2019 | Gebhart ................. B60L 53/24 |
| 2019/0210740 A1 | 7/2019 | Luo |
| 2019/0214161 A1 | 7/2019 | Chen et al. |
| 2019/0221127 A1 | 7/2019 | Shannon |
| 2019/0315471 A1 | 10/2019 | Moore et al. |
| 2019/0316849 A1 | 10/2019 | Abrego et al. |
| 2019/0341659 A1 | 11/2019 | Terwilliger |
| 2019/0351732 A1 | 11/2019 | Rajaie et al. |
| 2019/0351740 A1 | 11/2019 | Filipkowski et al. |
| 2020/0001995 A1 | 1/2020 | Yang et al. |
| 2020/0103922 A1 | 4/2020 | Nonami et al. |
| 2020/0127351 A1 | 4/2020 | Smith et al. |
| 2020/0140094 A1 | 5/2020 | White |
| 2020/0142431 A1 | 5/2020 | Mehl et al. |
| 2020/0148347 A1 | 5/2020 | Bevirt et al. |
| 2020/0182637 A1 | 6/2020 | Kumar et al. |
| 2020/0207477 A1 | 7/2020 | Ghesquiere et al. |
| 2020/0303789 A1 | 9/2020 | Macdonald et al. |
| 2020/0339010 A1 | 10/2020 | Villanueva et al. |
| 2020/0350648 A1 | 11/2020 | Rheaume |
| 2020/0355121 A1 | 11/2020 | O'Meallie et al. |
| 2020/0376927 A1 | 12/2020 | Rajaie et al. |
| 2020/0385127 A1 | 12/2020 | Devault |
| 2020/0388166 A1 | 12/2020 | Rostamzadeh et al. |
| 2020/0391876 A1 | 12/2020 | Morrison |

FOREIGN PATENT DOCUMENTS

| | | |
|---|---|---|
| CN | 102407944 A | 4/2012 |
| CN | 103363993 A | 10/2013 |
| CN | 102245878 B | 11/2013 |
| CN | 102239321 B | 7/2014 |
| CN | 107042884 A | 8/2017 |
| CN | 107709161 A | 2/2018 |
| CN | 108349585 A | 7/2018 |
| CN | 110254161 A | 9/2019 |
| DE | 102012104783 A1 | 12/2013 |
| EP | 0945841 A1 | 9/1999 |
| EP | 2423106 A2 | 2/2012 |
| EP | 2698749 A1 | 2/2014 |
| EP | 3210885 A1 | 8/2017 |
| EP | 3315401 A1 | 5/2018 |
| EP | 3366583 A1 | 5/2018 |
| EP | 3401216 A1 | 11/2018 |
| EP | 3499634 A1 | 6/2019 |
| EP | 3565083 A1 | 11/2019 |
| GB | 1271102 | 4/1972 |
| JP | 2010095246 A | 4/2010 |
| JP | 2013086795 A | 5/2013 |

(56) References Cited

FOREIGN PATENT DOCUMENTS

| | | |
|---|---|---|
| JP | 2013126840 A | 6/2013 |
| JP | 2017154728 A | 9/2017 |
| JP | 2019512854 A | 5/2019 |
| WO | WO 2003074924 A1 | 9/2003 |
| WO | WO 2003086857 A1 | 10/2003 |
| WO | WO 2009065818 | 5/2009 |
| WO | WO 2007110467 | 10/2009 |
| WO | WO 2016026505 | 2/2015 |
| WO | WO 2016034830 A1 | 3/2016 |
| WO | WO 2016189421 A1 | 12/2016 |
| WO | WO 2017162197 A1 | 9/2017 |
| WO | WO 2017193091 A1 | 11/2017 |
| WO | WO 2018023556 A1 | 2/2018 |
| WO | WO 2019001203 A1 | 1/2019 |
| WO | WO 2019056053 A1 | 3/2019 |
| WO | WO 2019089677 A1 | 5/2019 |
| WO | WO 2020252024 A1 | 12/2020 |

OTHER PUBLICATIONS

"Airfoils Blade Profile", Mecaflux Heliciel, Propeller & Wing, https://heliciel.com/en/aerodynamique-hydrodynamique/profils%20aile%20profil%20pale.htm.

Bennaceur et al., "Passenger-centric urban air mobility: Fairness trade-offs and operational efficiency", Transportation Research: Emerging Technologies, 2021, 29 pages.

Berger, "Handling Qualities Requirements and Control Design for High-Speed Rotorcraft", Special Report CDD-AMV-20-01, Feb. 2020, Combat Capabilities Devcom Aviation and Missile Center, U.S. Army, 360 pages.

Bevacqua, "Studies Show How to Modify HVAC Systems for Improved EV Range", https://www.futurecar.com/2301/Studies-Show-How-to-Modify-HVAC-Systems-for-Improved-EV-Range, May 27, 2018.

Carson, "First Look: Uber Unveils New Design for Uber Eats Delivery Drone", https://www.forbes.com/sites/bizcarson/2019/10/28/first-look-uber-unveils-new-design-for-uber-eats-delivery-drone/?sh=49da918578f2.

"Curtiss-Wright X-19", Wikipedia, https://en.wikipedia.org/wiki/Curtiss-Wright_X-19.

Denham, et al., "Converging on a Precision Hover Control Strategy for the F3SB STOVL Aircraft", AIAA Guidance, Navigation and Control Conference and Exhibit Aug. 18-21, 2006, Honolulu, Hawaii, Abstract only.

European Search Report for Application No. 15765064.9 dated Oct. 16, 2017.

Falco, et al., "Loose and Tight GNSS/INS Integrations: Comparison of Performance Assessed in Real Urban Scenarios", Sensors (Basel) Feb. 2017; 17 (2): 225, https://www.nebi.nlm.nih.gov/pme/articles/PMC5335985/.

Gold, et al., "Design and Pilot Evaluation of the RAH-66 Comanche Selectable Control Modes", https://ntrs.nasa.gov/search.jsp?, N94-13322, pp. 419-431, Jul. 1, 1993.

Inclined Flat Plate, Aerodynamics of the airplane, Feb. 13, 2016.

International Preliminary Report on Patentability for PCT/US2020/052920, mailed on Apr. 7, 2022, 7 pages.

International Search Report and Written Opinion for Application No. PCT/US10/46500 dated Apr. 13, 2011.

International Search Report and Written Opinion for Application No. PCT/US15/21344 dated Sep. 11, 2015.

International Search Report and Written Opinion for Application No. PCT/US15/21350 dated Sep. 15, 2015.

International Search Report and Written Opinion for application No. PCT/US20/052920 dated Dec. 9, 2020.

International Search Report and Written Opinion for application No. PCT/US20/29617 dated Jan. 12, 2021.

International Search Report and Written Opinion for Application No. PCT/US2017/059809 dated Jul. 31, 2018.

International Search Report and Written Opinion for PCT Application No. PCT/US2019/039247 mailed Sep. 13, 2019.

International Search Report and Written Opinion for PCT Application No. PCT/US2019/035236 mailed Aug. 20, 2019.

International Search Report and Written Opinion of the ISA dated Dec. 4, 2019, for PCT/US19/51565.

International Search Report and Written Opinion of the ISA dated Mar. 19, 2020, for PCT/US19/67618.

International Search Report and Written Opinion of the ISA, dated Jul. 24, 2019, for application No. PCT/US19/31863.

Jong, "Optimizing cost effectiveness and flexibility of air taxis: A case study for optimization of air taxi operations", University of Twente, Master's thesis, 2007, 62 pages.

Kang, et al., "Development of Flight Control System and Troubleshooting on Flight List of a Tilt-Rotor Unmanned Aerial Vehicle", International Journal of Aeronautical and Space Sciences, vol. 17, No. 1, 2016, pp. 120-131.

Kim, "Reduction of Tonal Propeller Noise by Means of Uneven Blade Spacing", University of California, Irvine, thesis, publication date 2016.

Miao et al., "Data-driven robust taxi dispatch under demand uncertainties", IEEE Transactions on Control Systems Technology 27, No. 1, 2017, 16 pages.

Miao et al., "Taxi dispatch with real-time sensing data in metropolitan areas: A receding horizon control approach", In Proceedings of the ACM/IEEE Sixth International Conference on Cyber-Physical Systems, 2015, 15 pages.

Radhakrishnan, Anand, et al., "An Experimental Investigation of a Quad Tilt Rotor in Ground Effect", 21st Applied Aerodynamics Conference, Jun. 23-26, 2003, Orlando, Florida, AIM 2003-3517, 11 pages.

Saraf, et al., "Study of Flow Separation on Airfoil with Bump", International Journal of Applied Engineering Research ISSN 09773-4562, vol. 13, No. 16 (2018), pp. 128686-12872.

Sullivan, et al., "A Subject Test of Modulated Blade Spacing for Helicopter Main Rotors", Presented at the American Helicopter Society 58th Annual Forum, Montreal, Canada, Jun. 11-13, 2002, http://ntrs.nasa.gov/search. sp.

Thorsen, "Development of Evaluation of a Unified Control Architecture for a Compound Rotorcraft in Maneuvering Flight", AIM Aviation Forum, AIM Atmospheric Flight Mechanics Conference, Jun. 13-17, 2016, Washington, D.C, AIM Paper 10.2514/6.2016-3392, 19 pages.

Uber, "Fast-forwarding to a future of on-demand urban air transportation", 2016, 99 pages.

Vigano, et al., "Development of Augmented Control Laws for a Tiltrotor in Low and High-Speed Flight Modes", 43rd European Rotorcraft Forum Proceedings, Sep. 12-15, 2017, Milan, Italy, vol. 1, pp. 438 to 451.

Walker et al., "F-35B integrated flight-propulsion control development", AIM Aviation Forum, 2013 International Powered Lift Conference, Aug. 12-14, 2013, Los Angeles, CA, AIA Paper 10.2514/6.2013-4243, 16 pages.

Whittle, "Flying the Osprey is not dangerous, just different: Veteran pilots", Breaking Defense, Sep. 5, 2012, 9 pages, downloaded from: https://breakingdefense.com/2012/09/flying-the-osprey-is-not-dangerous usl-different-veteran-pilo/.

Yeh, "Triple-Triple Redundant 777 Primary Flight Computer", 1996, IEEE, pp. 293-307 (Year: 1996).

Young, "Conceptual Design Aspects of Three General Sub-Classes of Multi-Rotor Configurations: Distributed, Modular, and Heterogeneous", NASA Ames Research Center, Moffett Field, CA 94035, Published 2015, Computer Science.

* cited by examiner

VEHICLE CABIN THERMAL MANAGEMENT SYSTEM AND METHOD

CROSS-REFERENCE TO RELATED APPLICATIONS

This application claims the benefit of U.S. Provisional Application No. 62/905,810, filed Sep. 25, 2019, which is incorporated in its entirety by this reference.

This application is a continuation of U.S. application Ser. No. 17/547,995, filed on Dec. 10, 2021, which is a continuation of U.S. application Ser. No. 17/033,549, filed on Sep. 25, 2020, which is a continuation in part of U.S. application Ser. No. 16/857,003, filed Apr. 23, 2020, which claims the benefit of U.S. Provisional Application No. 62/837,504 filed Apr. 23, 2019, each of which is incorporated in its entirety by this reference.

TECHNICAL FIELD

This invention relates generally to the thermal management technology field, and more specifically to a new and useful vehicle cabin thermal management system and method in the battery technology field.

BACKGROUND

In passenger vehicles, managing the temperature within the cabin environment is an important aspect of user comfort and well-being. However, the equipment needed to properly condition the air adds mass to the vehicle, which can degrade vehicle performance. In addition, heating, ventilation, and air conditioning (HVAC) systems require power to operate that does not typically contribute to vehicle propulsion, which adds further power capacity needs (and often mass in the form of battery weight or additional fuel) to the vehicle power system. These drawbacks can be particularly acute in the context of electric vehicles and/or aircraft, wherein weight and energy efficiency tradeoffs can have an outsize impact on vehicle design.

Thus, there is a need in the thermal management technology field to create a new and useful vehicle cabin thermal management system and method. This invention provides such new and useful systems and methods.

DESCRIPTION OF THE PREFERRED EMBODIMENTS

The following description of preferred embodiments of the invention is not intended to limit the invention to these preferred embodiments, but rather to enable any person skilled in the art to make and use this invention.

1. Overview

Figure 1:
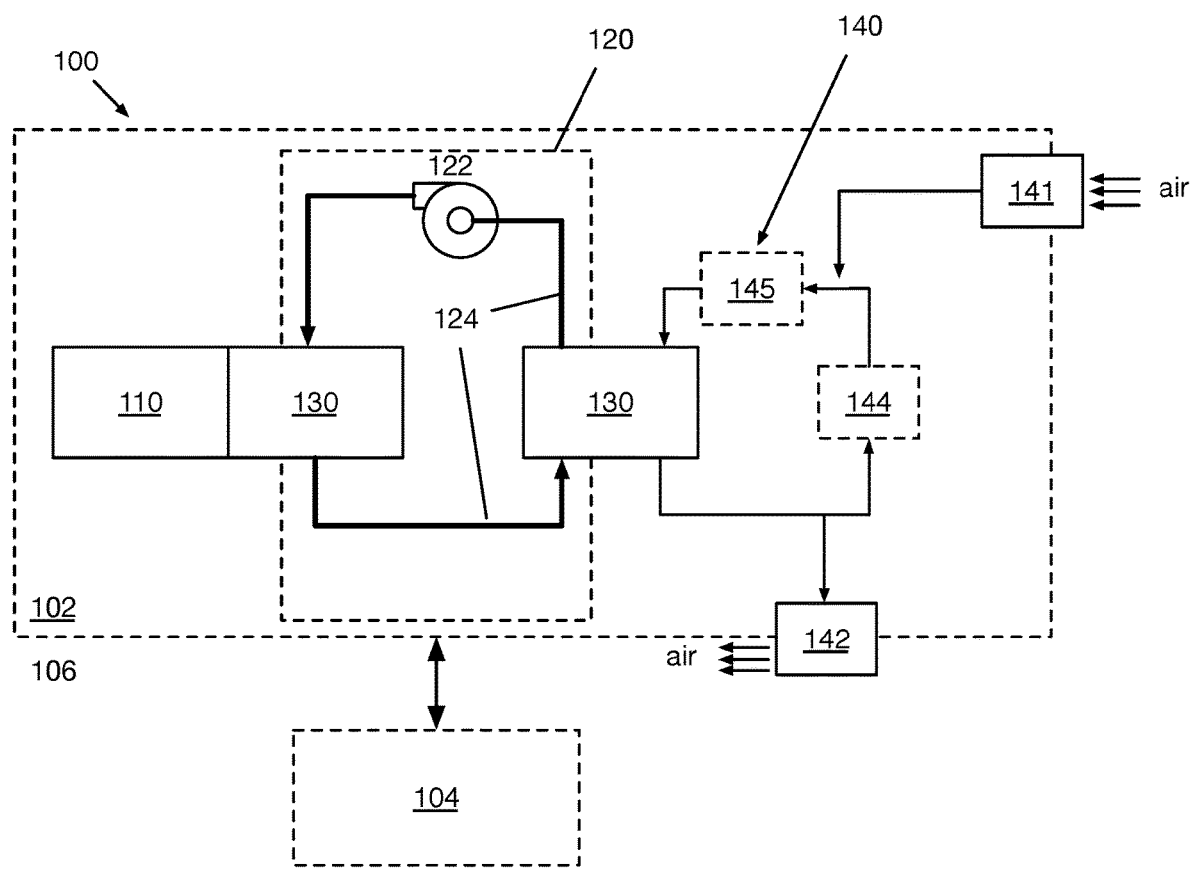
FIG. 1 depicts a schematic diagram of the system.

The system 100 can include an on-board thermal management subsystem. The system 100 can optionally include an off-board (extravehicular) infrastructure subsystem. The on-board thermal management subsystem can include: a battery pack, one or more fluid loops, and an air manifold. The system 100 can additionally or alternatively include any other suitable components. An example of the system 100 is shown in FIG. 1.

The system 100 functions to manage the temperature of the cabin environment of the vehicle. The system 100 can also function to manage airflow within the cabin environment of the vehicle. The system 100 can additionally or alternatively have any other suitable function.

Figure 12:
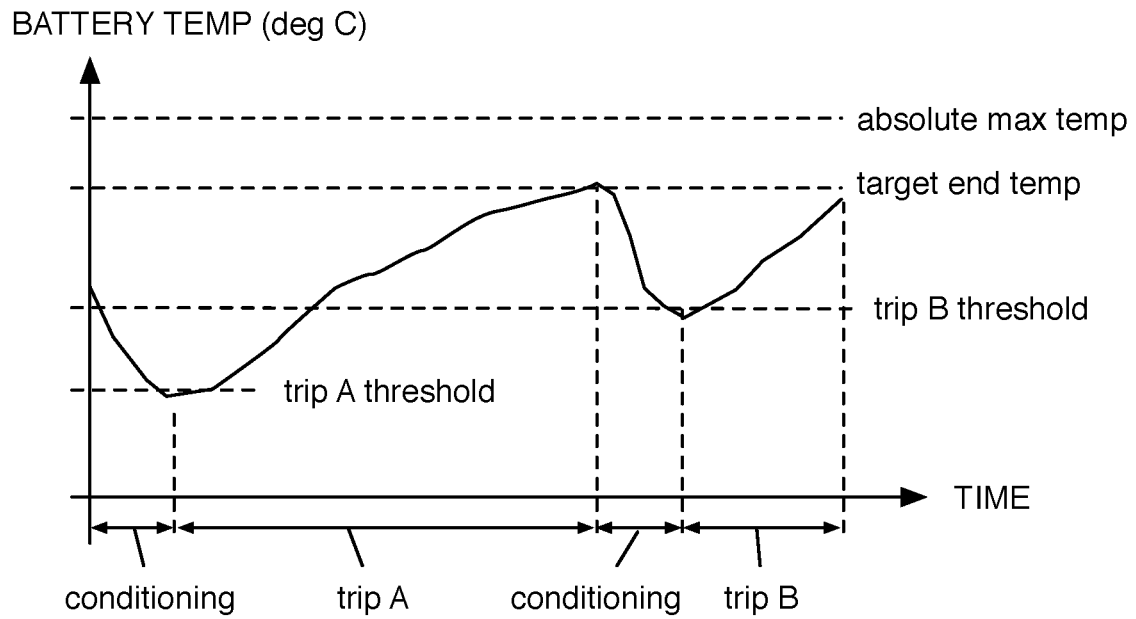
FIG. 12 depicts a schematic diagram of an example battery temperature profile in a variant of the method.
Figure 13:
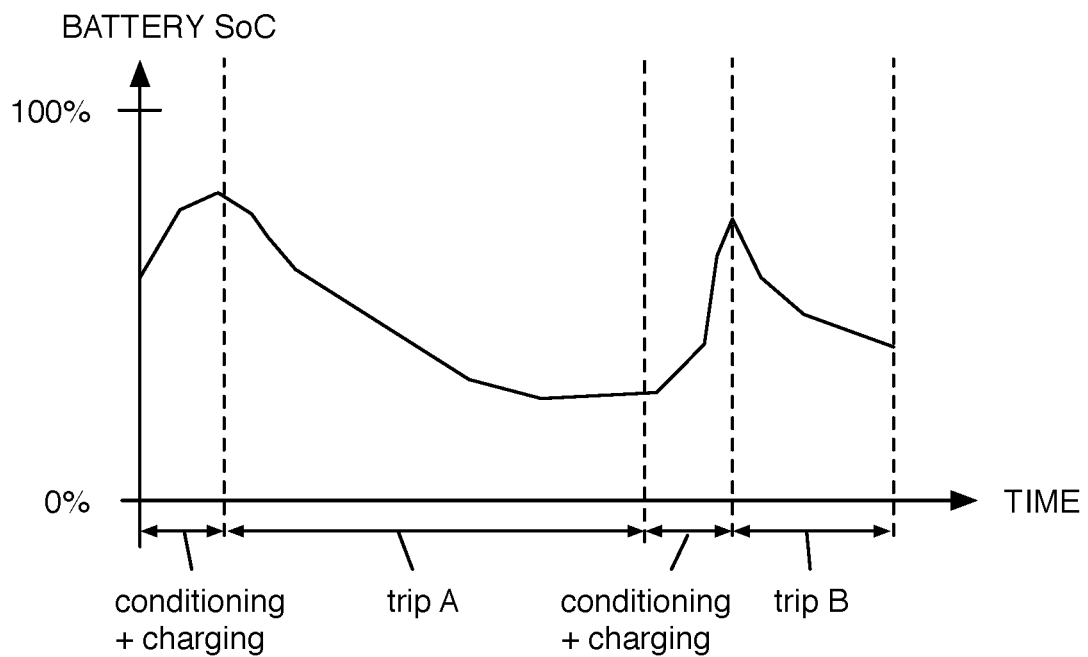
FIG. 13 depicts a schematic diagram of an example battery state of charge profile for the variant of the method in FIG. 12.

For short operation cycles (e.g., <40 minutes), electric vehicles can rely on thermal mass of the battery to absorb and/or store waste heat of the vehicle during operation. In such variants, vehicles can be used with extravehicular infrastructure to reduce the battery temperature while on the ground and/or charging. In a cabin heating mode, such vehicles can utilize an on-board thermal management subsystem which heats the cabin using waste heat generated by the battery during operation and/or stored by the battery (e.g., absorbed by the thermal mass). In a cabin cooling mode, the on-board thermal management subsystem can store excess heat from the cabin (air) in the battery, again utilizing the thermal mass of the battery (e.g., in addition to storing the waste heat, generated during battery operation, within the battery). An example of operation cycles (or trips) for a vehicle relying on the thermal mass of the battery is shown in FIGS. 12-13. However, the cabin environment (e.g., temperature, humidity, etc.) can be otherwise regulated.

In a first example, the on-board thermal management subsystem can include: a plurality of battery cells on-board the electric aircraft; a refrigerant within a refrigeration system; a working fluid within a first fluid loop, the first fluid loop comprising: a first heat exchanger (e.g., cabin heat exchanger) on-board the electric aircraft, the first heat exchanger fluidly connected to the cabin air; a condenser thermally coupling the working fluid to the refrigerant, the condenser fluidly coupled to the first heat exchanger; a second heat exchanger (e.g., battery heat exchanger) thermally coupled to the plurality of battery cells; an evaporator thermally coupling the working fluid (e.g., within the cabin loop) to the refrigerant, the evaporator fluidly coupled to the second heat exchanger; and a first pump configured to circulate the working fluid within the first fluid loop.

The system 100 can function to manage the cabin temperature. Temperature management can include increasing the air temperature, decreasing the air temperature, maintaining the air temperature, and/or otherwise suitably manipulating the air temperature. Temperature management can additionally or alternatively include increasing, decreasing, maintaining, or otherwise suitably manipulating the temperature of other portions of the cabin to enhance user comfort and regulate the user environment (e.g., passenger seats, hand rests, footrests, any other surfaces or objects, etc.).

The system 100 can additionally function to manage the thermal state of the battery pack. The thermal state can include the distribution of the temperature within the battery pack, the average temperature of the battery pack, the temperature rise or fall rate of the battery pack, and/or any other suitable metric quantifying the a temperature-related characteristic of all or part of the battery pack and/or thermally coupled elements.

The system 100 can also function to circulate a working fluid within the battery pack (e.g., to achieve temperature uniformity within the battery pack, to heat or cool the battery pack, etc.). The working fluid can be any suitable fluid that can be heated and/or cooled, and flowed through a closed or open circuit of the battery loop to transfer heat among the various components (e.g., including the external environment). The working fluid can additionally or alternatively be any suitable fluid medium for exchanging heat between portions of the battery pack and/or a heat exchanger of the system 100. For example, the working fluid can be water, a water/glycol mixture (e.g., 50/50, 70/30, 80/20, etc.), a refrigerant (e.g., R134a), an oil, air, fluid coolant, mineral oil, any other suitable gas or gas mixture, and/or any other suitable fluid. In variants, the working fluid can be a non-hazardous, natural, or bio-degradable fluid in order to minimize the environmental impact of leaks or spills. In variants, the working fluid can be non-conductive (e.g., mineral oil), which can eliminate the possibility of shorting electronics and/or enable flood cooling of the battery cells 114 (e.g., in a fully submersed configuration). In some examples, the system 100 can be configured to circulate multiple working fluids for various purposes (e.g., a first working fluid for cooling the battery pack circulated in parallel with a second working fluid for heating the battery pack, wherein the first and second working fluids can be circulated at differing times depending on the needs of the thermal management system, etc.). Different fluid loops can use the same or different types of working fluid.

The system 100 can also function to detect and manage a thermal event within the battery pack. A thermal event can include any off-nominal temperature reached by a portion of the battery pack. For example, a thermal event can include a thermal runaway in one or more cells 114 of a battery pack, wherein an uncontrolled, positive feedback exothermic reaction occurs within the cell or cells. A thermal event can also include thermal propagation, wherein an off-nominal (e.g., spiked, increasing, etc.) temperature spreads from one to multiple cells not initially affected. However, a thermal event can additionally or alternatively include any other temperature-related occurrence within the battery pack that requires mitigation to ensure proper battery pack operation (e.g., charging, discharging, storage, etc.).

The system can be used in conjunction with and/or include several related systems, in various embodiments. Such related systems can include an aircraft, aircraft subsystems (e.g., powertrain subsystems, propulsion subsystems, avionics subsystems, etc.), a ground-based vehicle (e.g., an automotive, a locomotive, etc.), land-based infrastructure (e.g., air traffic control systems, ground-based maintenance systems, etc.), and/or any other suitable systems.

In variations of the system 100, portions of the system are distributed between the vehicle and an extravehicular infrastructure subsystem. The vehicle preferably includes all portions of the vehicle cabin thermal management system used to regulate the temperature of the cabin environment during vehicle operation (e.g., flight, driving, etc.). The infrastructure installation preferably includes the portions of the system used to prepare the cabin thermal conditioning system for operation (e.g., recharging, thermally pre-conditioning, pulling down on-board thermal management subsystem components to a preparatory state in advance of vehicle operation, etc.). This distribution functions to enable thermal conditioning of the cabin of the vehicle while reducing the overall mass and/or energy capacity requirements of the vehicle, by offloading the utilization of heavy and/or high-powered thermal management equipment to the infrastructure installation. The infrastructure installation can be static (e.g., fixed to the ground as part of substantially permanent infrastructure) or mobile (e.g., a movable/towable trailer that can be transported to a service area to be connected to the vehicle during charging or other thermal conditioning).

Figure 18:
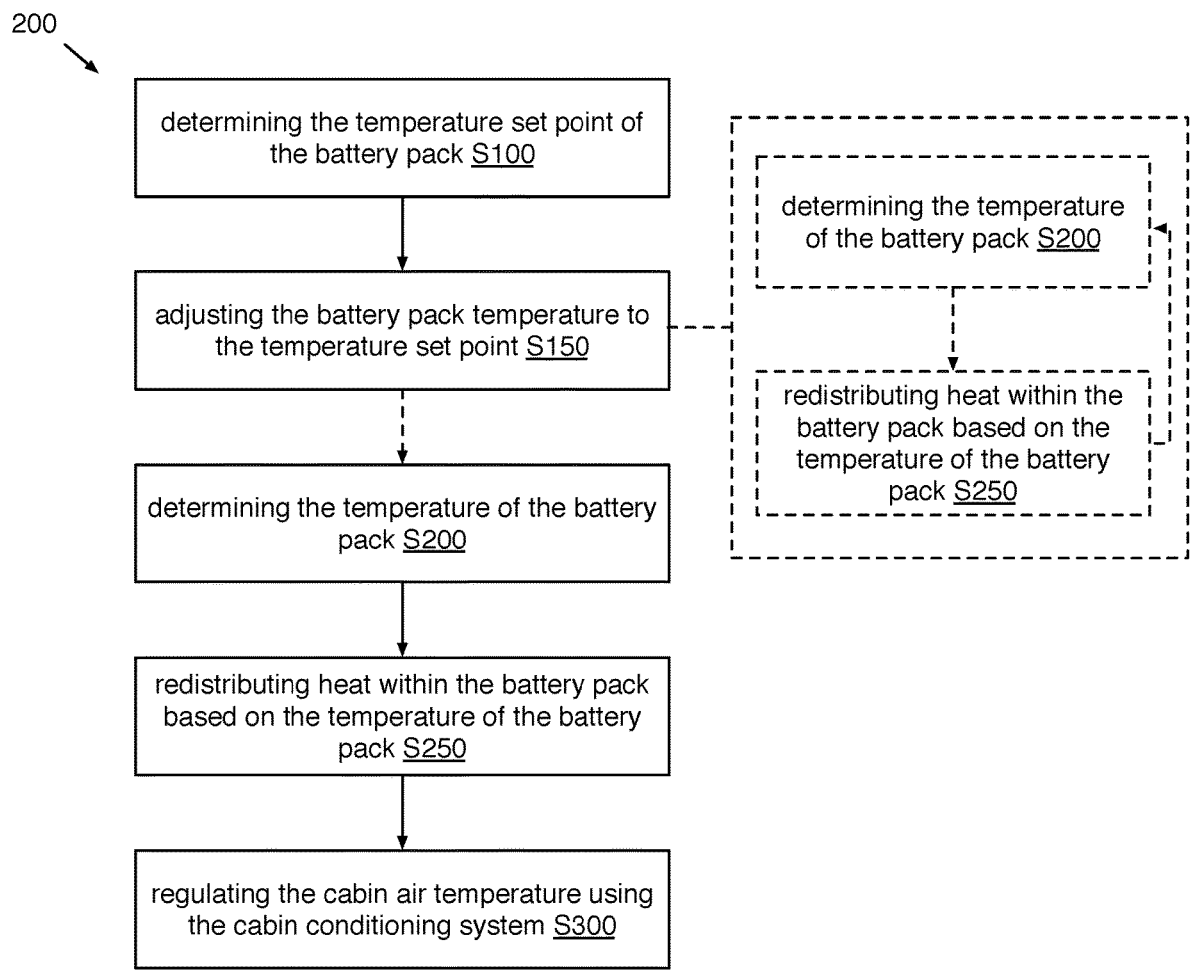
FIG. 18 depicts a flowchart diagram of the vehicle cabin thermal management method.

As shown in FIG. 18, the method 200 includes: determining the temperature setpoint of the battery pack S100; adjusting the battery pack temperature to the temperature setpoint S150; and regulating the cabin air temperature using the cabin thermal management system S300. The method can additionally or alternatively include determining the temperature of the battery pack S200; and redistributing heat within the battery pack based on the temperature of the battery pack S250. The method 200 can additionally or alternatively include any other suitable processes.

The method 200 functions to prepare the cabin thermal management subsystem of a vehicle for operation and to facilitate cabin temperature regulation during vehicle operation. However, the method 200 can additionally or alternatively have any other suitable function.

In an example: the method can include: while flying an electric aircraft, cooling the cabin, comprising: at a first heat exchanger (e.g., cabin heat exchanger), transferring a first portion of thermal energy from cabin air to a first working fluid (e.g., within the cabin fluid loop); at a second heat exchanger (e.g., battery heat exchanger), transferring the first portion of thermal energy from the first working fluid to a second working fluid (e.g., within the battery loop), the second working fluid in thermal communication with the battery pack; and storing the first portion of thermal energy within a thermal mass of the battery pack. Additionally, the method can include: while the electric aircraft is grounded, pre-conditioning the aircraft comprising: replacing a first portion of the second working fluid with a second portion of the second working fluid from a ground-infrastructure.

The method 200 is preferably implemented and/or executed using a system substantially analogous to the system 100; however, the method 200 can be implemented and/or executed by any other suitable system with any other suitable components that can be used for vehicle cabin thermal management.

Figures 17A, 17B:
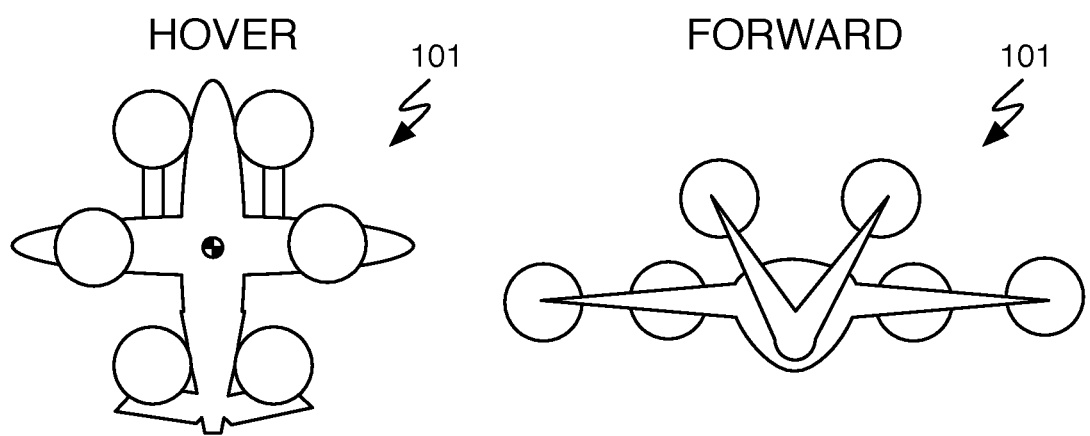
FIG. 17A-B depict a schematic diagram of an example vehicle in a variant of the method in a hover arrangement and forward arrangement, respectively.

The vehicle cabin thermal management system 100 and/or method 200 is preferably implemented in conjunction with an aircraft (e.g., the system can include an aircraft); in variations wherein the system is distributed between a vehicle 101 and an infrastructure installation 104, the vehicle is preferably an aircraft. In particular, the aircraft is preferably a rotorcraft, but can additionally or alternatively include any suitable aircraft. The aircraft is preferably a tiltrotor aircraft with a plurality of aircraft propulsion systems (e.g., rotor assemblies, rotor systems, etc.), operable between a forward arrangement (an example is shown in FIG. 17B) and a hover arrangement (an example is shown in FIG. 17A). However, the aircraft can alternatively be a fixed wing aircraft with one or more rotor assemblies or propulsion systems, a helicopter with one or more rotor assemblies (e.g., wherein at least one rotor assembly or aircraft propulsion system is oriented substantially axially to provide horizontal thrust), and/or any other suitable rotorcraft or vehicle propelled by rotors (and/or propellers). The aircraft preferably includes an all-electric powertrain (e.g., battery powered electric motors) to drive the one or more propulsion assemblies, but can additionally or alternatively include a hybrid powertrain (e.g., a gas-electric hybrid including an internal-combustion generator), an internal-combustion powertrain (e.g., including a gas-turbine engine, a turboprop engine, etc.), and any other suitable powertrain.

In a specific example, portions of the vehicle cabin thermal management system are integrated into the electric tiltrotor aircraft described in U.S. application Ser. No. 16/409,653, filed 10 May 2019, which is incorporated in its entirety by this reference. However, any other suitable aircraft can be used.

The term "rotor" as utilized herein, in relation to portions of the system 100, method 200, or otherwise, can refer to a rotor, a propeller, and/or any other suitable rotary aerodynamic actuator. While a rotor can refer to a rotary aerodynamic actuator that makes use of an articulated or semi-rigid hub (e.g., wherein the connection of the blades to the hub can be articulated, flexible, rigid, and/or otherwise connected), and a propeller can refer to a rotary aerodynamic actuator that makes use of a rigid hub (e.g., wherein the connection of the blades to the hub can be articulated, flexible, rigid, and/or otherwise connected), no such distinction is explicit or implied when used herein, and the usage of "rotor" can refer to either configuration, and any other suitable configuration of articulated or rigid blades, and/or any other suitable configuration of blade connections to a central member or hub. Likewise, the usage of "propeller" can refer to either configuration, and any other suitable configuration of articulated or rigid blades, and/or any other suitable configuration of blade connections to a central member or hub. Accordingly, the tiltrotor aircraft can be referred to as a tilt-propeller aircraft, a tilt-prop aircraft, and/or otherwise suitably referred to or described.

In a specific example of the vehicle cabin thermal management system, portions of the system are integrated into an electric tiltrotor aircraft including a plurality of tiltable rotor assemblies (e.g., six tiltable rotor assemblies). The electric tiltrotor aircraft can operate as a fixed wing aircraft, a rotary-wing aircraft, and in any liminal configuration between a fixed and rotary wing state (e.g., wherein one or more of the plurality of tiltable rotor assemblies is oriented in a partially tilted state). The control system of the electric tiltrotor aircraft in this example can function to command and control the plurality of tiltable rotor assemblies within and/or between the fixed wing arrangement (e.g., forward flight configuration) and the rotary-wing arrangement (e.g., hover configuration).

In variations, the system 100 and method 200 regulate the vehicle cabin environment in relation to various defined temperature values, including: a set temperature, a cabin temperature, and an ambient temperature. The set temperature is the temperature value commanded by the users and/or passengers (e.g., via an in-vehicle control interface, a predetermined value, etc.). The cabin temperature is the measured temperature of the cabin air volume (e.g., where the occupants are seated or otherwise suitably positioned during an operating session of the vehicle). The ambient temperature is the temperature value of the exterior environment proximal to the vehicle. Additionally or alternatively, other temperature values can be suitably defined in any other suitable manner.

2. Benefits

Variations of the technology can afford several benefits and/or advantages.

First, variations of the technology can reduce the vehicle mass by arranging substantial portions of the system at an extra-vehicular infrastructure installation. For an equivalent vehicle mass, this can also enable a higher overall energy capacity and therefore range and/or power output (e.g., by replacing the portions of the thermal conditioning system that would otherwise be carried with the vehicle with additional battery pack mass). For example, the extravehicular infrastructure installation can "pull down" the on-board components of the system (e.g., pre-load the system with thermal capacity to heat and/or cool the cabin environment) prior to vehicle operation, which enables the on-board components to maintain the vehicle cabin temperature across a wider temperature range and/or with higher efficiency during vehicle operation than would be achievable without prior thermal capacity expansion and/or by including otherwise needed components on-board the vehicle.

Figure 9:
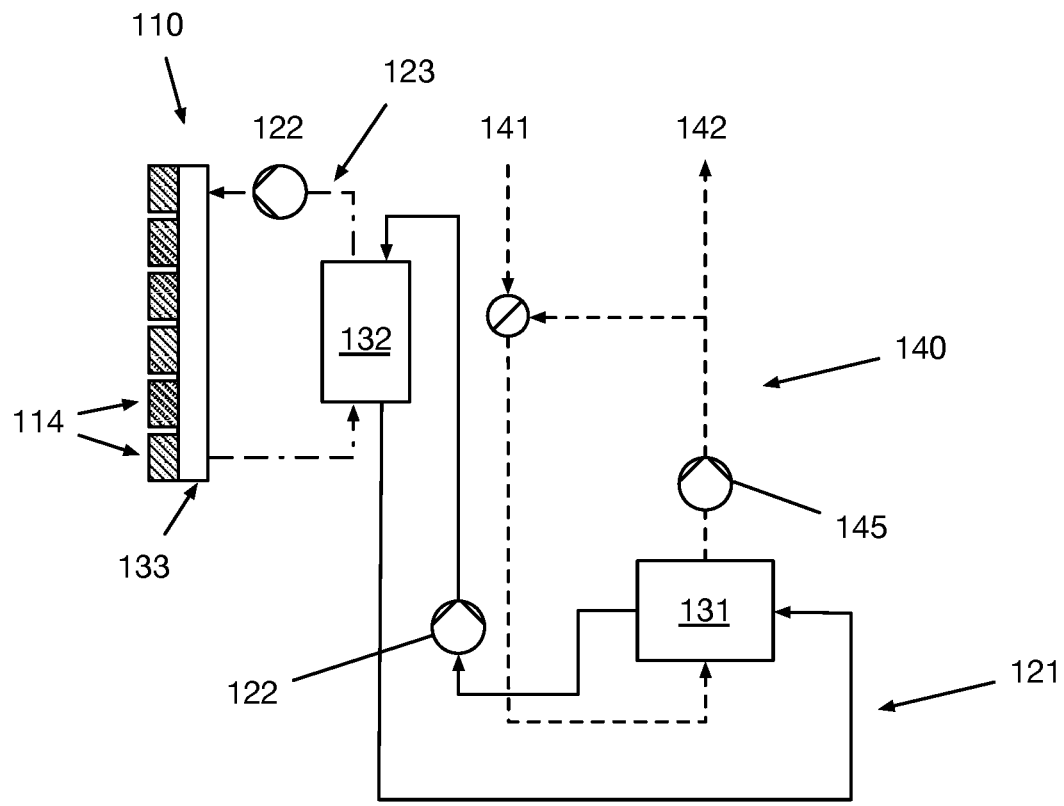
FIG. 9 depicts a schematic diagram of a variant of the system.

Second, variations of the technology can leverage the vehicle battery pack thermal capacity during operation as part of the on-board cabin conditioning subsystem (e.g., as shown in FIG. 9), to enhance efficiency of the on-board subsystem given. For example, heat generated as the battery pack discharges during vehicle operation can be exchanged with the airflow through the on-board thermal management subsystem to add heat to the cycle (and/or to the cabin) during operation. In another example, heat from the airflow through the vehicle cabin can be transferred to the working fluid flowing through a battery conditioning system to utilize excess thermal capacity of the battery packs as a heat sink to cool the vehicle cabin.

Third, variations of the technology can intelligently manage the thermal state of the vehicle cabin during vehicle operation relative to the set points in accordance with dynamic mission objectives and/or evolving constraints on the vehicle cabin temperature. For example, the technology can automatically respond to a change in mission objective from "proceed to destination" (e.g., nominal operation) to "emergency landing" by ceasing active conditioning (e.g., cooling or heating) of the vehicle cabin to reserve vehicle energy for propulsion and control operations. In another example, the technology can automatically respond to a change in the circumstances of the flight (e.g., distance remaining until destination, time remaining until destination, electrical discharge or power requirements of the remaining flight profile, ambient temperature, etc.) by adjusting aspects of the thermal management control loop (e.g., rise time of the control loop, the set temperature, the heat transfer rate, etc.).

Fourth, variations of the technology can optimize the distribution of components of the vehicle cabin temperature management system between the on-board thermal management system and the infrastructure installation to reduce the mass of the vehicle. The overall mass of the vehicle can include, for example, the dry weight of all components of the on-board thermal management subsystem, the full weight of refrigerant used, and the weight equivalent of the power consumption required by the on-board thermal management subsystem (e.g., a ratio of kW to kg of added mass in the form of battery weight, such as 0.52 kW to 1 kg or any other suitable ratio, etc.).

Fifth, variations of the technology can be designed to minimize noise within the cabin. For example, compressor(s) and other moving parts of the on-board thermal management subsystem can be sized (e.g., by physical size, by capacity, etc.) along with the remainder of the on-board thermal management subsystem to produce lower noise levels, even while slightly reducing the cooling and/or heating capacity of the on-board thermal management subsystem. The on-board thermal management subsystem noise is preferably minimized at the anticipated and/or actual location of the vehicle occupants during vehicle operation; however, the noise can additionally or alternatively be minimized at any other suitable location within or outside the vehicle at any other time period during or outside vehicle operation. In such variations, the noise is preferably held below a threshold value (e.g., 55 dBA), but can additionally or alternatively be held below any other suitable value.

Sixth, variations of the technology can eliminate or reduce the quantity of ambient air that might otherwise need to flow through the vehicle to provide a heat source or heat sink for the respective heating or cooling needed to maintain the comfort and safety of the vehicle cabin occupants. This reduction in air flowing through the vehicle can reduce vehicle drag and power consumption, and may enable an increase in vehicle range or payload.

However, variations of the system can additionally or alternatively provide any other suitable benefits and/or advantages.

3. System

The system 100 can include an on-board thermal management subsystem 102. The system 100 can optionally include an off-board (extravehicular) infrastructure subsystem 104. The system 100 can additionally or alternatively include any other suitable components. An example of the system 100 is shown in FIG. 1.

The on-board thermal management subsystem can include: a battery pack 110, one or more fluid loops 120, and an air manifold 140. The on-board thermal management subsystem can additionally or alternatively include any other suitable components.

The on-board thermal management subsystem functions to thermally condition the cabin environment to achieve a set temperature of the cabin. Thermally conditioning the cabin can include heating the cabin and/or cabin air in a cabin heating mode, utilizing waste heat from the battery. Thermally conditioning the cabin can additionally include cooling the cabin and/or cabin air in a cabin cooling mode, transporting heat to the battery (and/or battery loop) and relying on the thermal mass of the battery to act as a heat sink for the thermal energy from the cabin. The on-board thermal management subsystem can additionally function to precondition the cabin prior to takeoff. However, the on-board thermal management subsystem can additionally or alternatively have any other suitable function.

The on-board thermal management subsystem can include a battery pack, which functions to store energy for powering vehicle operations (e.g., sustain flight). The battery pack can additionally or alternately function to supply power to components of the system (e.g., pumps, fans, compressors, etc.). In variants, the battery pack can additionally function to generate thermal energy, which is used to thermally condition the cabin in a heating mode. In variants, the battery pack and/or individual cells therein can additionally function to store a portion of thermal energy removed from cabin air and/or store a portion of thermal energy generated by another battery of the aircraft during battery operation. In an example, thermal energy can be stored by the battery pack for more than a threshold period of time (e.g., 10 minutes, 30 minutes, flight duration).

The energy stored by the battery pack is preferably stored in the form of chemical potential energy and released in the form of electrical energy; however, the energy can additionally or alternatively be stored and/or released in any suitable form. In a specific example: the battery can store thermal energy and chemical energy, and release both thermal energy and chemical energy in order to thermally condition the cabin (e.g., in a heating mode). Operation of the battery pack can include charging of the battery pack, discharging of the battery pack, and/or maintenance of the charge of the battery pack (e.g., storage of energy); however, operation of the battery pack can include any other suitable use of the battery pack.

The battery pack is located on-board the vehicle, and can be arranged within, upon, or otherwise suitably coupled to the vehicle. Thus, the battery pack moves (e.g., is transported) with the vehicle as the vehicle moves. The system can include any suitable number of battery packs. The system can include: one battery pack per propulsion system, one battery pack associated with a plurality of propulsion systems, one propulsion system associated with a plurality of battery packs, a plurality of battery packs on-board the vehicle (e.g., 2, 3, 4, more than 4, etc.), a single battery pack for the vehicle, and/or any other suitable number of battery packs associated with any number of aircraft components. The battery packs can have any suitable arrangement, and can be located in the fuselage, empennage, wing, cabin (e.g., below a passenger region), tail, a nacelle, and/or any other suitable region. Preferably, the batteries are symmetrically distributed about the center of the aircraft, but can additionally or alternately be offset by a predetermined distance from a passenger region, (e.g., by 1 meter, 2 meters, >2 meters, etc.), another battery, a rotor disk, a rotor disk plane, and/or any other suitable vehicle component, and/or otherwise distributed about the vehicle. For example, the system can include one battery pack for each propulsion unit (or other suitable load) that powers an associated electric motor. In another example, the system can include a single battery pack connected to each propulsion unit (e.g., an automotive vehicle with a single battery pack and a single integrated powertrain including multiple motors). In further examples, the system can include a number of battery packs greater than the number of propulsion units; a number of battery packs less than the number of propulsion units; and/or any suitable number of battery packs. The battery packs can be interconnected in any suitable manner with the powered components of the vehicle (e.g., wherein a plurality of battery packs is connected to each powered component for redundancy in a fault-tolerant power network).

The battery pack can include a plurality of cells in any suitable arrangement (e.g., parallel, serial, etc.) that cooperatively make up the battery pack.

The battery pack and the cells thereof can use various battery chemistries to store electrochemical energy in a rechargeable manner. For example, the battery pack be an aluminum ion battery, a carbon battery (e.g., a single carbon battery, a dual carbon battery, etc.), a flow battery (e.g., a vanadium redox battery, a zinc-bromine battery, a zinc-cerium battery, etc.), a lead-acid battery (e.g., a deep cycle battery, a VRLA battery, an AGM battery, a gel battery, etc.), a glass battery, a lithium-ion battery (e.g., a lithium ion lithium cobalt oxide battery, a lithium ion manganese oxide battery, a lithium ion polymer battery, a lithium iron phosphate battery, a lithium-sulfur battery, a lithium-titanate battery, a thin film lithium ion battery, a lithium ceramic battery, etc.), a magnesium ion battery, a metal-air electrochemical battery (e.g., a lithium-air battery, an aluminum-air battery, a germanium-air battery, a calcium-air battery, an iron-air battery, a potassium-ion battery, a silicon-air battery, a zinc-air battery, a tin-air battery, a sodium-air battery, a beryllium-air battery, etc.), a molten salt battery, a nickel-cadmium battery (e.g., a vented cell nickel-cadmium battery), a nickel hydrogen, battery, a nickel-iron battery, a nickel metal hydride (NiMH) battery, a nickel-zinc battery, an organic radical battery, a polymer-based battery, a polysulfide bromide battery, a potassium-ion battery, a rechargeable alkaline battery, a rechargeable fuel battery, a sand battery, a silicon air battery, a silver-zinc battery, a silver calcium battery, a sodium-ion battery, a sodium-sulfur battery, a solid-state battery, a ferrate salt cathode battery (e.g., a super-iron battery), a zinc-ion battery, and/or any other suitable battery utilizing any other suitable chemistry for the storage and release of electrical energy. Additionally or alternatively, the battery pack can include capacitive energy storage units such as capacitors, supercapacitors, and/or any other suitable means for storing electrical energy and releasing the electrical energy in a controllable manner.

The battery pack can include any suitable energy storage capacity which can be <10 kWh, 10 kWh, 25 kWh, 35 kWh, 50 kWh, 80 kWh, 100 kWh, 150 kWh, >150 kWh, any suitable range defined by the aforementioned values, and/or any other suitable storage capacity. Preferably, the charge rate of the battery pack (and/or individual cells within the battery pack) is limited to 2C, but can alternately be <1C, 1C, 1.5C, 2.5C, 3C, 5C, >5C, and/or any other suitable charge rate.

However, the system can include any other suitable battery pack.

The battery cells can have any suitable electrical and/or power characteristics. The battery cells can operate at any suitable voltage (e.g., 2.4V, 4.2V, nominal, max, minimum, etc.), charge current, discharge current, C-rate, energy capacity, temperature range, and/or have any other suitable characteristics. In a specific example, each battery cell in the battery pack is arranged in series. In a second specific example, two sets of battery cells (in series) in a battery pack are arranged in parallel. The battery cells in a battery pack cooperatively generate a pack voltage, which can be: <100V, 240V, 350V, 400V, 450V, 600V, >600V, any range bounded by the aforementioned values, and/or any other suitable pack voltage.

Figure 14:
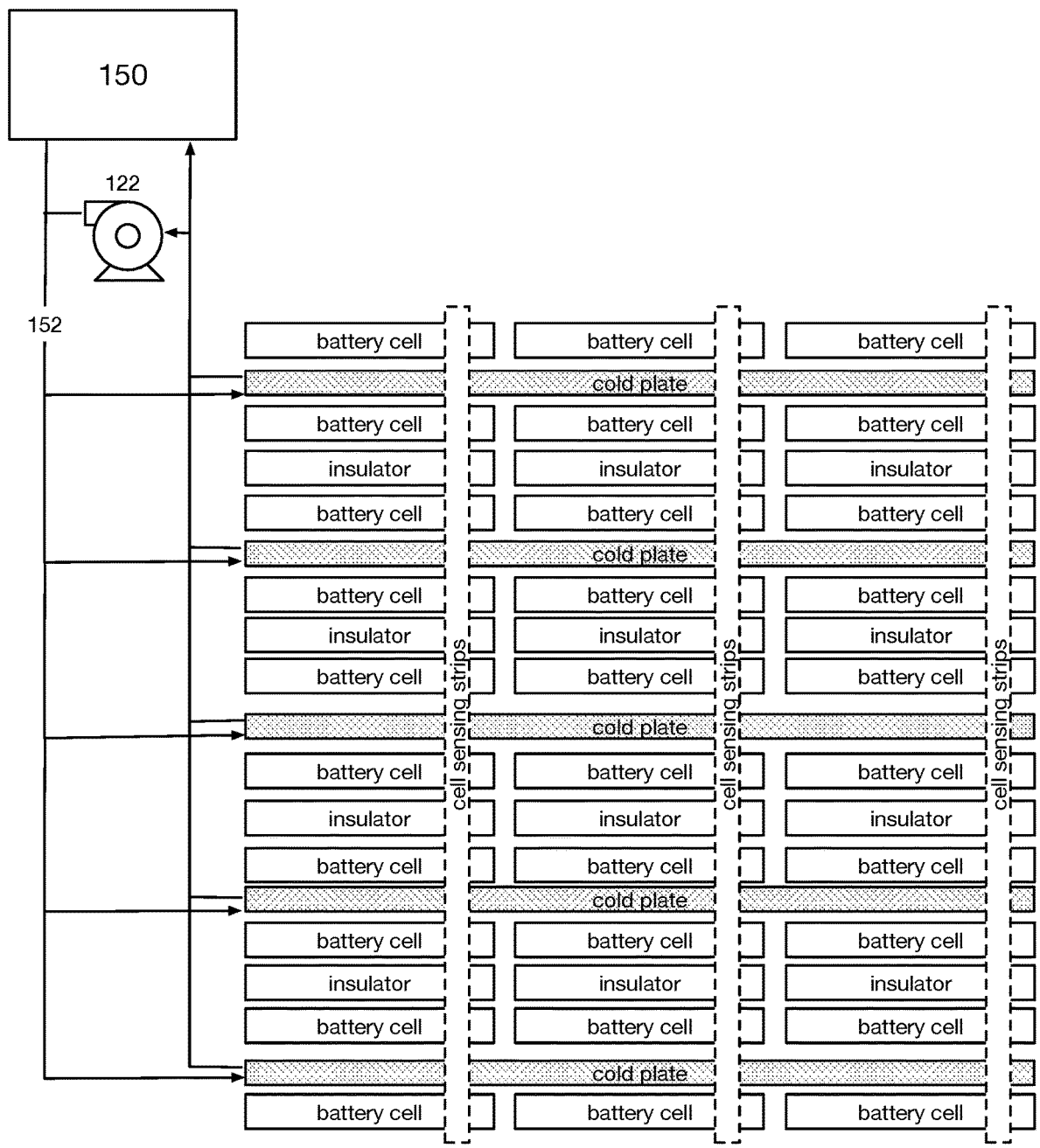
FIG. 14 depicts a schematic diagram of an example battery loop in a variant of the system.
Figure 15:
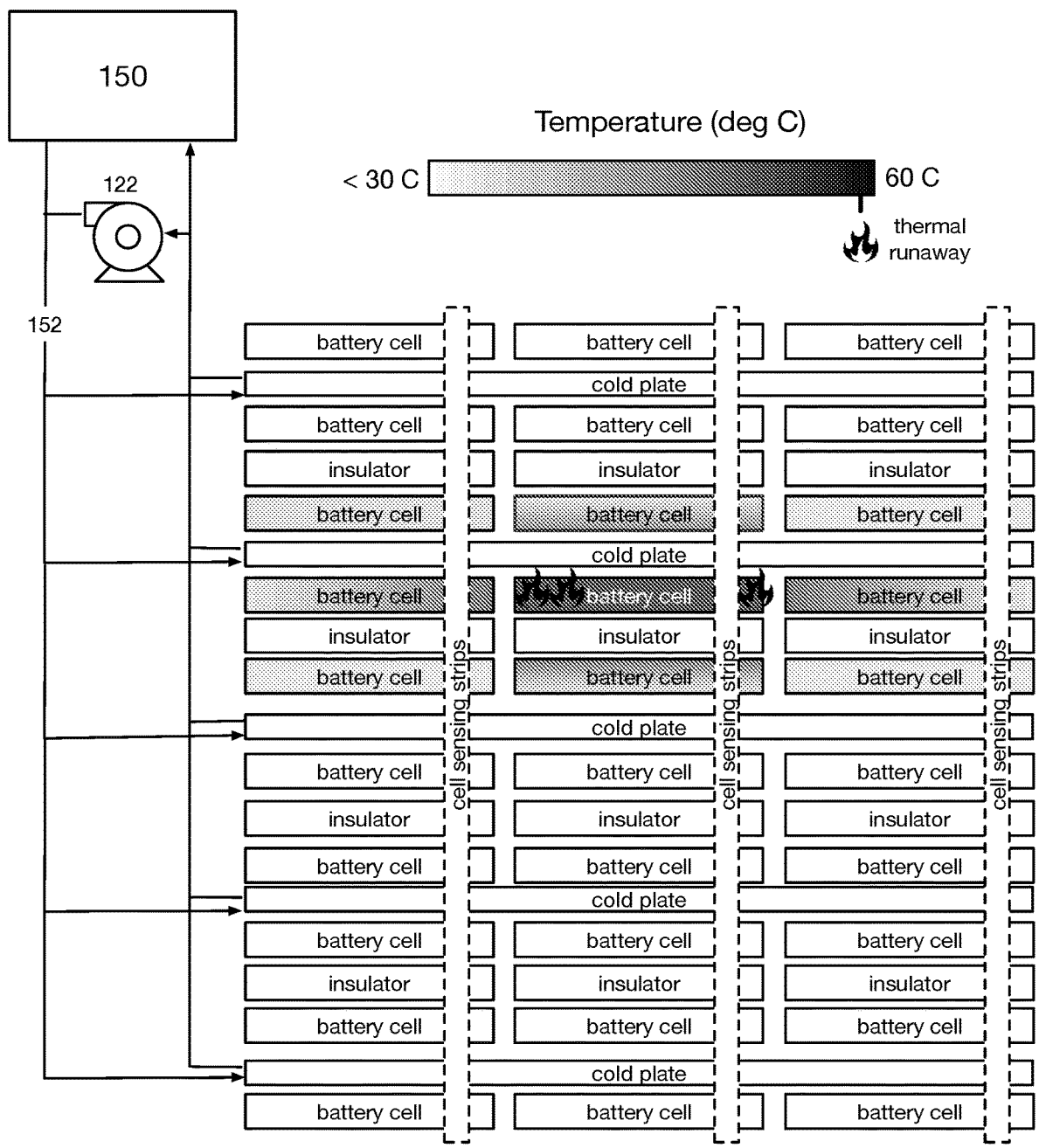
FIG. 15 depicts a schematic diagram of an example battery loop in a variant of the system.

The battery cells inside the battery pack can have any suitable geometry and/or arrangement. The battery cells can be cylindrical, button, prismatic, pouch, and/or any other suitable geometry. The battery cells are preferably arranged into multiple cell arrays (an example is shown in FIG. 14 and FIG. 15), but can be arranged in a single array or otherwise arranged. The battery pack can include thermal insulation between cells in the same array (e.g., interleaved between cells), adjacent cell arrays (e.g., interleaved between arrays), and/or any other suitable cell set. The thermal insulation can be made of any suitable material, such as polyurethane, cellulose, fiberglass, carbon fiber, polystyrene, metal, plastic, and/or any other suitable insulation material. In a specific example, cell arrays can include 12 cells, 24 cells, 28 cells, 32 cells, 36 cells and/or any other suitable number of cells per pack and/or battery heat exchanger (e.g., cold plate, heat sink). In variants, the top, bottom, and/or side (cylindrical, arcuate, broad, and/or narrow faces) of battery cells can thermally interface with a fluid loop (e.g., battery loop, cabin loop) at a heat exchanger (such as a heat sink). The thermal interface can be arranged on the side of the cell array opposing the thermal insulation, adjacent the thermal insulation, on the bottom with thermal insulation on the side, on the side with thermal insulation on the bottom, interdigitated between cell arrays, interdigitated between cells, and/or otherwise arranged relative to the cell and/or thermal insulation. The battery cells are preferably fluidly isolated from the working fluid in the fluid loop (e.g., wherein the working fluid is flows through a thermally-conductive fluid manifold, flows through a hollow heat sink, etc.), but can alternatively be fluidly connected to the working fluid.

In variants, a heat sink (e.g., chill plate) is arranged in thermal contact with a first cell and a second cell of the battery pack. The heat sink can convectively balance thermal energy between the first and second cells and/or distribute thermal load between the first cell and the second cells. In variants including thermal insulation (e.g., between adjacent cells), a thermal resistance from the first cell to the second cell through the thermal insulation exceeds a thermal resistance from the first cell to the second cell through the heat sink (and/or working fluid circulating therethrough).

However, battery can include any other suitable set of cells in any suitable arrangement.

The battery pack can include battery electronics 112, such as a battery management system (BMS). The battery electronics can be coupled to one or more battery packs (e.g., with a 1:1, 1:N, or N:1 battery electronics to battery pack relationship). The battery electronics function to monitor the state of the battery pack. The state of the battery pack can include: state of charge (SoC), state of health (SoH), state of power (SoP), state of safety (SoS), temperature (e.g., of the pack, of a cell, of a cell array, of the working fluid, a temperature distribution of cells, etc.), and/or any other suitable characteristics. The battery electronics can also function to report the state of the battery pack to other components of the battery thermal management system. The battery electronics can also function to control the charge and/or discharge of the battery pack (e.g., based on commands from a vehicle operator or computerized vehicle operation system). The battery electronics can additionally function to control the on-board thermal management subsystem and/or extravehicular infrastructure subsystem.

The battery electronics can include one or more sensors. The sensors of the battery electronics function to measure parameters of the battery pack during operation. The sensors can measure the electrically-related parameters of the battery pack (e.g., current flow through the battery pack, voltage of the battery pack, charge state of the battery pack, etc.), thermal parameters of the battery pack (e.g., temperature at any suitable point in the battery pack, temperature outside the battery pack, temperature change rate at any suitable point in or around the battery pack, etc.), flow rate of the working fluid through the battery pack (e.g., through the heat sink), and/or any other suitable parameters. Any suitable sensor type or modality can be utilized to measure the aforementioned parameters (e.g., a current probe, a shunt, a thermocouple, a thermistor, etc.). The battery electronics can include a communication module (wired or wireless) configured to communicatively connect to the on-board pump, vehicle controller, extravehicular infrastructure (e.g., off-board pump, battery charger, off-board cooling system, etc.), and/or any other suitable vehicle component/endpoint.

The battery electronics can be cooled by the same system(s) as the battery cells 114 and/or different cooling components. The battery electronics can be air cooled (e.g., fluidly connected to the air manifold, exhaust path of the air manifold extending across the battery electronics, etc.), connected to separate heat exchanger (e.g., heat sink), thermally connected to airframe, and/or otherwise cooled separately from the battery cells—thereby reducing the thermal load on the battery thermal management system. The battery electronics can be powered by the battery packs that it controls, and/or be powered by a separate battery pack.

However, the system can include any other suitable battery electronics, and/or can otherwise suitably control, monitor, and/or regulate the batteries.

Figure 11:
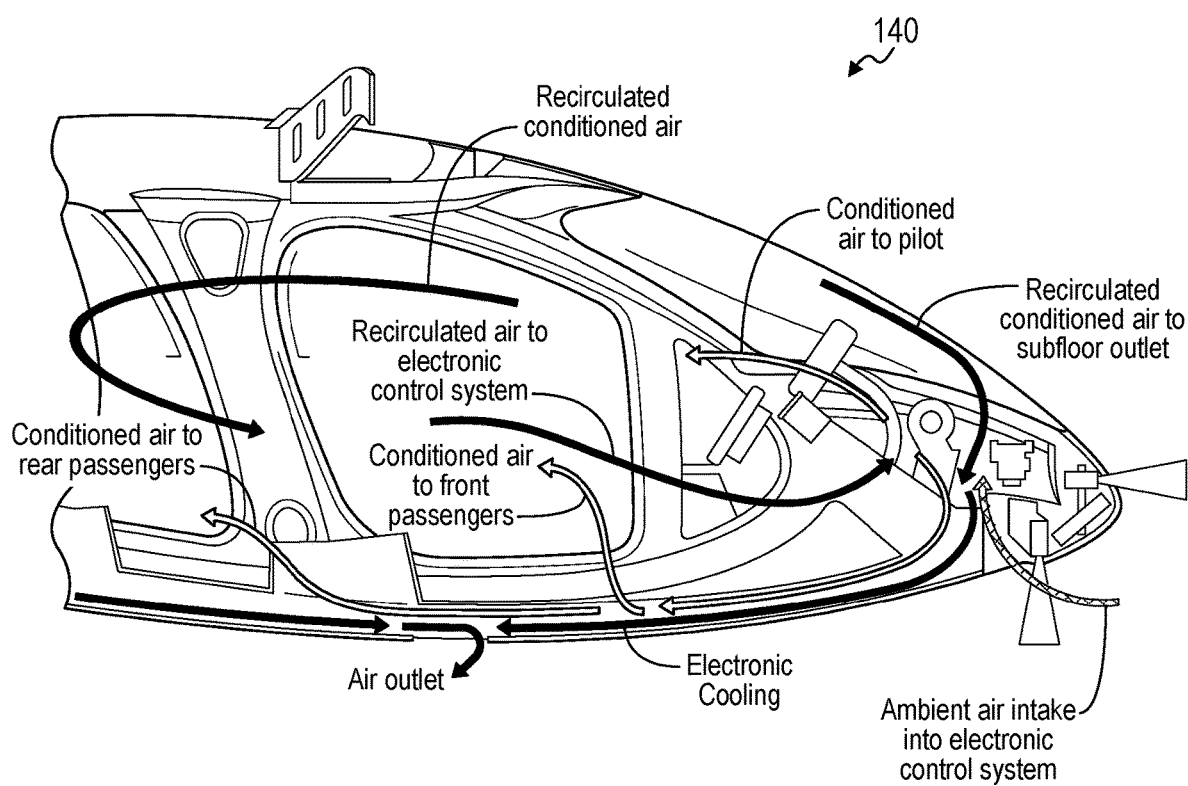
FIG. 11 depicts a partial 3D view of a variant of the system.

The on-board thermal management subsystem can include one or more air manifolds, which functions to connect the vehicle (cabin) interior 105 to a vehicle exterior 106 and regulate airflow therebetween. An example air manifold is shown in FIG. 11. The air manifold can include any suitable ducts, tubing, piping, vents, baffles, valves, and/or other suitable components which direct cabin air throughout and/or around the cabin 108 (e.g., through the aircraft housing). The air manifold can include rigid, semi-rigid, and/or flexible components. However, the air manifold can additionally or alternately include any other suitable components. In a first variation, the inlet and outlet orifice are defined by a fluidly continuous air manifold (e.g., wherein the air manifold can be fluidly connected to the cabin interior). In a second variation, the inlet and outlet orifices are defined by an inlet and outlet air manifold, respectively, wherein both inlet and outlet air manifolds are fluidly connected to the cabin interior. However, the air manifold can be otherwise configured.

Figure 2:
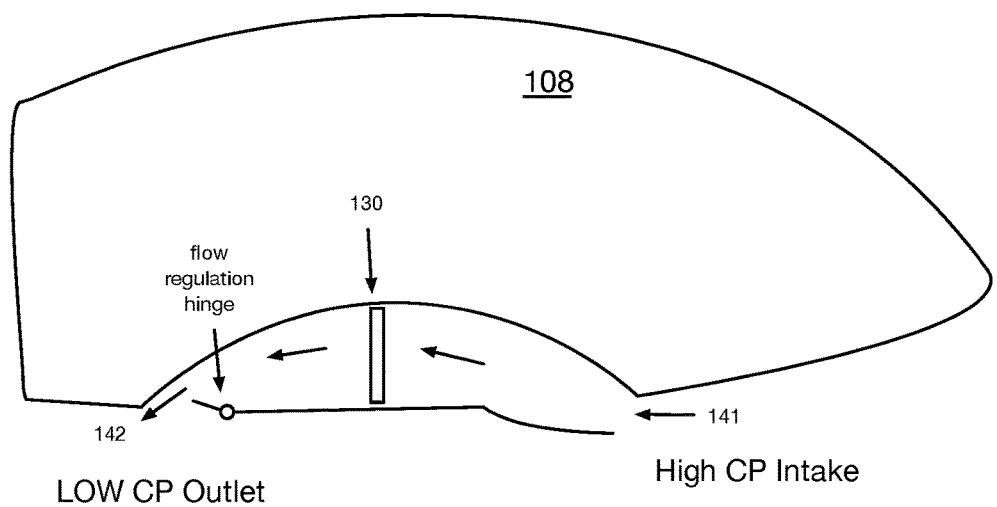
FIG. 2 depicts a schematic diagram of an example air manifold of the system.
Figure 3:
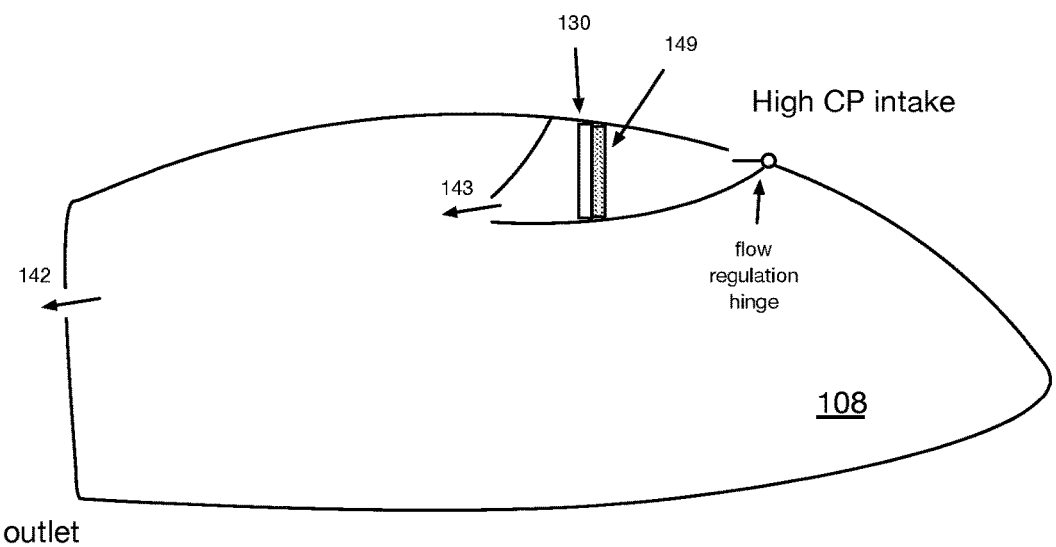
FIG. 3 depicts a schematic diagram of an example air manifold in a variant of the system.
Figure 4:
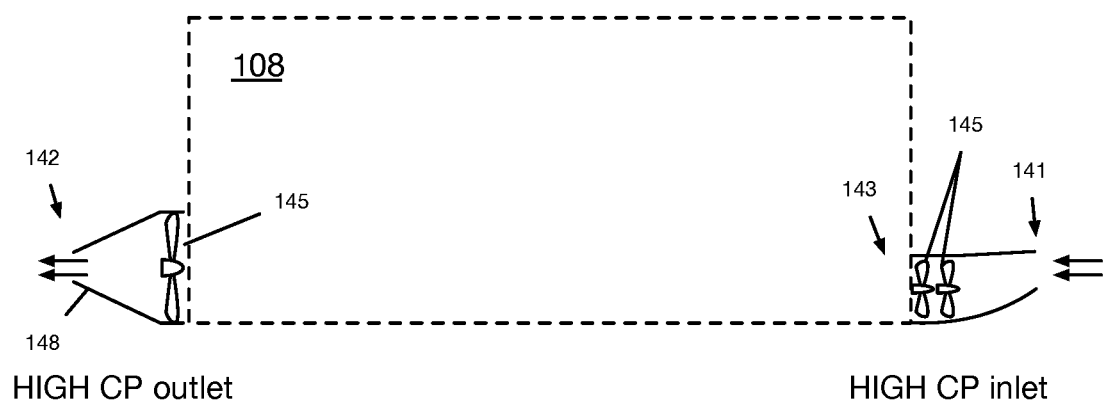
FIG. 4 depicts a schematic diagram of an example air manifold in a variant of the system.

The air manifold can include one or more exterior orifices which fluidly connect the cabin air (within the cabin interior) to the ambient air and define an airflow path therebetween. The exterior orifices can include an inlet orifice 141 which functions to draw ambient air into the air manifold. The inlet orifice(s) can be arranged relative to the vehicle in any suitable manner. Preferably, the inlet orifice is located proximal the front and/or nose of the vehicle (e.g., closer to the front than the rear); however the inlet orifice can alternately be located proximal a propulsion system of the vehicle, proximal avionics equipment on-board the vehicle, on an upper surface of the vehicle (e.g., an example is shown in FIG. 3), on a lower surface of the vehicle (e.g., an example is shown in FIG. 2), at a high pressure aerodynamic region of the vehicle (e.g., near the leading edge of an airfoil body), at a low pressure aerodynamic region of the vehicle (e.g., above airfoil body) and/or can be otherwise suitably arranged. The inlet orifices are preferably aligned with the exterior airflow, directed towards the exterior airflow (e.g., defining a central axis aligned with the longitudinal/roll axis of the aircraft, and/or otherwise suitably oriented) such that the inlet orifice directs airflow from the vehicle exterior to an interior of the air manifold. However, the inlet orifices can be otherwise oriented. The air manifold preferably includes a single inlet orifice (e.g., with redundant fans arranged serially therein—an example is shown in FIG. 4), however can include multiple redundant inlet orifices, and/or any other suitable number of inlet orifices.

The exterior orifices can include an outlet orifice 142, which functions to exhaust cabin air into the ambient environment. Accordingly, the outlet orifice can enable periodic and/or continuous rejection of gasses (such as $CO_2$ produced by passengers) from the vehicle in compliance with regulatory standards. In a specific example, the cabin air can be fully exhausted from the outlet orifice (and replenished through the inlet orifice) every 2 minutes. The outlet orifice can be arranged relative to the vehicle in any suitable manner. Preferably, the outlet orifice is arranged along a lower surface of the vehicle (e.g., an example is shown in FIG. 2) and/or proximal a rear of the vehicle (e.g., closer to the rear than the front, an example is shown in FIG. 3), however the outlet orifice can alternately be arranged on an upper surface of the vehicle, at a high pressure aerodynamic region of the vehicle (e.g., near leading edge of an airfoil body), at a low pressure aerodynamic region of the vehicle (e.g., above airfoil body) and/or can be otherwise suitably arranged. The outlet orifice is preferably oriented along (e.g., within 15 degrees) of the direction of airflow (e.g., during forward flight), oriented in a direction opposing the inlet, and/or otherwise suitably oriented. The outlet orifice can have any suitable geometry. The outlet orifice geometry can be: tapered in the direction of air flow out of the orifice (e.g., a nozzle, narrowing toward the rear of the vehicle), one or more slots (e.g., extending in a spanwise direction), round hole, rectangular opening, and/or include any other suitable geometry. The air manifold preferably includes a single outlet orifice, however can include multiple redundant outlet orifices, one outlet orifice per inlet orifice, and/or any other suitable number of outlet orifices.

However, the air manifold can include any other suitable exterior orifices.

The air manifold can include interior vents 143, which function to direct cabin air, such as towards passengers and/or cabin components requiring thermal conditioning (e.g., window). The air manifold can include any suitable number of interior vents, such as 1 per passengers/seats, multiple per passenger/seat, a single vent directing air towards multiple passengers/seats, and/or any other suitable number of interior vents. The interior vents can optionally include defogging vent arranged along a window such as a front windscreen. In such variants, the interior vent functions to vent waste heat (e.g., from battery and/or avionics equipment) towards the window to reduce condensation and improve the optical connection through the window to the vehicle exterior. In an example, interior vents can include a slot extending along the base of the windshield connecting the windshield to the air manifold. The slot can be selectively connected to the exhaust path (e.g., after air passes over avionics equipment, the air can be exhausted out the slot and back into the cabin as an alternative to exhausting air out of the aircraft) and/or a cabin heat exchanger (e.g., concurrently with heating the cabin via a remainder of interior vents, as the primary form of cabin heating). The air manifold can optionally include interior air (cabin air) intakes 144, which function to enable recirculation of cabin air. Interior air intakes can be arranged along the floor, front, rear, and ceiling of the vehicle interior. The air manifold can include any suitable number of interior air intakes, which can include one interior intake per interior vent, multiple interior intakes for a single interior vent, and/or a single interior intake associated with multiple interior vents.

The on-board thermal management subsystem can define any suitable air flow paths (e.g., along ducts of the air manifold) of cabin air. The air manifold can establish an air flow path between and/or fluidly connect: the inlet orifice to the outlet orifice, the inlet orifice to the interior vents, the interior intakes to the interior vents, the interior intakes to the outlet orifice (a.k.a. outlet flow path), the interior intake to the cabin heat exchanger, the inlet orifice to the cabin heat exchanger (a.k.a. inlet flow path), the cabin heat exchanger to the interior vent, and/or can connect any other suitable flow paths. In variants, portions of the air manifold (e.g., one or more of the aforementioned flow paths) are thermally connected to on-board electronics and/or fluidly coupled to on-board electronics (e.g., battery electronics, avionics equipment, flight computers, heat generating electronics equipment, etc.). In variants, it can be advantageous to fluidly connect on-board electronics along an exhaust path between an interior air intake and the outlet orifice (e.g., fluidly connect on-board electronics to exhaust cabin air). In such variants, the thermal load applied to the on-board thermal management system by the on-board electronics is in series with (and sequentially after) the cabin environment. In cases where ambient temperatures exceed the cabin temperature, this results in higher efficiency cooling of on-board electronics than direct ambient cooling. Additionally, such variants can minimize the volume of air passing through the inlet orifice(s), since the same volume of air can be used to both condition the cabin and cool the on-board electronics.

In an example, a processor of the aircraft is arranged within a housing and thermally connected to a heat sink. An exhaust duct of the air manifold connects the cabin interior to the housing and the housing to the outlet orifice, wherein the exhaust path passes through the interior of the housing. Cabin air vented along the exhaust path passes over the heat sink, cooling the processor by forced air convection and rejecting the heat generated by the processor from the aircraft. In this example, cooling the processor can occur without supplying additional thermal load to the cabin, while utilizing the air manifold components.

In a second example, avionics equipment is arranged below a glare shield, which can reduce the solar load on the avionics equipment. Exhaust air within the exhaust path is ducted by the air manifold below the glare shield and across the avionics equipment, before being expelled from the vehicle (e.g., directed out of a rear facing nozzle).

However, on-board electronics equipment can be otherwise cooled using the air manifold, or cooled by a separate component.

The air manifold can include fans 145, which function to increase air velocity and/or pressure within various portions of the air manifold. Fans can additionally function to transport air through the air manifold. The air manifold can include any suitable type of fans. Fans can be: air compressors, centrifugal, cross flow, axial flow, blower fan, air mover, impeller, and/or any other suitable type. Fan are preferably ducted through an interior of the air manifold, but can alternately be unenclosed or operated without fan shroud. Fans can be any suitable size and/or power. In a specific example, fans along air intake/exhaust path are each individually sized to fully replace the volume of cabin air within a threshold time period (e.g., 2 minutes). In a second example, a fan can be 100 W. Fans can have any suitable arrangement within the air manifold. Fans can be arranged in series along a single air flow path (e.g., through the exterior air inlet and/or outlet) and/or in parallel along separate (e.g., adjacent, redundant) ducts.

Fans can be arranged along the exterior orifices (e.g., inlet, outlet) and/or interior vents/intakes. In variants, it can be advantageous to pressurize and/or accelerate exhaust cabin air out of the outlet orifice to reduce pressure drag at the exhaust orifice (e.g., for depressurized cabins). In a specific example, applying 100 W of power to a fan or other air compressor along the exhaust flow path can offset 1 kW of propulsive thrust which would otherwise be required to counteract the drag created by the otherwise low outlet velocity of air at the outlet orifice.

Fans can be arranged along interior flow paths to regulate cabin air recirculation and/or direct air toward passenger seats. Fans can be located proximal interior vents, within air manifold ducts (e.g., diverting to interior vents/intakes), and/or otherwise suitably arranged. In a specific example, a fan can be mounted to and/or integrated with a liquid-air heat exchanger (e.g., cabin heat exchanger). In a second variant, fans can duct cabin air through a liquid-air heat exchanger.

The air manifold can optionally include a set of valves, which function to selectively couple (and/or isolate) the cabin air from the cabin exterior. Air valves can be arranged along the cabin intake path, exhaust path, and/or cabin air recirculation path. Air valves can include: throttling valves, check valves, binary position valves (e.g., stop/start valves), linear valves, rotary valves, solenoid valves, ball valves, butterfly valves, diverter/directional valves, and/or any other suitable type of valves.

The air manifold can optionally include a filter 149 (e.g., such as HEPA filter) arranged along an inlet path proximal the inlet orifice (e.g., before air initially enters cabin).

Cabin air within the air manifold and cabin environment can be pressurized, such that the cabin pressure exceeds an ambient pressure, or depressurized. Depressurized cabin air can be equilibrated to an ambient pressure, within a threshold percentage of ambient pressure, such as within 5%, within 10%, and/or otherwise depressurized. In variants, for short cycle, electric, and/or urban aircraft: utilizing a depressurized cabin can eliminate the structural/weight penalty associated with a pressurized cabin, thereby increasing the vehicle efficiency and effective range. Accordingly, equilibrating the cabin pressure with ambient pressure can increase improve the efficiency of the vehicle and/or on-board thermal management subsystem.

In variants, the air manifold can include a turbine 147 arranged along the inlet air flow path (e.g., between the exterior inlet orifice and the cabin interior), which functions to convert energy of the inlet flow into usable energy. Additionally, the turbine can function to reduce the temperature of the inlet flow. Additionally or alternatively, the turbine can reduce the pressure of the inlet flow and/or equilibrate the pressure of the inlet flow with an ambient pressure. In a specific example, at cruise speed (e.g., 200 mph), air within inlet flow can be 3-5 deg C. above ambient temperatures as a result of the dynamic pressure at the inlet orifice. Additionally or alternatively, in some cases ambient air can be 20 deg C. or more above the desired cabin temperature (e.g., for a cabin temperature setpoint of 20° C.). By harvesting energy from the inlet flow with a turbine, the temperature of the inlet air can be reduced, which accordingly reduces the required cooling of the on-board thermal management subsystem (in the cooling mode). Additionally or alternatively, the harvested energy can be used to power a fan along the exhaust path (pressurizing flow through outlet nozzle 148, and decreasing drag on the vehicle).

Figure 5:
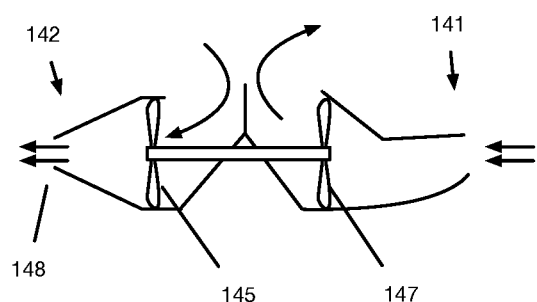
FIG. 5 depicts a schematic diagram of an example intake turbine in a variant of the system.
Figure 6:
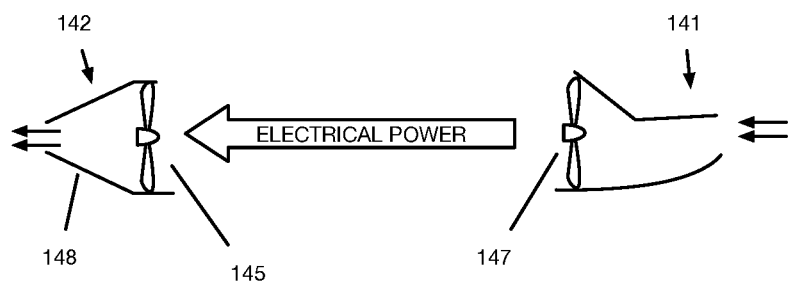
FIG. 6 depicts a schematic diagram of an example intake turbine in a variant of the system.

The turbine can include airfoil fins (blades) which are mechanically coupled to a central shaft (e.g., in a radial direction). The flow across the airfoil fins induces mechanical rotation of the shaft. The turbine is preferably sized to extract enough power to power an outlet fan or other powered component from the inlet flow during vehicle operation (e.g., flight), but can alternatively be sized to extract more or less. In a first variant, a generator is connected to the shaft and converts the rotational energy into electrical energy, which can be used to power an electrical fan or stored in battery for subsequent use. An example is shown in FIG. 6. In a second variant, the central shaft is mechanically coupled to the outlet fan by a central shaft. An example is shown in FIG. 5. However, a turbine can be otherwise suitably implemented.

However, the air manifold can include any other suitable components.

Figure 7:
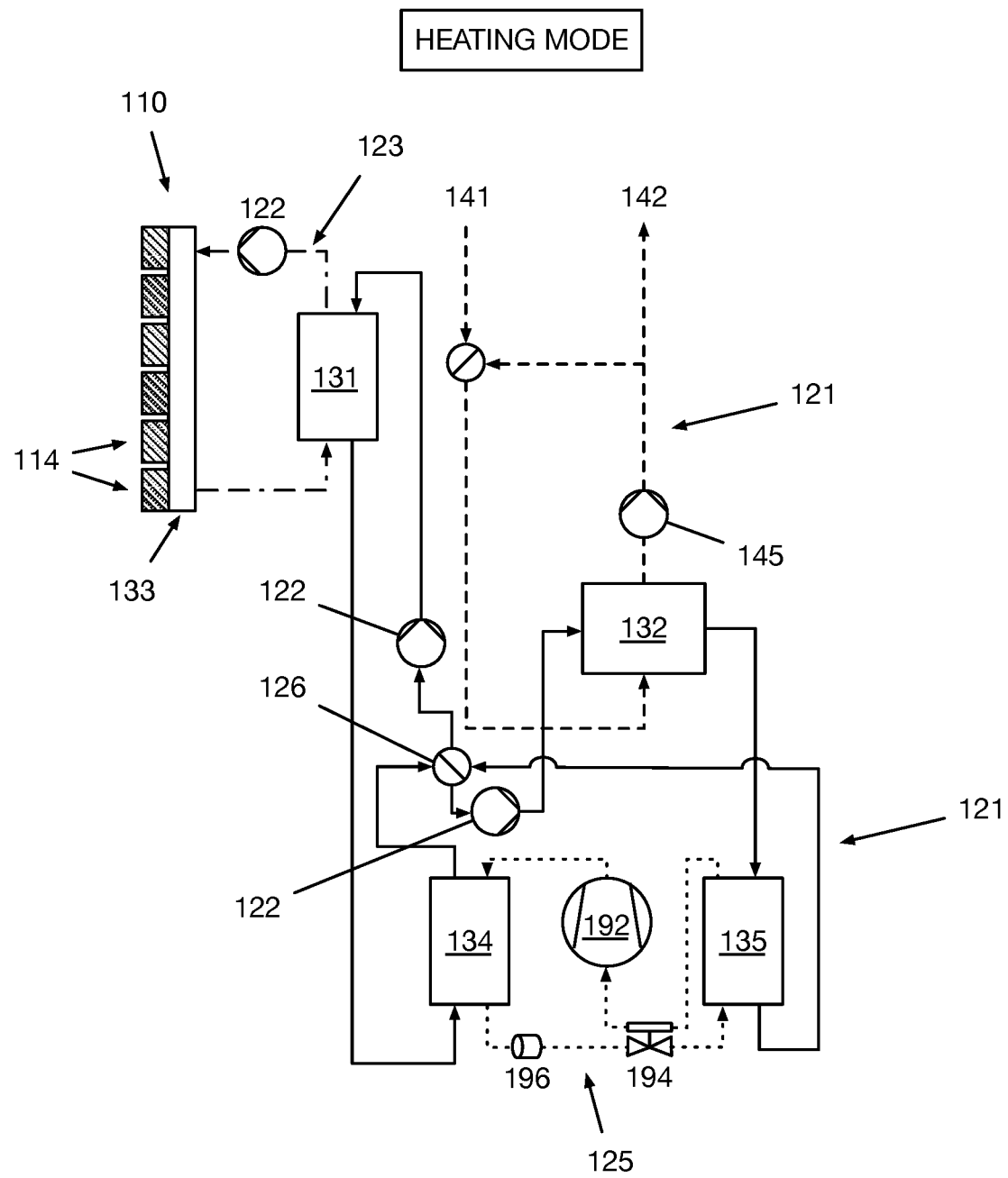
FIG. 7 depicts a schematic diagram of a variant of the system in a cabin heating mode.
Figure 8:
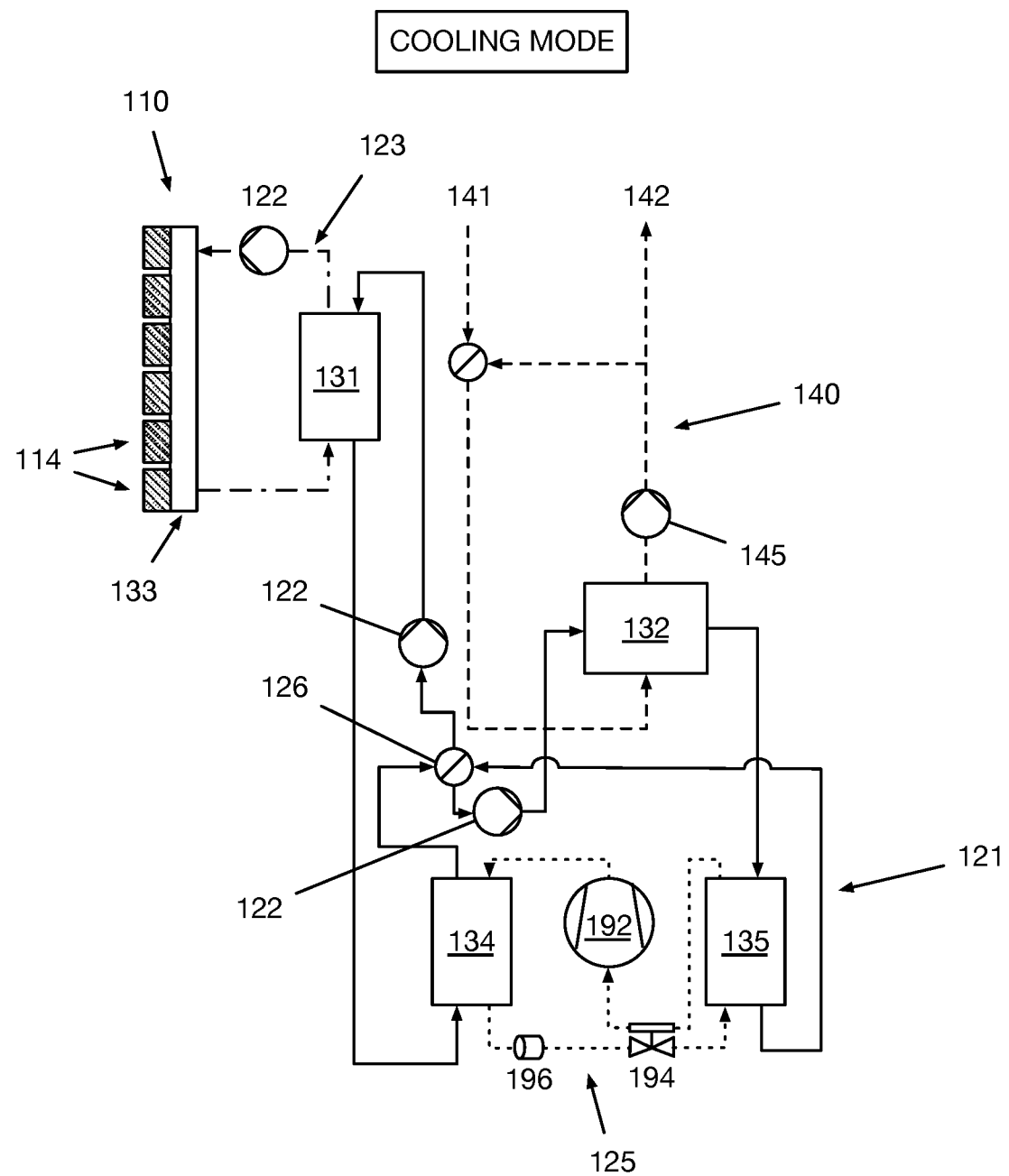
FIG. 8 depicts a schematic diagram of a variant of the system in a cabin cooling mode.

The on-board thermal management subsystem can include one or more fluid loops which function to transport thermal energy and/or establish thermal communication between components of the on-board thermal management system. Fluid loops can additionally function to enclose/contain a working fluid which stores thermal energy and/or increases the thermal capacity of the on-board thermal management subsystem. Fluid loops can additionally function to establish fluid communication between two or more thermal interfaces (e.g., at heat exchangers). Fluid loops can be single modal and/or multi-modal, configurable between: a heating mode (e.g., an example is shown in FIG. 7), cooling mode (an example is shown in FIG. 8), and/or fluid circulation mode. In an example, a battery loop (an example is shown in FIG. 9) operates uniformly, continuously, and/or exclusively in a fluid circulation mode. In a second example, a cabin loop is configurable between a heating mode and a cooling mode.

The set of fluid loops preferably includes a cabin loop; and can optionally include a battery loop, a refrigeration loop, and/or any other suitable fluid loops.

Figure 10:
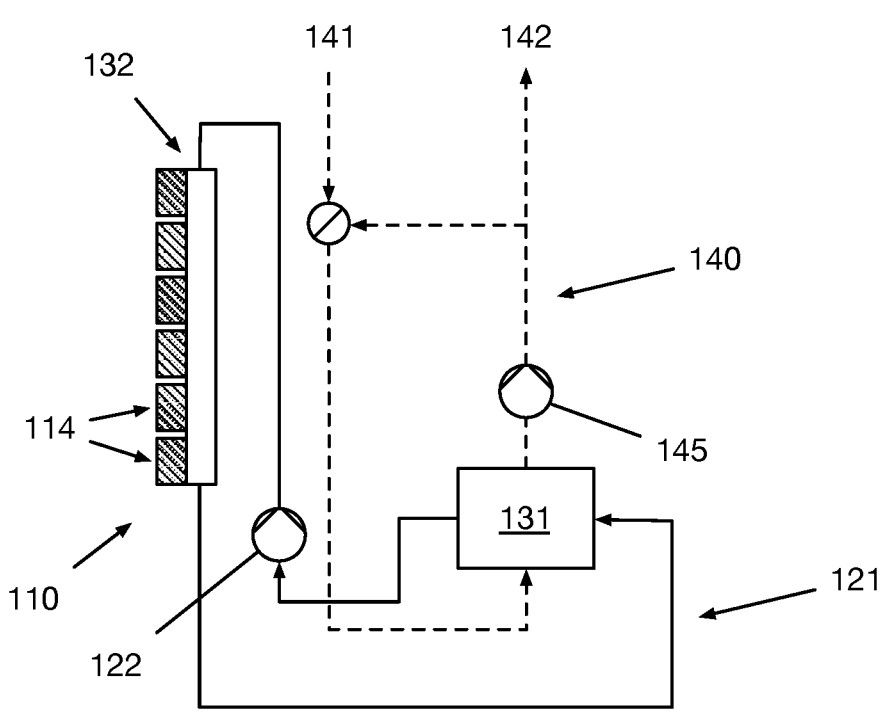
FIG. 10 depicts a schematic diagram of a variant of the system.

The cabin loop preferably thermally and/or fluidly connect a first heat exchanger (e.g., battery heat exchanger) in thermal communication with the battery pack to a second heat exchanger (e.g., cabin heat exchanger) in fluid and/or thermal communication with the cabin air. An example is shown in FIG. 10.

The battery loop preferably thermally and/or fluidly connects the battery pack (and/or a heat exchanger in conductive thermal contact with the battery pack) to the cabin loop. In a specific example, the battery loop can be the circulation subsystem described in U.S. application Ser. No. 16/857,003, filed 23 Apr. 2020, which is incorporated in its entirety by this reference. However, other battery loops can be used.

The refrigeration loop is preferably a refrigeration system and/or heat pump (e.g., reversible heat pump). The refrigeration loop can include: a refrigerant manifold, an evaporator 135, a condenser 134, and/or other components. The refrigeration loop's (and/or refrigeration system's) thermal capacity can be underspecified (e.g., be less than the estimated excess heat) for: the combination of the battery and cabin, the battery, or the cabin; be specified for the battery only or the cabin only; be overspecified, or otherwise configured. Alternatively, the on-board thermal management subsystem can exclude a refrigeration loop, only include a refrigeration loop for the cabin, only include a refrigeration loop for the battery, or be otherwise configured.

However, the on-board thermal management subsystem can include any other suitable fluid loops.

Different fluid loops are preferably fluidly isolated from each other, but can alternatively be fluidly connected to each other (e.g., wherein the different fluid loops are sub-loops of a larger loop), selectively fluidly connected to each other (e.g., via one or more valves), or otherwise fluidly related. Different fluid loops are preferably thermally connected to each other (e.g., via heat exchangers, heat pumps, thermal interfaces, thermally conductive manifold sides, etc.), but can alternatively be thermally isolated from each other, selectively thermally connected to each other (e.g., via one or more valves, heat exchangers, etc.), or otherwise thermally related.

Each fluid loop can include: a working fluid 152, one or more heat exchangers 130 (e.g., interior volume therein—such as one side of a fluid-fluid heat exchanger; fluid interior of a gas-fluid heat exchanger), a pump 122, a fluid manifold 124, and a reservoir 150. The fluid loops can optionally include: a heater, a set of valves 126 (e.g., 4-way switching valve), a de-ionizing filter. However, the fluid loops can include any other suitable components.

The fluid loops can include a working fluid which functions as a medium for exchanging heat between heat exchangers (and the thermal interfaces therein) of the fluid loop. For example, the working fluid can be water, a water/glycol mixture (e.g., 50/50, 70/30, 80/20, etc.), a refrigerant (e.g., R134a), an oil, air, fluid coolant, mineral oil, any other suitable gas or gas mixture, and/or any other suitable fluid. In variants, the working fluid can be a non-hazardous, natural, or bio-degradable fluid in order to minimize the environmental impact of leaks or spills. In variants, the working fluid can be non-conductive (e.g., mineral oil), which can eliminate the possibility of shorting electronics and/or enable flood cooling of the battery cells 114 (e.g., in a fully submersed configuration).

In variants, two or more fluid loops of the on-board thermal management subsystem can include different types of working fluid and/or distinct volumes of working fluid which are fluidly isolated from one another. In a first example: a battery loop 123 can include a first working fluid which is replenished, replaced, and/or recirculated during pre-conditioning. In a second example, a cabin loop 123 can include a second working fluid which is fluidly isolated from a first working fluid within the battery loop. The second working fluid can be the same type (e.g., water/glycol mixtures), while remaining fluidly isolated during one or more modes of operation. In a third example, a refrigeration loop 125 contains a third working fluid, such as a refrigerant, which is fluidly isolated from the first working fluid and the second working fluid.

However, the fluid loops can include any other suitable working fluid(s).

The fluid loops can include one or more heat exchangers, which function to transfer thermal energy between various mediums of the system and/or establish a thermal interface between two mediums. Heat exchangers can be any suitable type of heat exchanger. The heat exchangers are preferably active (e.g., transferring thermal energy through forced convection, heat pumping, etc.), but can additionally or alternatively be passive (e.g., be conductive elements).

In a first variation, heat exchangers can be solid-fluid type heat exchangers 133, which transfer thermal energy between a solid body and a fluid (e.g., working fluid, air, etc.), and can be: chill plates, hot plates, cold plates, heat sinks, and/or any other suitable solid-fluid heat exchanger. In a specific example, the fluid loop (e.g., battery loop) includes a solid-fluid heat exchanger which is thermally connected to one or more cells of the battery pack and establishes a thermal interface between the working fluid within the fluid loop. The working fluid is fluidly connected to a fluidic interior of the heat exchanger, such as one extending between an inlet port and an outlet port of the heat exchanger. Solid-fluid heat exchangers can optionally include thermal interface materials (TIMs) which establish thermal contact between the solid body (e.g., heat generating component) and a remainder of the heat exchanger at the thermal interface. TIMs can include: thermal grease, thermal adhesive, thermal gap filler, thermally conductive pads (e.g., silicone sheet), thermal tape, a phase change material, a metal TIM, a compressive/elastomeric TIMs, and/or any other suitable TIM(s). In a first example, a TIM can be a thermally conductive elastomer sandwiched between a cold plate and the battery pack. However, other suitable solid-fluid heat exchangers can be used.

In a second variation, heat exchangers can be fluid-fluid type heat exchangers which functions to establish thermal communication between two fluids. Fluid-fluid type heat exchangers can include gas(air)-liquid type heat exchangers which functions to establish thermal communication between a fluid loop and/or working fluid therein and a gas (such as cabin air). Gas-liquid type heat exchangers can include radiators, oil coolers, and/or any other suitable types of heat exchangers. In a first example, a gas-liquid heat exchanger (e.g., cabin heat exchanger) is within a fluid loop, and encloses a portion of working fluid within an interior-such as between an inlet port and an outlet port.

In the first example, the gas-liquid type heat exchanger is arranged within an interior of the air manifold (e.g., in a cross-flow arrangement, along a recirculation flow path, etc.), with cabin air (and/or exterior air passed through the air manifold inlet) ducted across exterior surfaces of the heat exchanger (e.g., fins, parallel plates, etc.). The material body of the heat exchanger establishes a thermal interface between the air passing over the exterior of the heat exchanger and the fluid interior. Fluid communication of the working fluid and the heat exchanger enables convective heat transfer (convective thermal communication) therebetween. Fluid communication of the cabin air and the exterior of the heat exchanger enables convective heat transfer (convective thermal communication) therebetween. The structure of the heat exchanger can conductively transfer thermal energy between the interior and the exterior. The combination of exterior convection, conduction, and internal convection establishes a thermal interface between the working fluid and the cabin air.

However, other suitable gas-liquid type heat exchangers can be used in any other suitable position.

Fluid-fluid type heat exchangers can include liquid-liquid type heat exchangers (and/or liquid-refrigerant heat exchangers) which establish thermal communication between two fluid loops. Alternately, liquid-liquid (or liquid-refrigerant) type heat exchangers can function to define a thermal interface between two fluid loops. Liquid-liquid (or liquid-refrigerant) type heat exchangers can be: parallel flow heat exchangers, counter-flow heat exchangers, cross-flow heat exchangers, shell-and-tube heat exchangers, plate heat exchangers, plate-fin heat exchangers, plate-shell heat exchangers, and/or any other suitable heat exchangers. Liquid-liquid (or liquid-refrigerant) type heat exchangers include a first interior enclosing a first working fluid within the first fluid loop (e.g., the first interior extending between a first inlet port and a first outlet port of the heat exchanger) and a second interior enclosing a second working fluid within the second loop (e.g., the second interior extending between a second inlet port and a second outlet port of the heat exchanger). Fluid communication of the each working fluid and the heat exchanger enables convective heat transfer (convective thermal communication) therebetween. The structure of the heat exchanger can conductively transfer thermal energy between the first interior and the second interior. The combination of convection with the first working fluid, conduction through the structure of the heat exchanger, and convection with the second working fluid establishes a thermal interface between the first and second working fluid. Similarly, this thermal interface thermally connects the first loop and the second loop at the heat exchanger. Liquid-liquid (or liquid-refrigerant) type heat exchangers can be considered to be 'within' each fluid loop defining a fluid path extending through an interior of the heat exchanger. Alternately, liquid-liquid (or liquid-refrigerant) type heat exchangers can be considered to be 'within' each fluid loop associated with a working fluid which is in fluid communication with an interior of the heat exchanger.

In a specific example, a liquid-liquid type heat exchanger (e.g., battery heat exchanger) can connect the battery loop (in thermal communication with the battery pack) and the cabin loop.

In a second specific example, a liquid-refrigerant type heat exchanger can connect a refrigeration system to the cabin loop. Liquid-refrigerant type heat exchangers can operate as the evaporator 134 and/or condenser 135 of a refrigeration system. It should be noted that in various operation modes, the refrigerant can be a liquid, gas, and/or liquid-gas mixture.

However, other suitable liquid-liquid (or liquid-refrigerant) type heat exchangers can be used in any other suitable position.

Heat exchangers can thermally and/or fluidly connect: the battery pack to the cabin loop, the cabin loop to the battery loop, the cabin loop to the cabin air, the refrigerant loop to the cabin loop (e.g., to a first and/or second subloop therein), and/or otherwise suitably connect fluid loops within the on-board thermal management subsystem. However, heat exchangers can be otherwise suitably arranged within the fluid loops and/or fluidly connect the fluid loops in any appropriate manner.

Heat exchangers can be located within the wings of the aircraft, mounted to the battery pack and/or within a housing of the battery pack, located within the air manifold and/or along an airflow path of the air manifold, and/or otherwise suitably distributed about the aircraft. However, heat exchangers can be otherwise distributed about the vehicle in any suitable locations.

The system can include any suitable number of heat exchangers. Preferably, each fluid loop includes (e.g., is thermally and/or fluidly connected to) at least two heat exchangers. The battery loop preferably includes at least one solid-fluid type heat exchanger per battery pack and one liquid-liquid type heat exchanger connecting the battery loop to the cabin loop. In a first example, wherein the aircraft includes 4 battery packs, the battery loop includes 5 heat exchangers. However, the battery loop can include any suitable number of heat exchangers. In a second example, the cabin loop can include two heat exchangers—the battery heat exchanger 131, establishing thermal communication between the cabin loop and the battery pack (and/or battery loop), and the cabin heat exchanger 132. In a third example, the cabin loop includes 4 heat exchangers: the battery heat exchanger 131, the cabin heat exchanger 132, the evaporator 135, and the condenser 134. The on-board thermal management subsystem can include: 2, 3, 4, 5, 6, 8, and/or any other suitable number of heat exchangers. However, there can be any other suitable number of heat exchangers.

Heat exchangers can include ports which fluidly connect the heat exchanger to the fluid manifold of a fluid loop. According to the direction of working fluid flow through a fluid loop (e.g., established based on orientation and/or operation of a pump), the set of ports can include at least one inlet port and at least one outlet port for each fluid loop, an interior of the heat exchanger fluidly connecting the inlet port to the outlet port(s) associated with a common loop, the working fluid flow path within the fluid loop extending from the inlet port to the outlet port through the interior. Each heat exchanger can include a single fluid flow path for each working fluid, two fluid flow paths associated with different working fluids, multiple fluid flow paths associated with a single working fluid, and/or any suitable number of fluid pathways extending therethrough. However, heat exchangers can include any other suitable ports.

The heat exchangers of the on-board thermal management subsystem can include a battery heat exchanger which functions to thermally connect the battery (and/or battery loop) and the cabin loop. In a first variant where the on-board thermal management subsystem includes a battery loop and a cabin loop, the battery heat exchanger can be a liquid-liquid type heat exchanger which establishes thermal communication between the battery loop and the cabin loop, wherein the battery heat exchanger is within both the battery loop and the cabin loop. In a second variant, the battery heat exchanger is a solid-liquid type heat exchanger arranged within the cabin loop in fluid communication with the working fluid within the cabin loop, wherein the battery heat exchanger is in conductive thermal contact between one or more battery cells of the battery pack. In this variant, the battery heat exchanger establishes thermal contact along a thermal interface between the battery pack and the cabin loop. In a third variant, wherein the working fluid within cabin loop comprises a refrigerant, the battery heat exchanger comprises a condenser (e.g., wherein the working fluid flows from an inlet at a first end through an interior of the battery heat exchanger to an outlet at a second end of the battery heat exchanger; in a cabin cooling mode) and/or an evaporator (e.g., wherein the working fluid flows from the second end through an interior of the battery heat exchanger to the first end of the battery heat exchanger; in a cabin heating mode). However, the on-board thermal management subsystem can include any other suitable battery heat exchanger.

The heat exchangers of the on-board thermal management sub-system can include a cabin heat exchanger which fluidly connects the on-board thermal management subsystem to the cabin air (within the cabin air manifold). The cabin heat exchanger is preferably a gas-liquid type heat exchanger arranged within an interior of the air manifold in a ducted configuration. Alternately, the cabin heat exchanger can be arranged within the cabin interior (e.g., separate from the air manifold) and/or otherwise suitably arranged.

The heat exchangers of the on-board thermal management sub-system can optionally include an evaporator and a condenser (e.g., with terms assigned according to the phase of refrigerant passing therethrough and/or portions of a refrigeration cycle). In a first variant, wherein the set of fluid loops includes cabin loop and a refrigeration loop, the evaporator and condenser are each liquid-refrigerant type heat exchangers which establish thermal communication between the cabin loop and a refrigeration loop. In a second variant, the one of the evaporator/condenser is arranged within the battery loop and the other is located within the cabin loop. In a first example of the second variant, in a heating mode, the evaporator is within the battery loop and the condenser is within the cabin loop. In a second example of the second variant, in a cooling mode, the condenser is within the battery loop and the evaporator is within the cabin loop. In a third variant, wherein the working fluid within the cabin loop is a refrigerant, the evaporator can be synonymous with the cabin heat exchanger (e.g., in a cooling mode) and the condenser can be synonymous with the battery heat exchanger (e.g., in a cooling mode).

However, the system can include any other suitable heat exchangers.

The fluid loops can include a fluid manifold which functions to contain the working fluid and fluidly connect a remainder of components of the fluid envelope. The fluid manifold can fluidly connect and/or terminate at the pump(s) within the fluid loop, the heat exchangers within the fluid loop, a fluid coupling 174, a reservoir, and/or any other suitable components, connected in any combination of series and/or parallel. The fluid manifold can include piping, valves, and/or any other suitable fluid handling components. The fluid manifolds can be: tubing, formed by the cabin or aircraft housing, or otherwise defined. The fluid manifold can be thermally conductive, thermally uninsulated, partially insulated (e.g., along a portion of the periphery), or thermally insulated from the environment/ambient conditions. The fluid manifold can be constructed of any suitable materials such as: metals, plastics, polymers, rigid materials, non-rigid materials, or any suitable combination thereof. The material of the of the fluid manifold is preferably selected to correspond to the properties/requirements of the working fluid (e.g., to avoid corrosion or other deleterious interactions, avoid degradation in high and/or low temperature conditions, meet pressure requirements of the vehicle cabin thermal management system, minimize head loss in the on-board thermal management subsystem, etc.), but can additionally or alternatively be selected with any suitable basis.

However, the fluid loops can include any other suitable fluid manifold.

The fluid loop(s) of the on-board thermal management subsystem can include a pump (a.k.a. an on-board pump), which functions to circulate working fluid through the fluid loop. Pumps can be arranged within any suitable portions of the loop, with any suitable relationship to other components connected by the fluid manifold. The operation of the pump and/or pumping action preferably dictates the direction of working fluid flow and/or the working fluid flow path through the fluid loop. In variants, the pump and/or reversing valves can modify the direction of working fluid flow through one or more portions of the loop. Fluid loops can include any suitable number of pumps. Preferably each fluid loop includes at least one pump, however fluid loops can include multiple pumps arranged in series and/or parallel. In a first variant, in one or more operational modes (e.g., cabin heating mode) two pumps can be redundantly arranged in series, each configured to independently transport working fluid through a fluid loop. In a second variant, a 4-way switching valve within the cabin loop can selectively fluidly and/or thermally isolate a first portion of working fluid from a second portion of the working fluid (e.g., in a cabin cooling mode), subdividing the cabin loop into subloops 127 including: a first subloop (the first portion of working fluid within the first subloop) and a second subloop (the second portion of working fluid within the second portion). In the second variant, a first pump transports the first portion of working fluid through the first subloop and a second pump transports the second portion of working fluid through the second subloop.

In variants including a battery loop, the battery loop preferably includes at least one on-board pump for each battery pack; accordingly, a plurality of battery packs is preferably associated with a corresponding plurality of on-board pumps. However, the battery loop can include one pump for each set of two battery packs, and/or any other suitable number of on-board pumps. Pump(s) within the battery loop are preferably connected to the fluid manifold parallel to an interface connection between the vehicle and the infrastructure installation. More preferably, the on-board pump within the battery loop can be arranged proximal to one or more battery packs, which can reduce the required mass/volume of working fluid and/or fluid manifold components required to fluidly connect the pump to the battery pack(s). The on-board pump within the battery loop can be integrated into a battery pack, separate from a battery pack, integrated into a reservoir, proximal to the hose coupling, and/or otherwise implemented. The on-board pump within the battery loop is preferably arranged between the battery packs it services (e.g., physically between; at an intermediate position along the fluid coolant circuit), but can alternatively be arranged to the side of the battery packs, in a separate vehicle component, or at any other suitable location. The on-board pump within the battery loop is preferably connected to the fluid manifold in parallel with the extravehicular installation, such that the on-board pump can be held idle during conditioning by the extravehicular infrastructure installation. In examples, the on-board pump defines a pumping speed range that is matched to the volume of working fluid on-board the vehicle when the vehicle is detached from the infrastructure installation, and in cases wherein the vehicle is attached to the infrastructure installation for conditioning the on-board pump is not used, in favor of an offboard pump (e.g., sized or otherwise configured for the greater pumping requirements of the combined system and working fluid volume). In a first variant, the on-board pump of the battery loop is fluidly connected to two battery packs and is located between them (e.g., coplanar with the battery packs, arranged within the projection of the battery pack sides, etc.), thereby minimizing the length of tubing required. In a second variant, the on-board pump is located in a wing (e.g., two pumps—one located in each wing), which can ensure the fluid manifold does not infringe on cabin space. However, the on-board pump within the battery loop can be otherwise arranged.

The on-board pumps can also function to circulate working fluid through the fluid loop which it services at a defined flow rate, wherein the defined flow rate is determined by an on-board pump controller. The on-board pump is preferably sized (e.g., physically sized, sized according to maximum pumping speed and power requirements, etc.) according to the volume of working fluid on-board the vehicle when the on-board thermal management subsystem is disconnected from the infrastructure installation (e.g., a smaller volume). For example, the on-board pump within the battery loop can be smaller, lighter, and/or less powerful than the offboard pump because the on-board pump is preferably not used to circulate the working fluid during thermal pre-conditioning (e.g., when the circulation subsystem is connected to the infrastructure installation and thus the heat exchanger). However, the on-board pumps can additionally or alternatively be otherwise suitably sized.

In variants, the various pump(s) can operate at different flow rates during different operational modes. Preferably, the pump(s) within the cabin loop circulate working fluid at a first flow rate during the cabin cooling mode and a second flow rate during the heating mode. In a first example, the second flow rate can be 200%, of the first flow rate, the same as the first flow rate, 50% the first flow rate, 20% of the first flow rate, 10% of the first flow rate, 5% of the first flow rate, and/or any suitable range bounded by the aforementioned values. In a second example, the cabin loop includes a first subloop and a second subloop in the cabin cooling mode, a first pump in the first subloop and a second pump in the second subloop. In the second example, the flow rate through the first subloop and/or the second subloop exceeds the flow rate of the cabin loop in the cabin heating mode, during which the first and second pump are arranged in series. In variants, reducing the flow rate of the cabin loop and/or battery loop in the cabin heating mode can take advantage of transient thermal effects to increase the heating efficiency of the on-board thermal management subsystem. However, the flow rate of the pumps can be otherwise suitably controlled.

In alternative variations, the pump(s) can be a passive (e.g., unpowered) pump that is driven by temperature differentials originating from waste heat (e.g., generated by the battery pack during discharge, one or more electric motors during operation, etc.). The circulation subsystem can be arranged to create such temperature differentials in order to establish a convective loop of the working fluid through the envelope; for example, the envelope can be arranged within the vehicle to reject heat to the environment at a first position, and guide working fluid (e.g., gravitationally) around a closed, thermally driven cycle. However, a pump can be otherwise suitably configured to passively circulate the working fluid in such variations.

The pumps can be any appropriate type of pump, such as: submerged pump, unsubmerged pump, positive displacement pump (e.g., rotary, reciprocating, linear), impulse pump, velocity pump, centrifugal pump, axial-flow pump, gear pump, screw pump, progressive cavity pump, roots pump, peristaltic pump, plunger pump, triplex-type plunger pump, radial-flow pump, valveless pump, helico-axial pump, and/or any other suitable type of pump. The on-board pump can have any suitable maximum flow rate, which can be limited based on the: supply power, physical limitations of the circulation subsystem, electronic control, and/or otherwise defined. The maximum flow rate of the on-board pumps can be: <5 L/min, 5 L/min, 10 L/min, 20 L/min, 40 L/min, 60 L/min, 80 L/min, 100 L/min, >100 L/min, any range defined by the aforementioned values, and/or any other suitable flow rate. The on-board pump can accept any suitable supply power. The input supply can be AC or DC, with any suitable supply voltage such as: 12 VDC, 24 VDC, 48 VDC, 96 VDC, 120 VAC, 240 VAC, the same voltage as the battery pack, and/or any other suitable supply voltage. The on-board pump supply power can have any suitable maximum continuous or peak power, such as: <25 W, 25 W, 50 W, 100 W, 250 W, 350 W, 500 W, 1 kW, 2.5 kW, 5 kW, 10 kW, >10 kW, any suitable range defined by the aforementioned values, and/or any other suitable power.

The pump controller functions to operate the pump (e.g., on-board pump) between various modes, including a failsafe mode. In the failsafe mode, the pump can operate at a high flow rate in response to the detection of an off-nominal state (e.g., a thermal event) in order to circulate working fluid through the battery pack and thereby mitigate an existing thermal event and/or prevent propagation of a thermal event across multiple cells in the battery pack. Entering the failsafe mode can be triggered by detection of a thermal event in one or more cells of the battery pack, loss of power to a redundant portion of the on-board pump controller (e.g., one of two control modules), detection of a precursor condition to a thermal event, loss of communication, and/or any other suitable trigger event. The pump controller can regulate pump RPM, flow rate, pressure (e.g., pump head), power state (e.g., on/off) and/or any other suitable pump parameter.

The pump controller can be integrated into the battery electronics, integrated into the pump, or separate from the pump and battery electronics. The pump controller can be located proximal to the pump, proximal to the battery pack, proximal to a vehicle controller (e.g., flight computer), between battery pack and pump, between two battery packs, and/or otherwise arranged.

The pump controller is preferably fault tolerant, such that the on-board pump is able to operate effectively even in cases wherein all or part of the battery pack has failed (e.g., due to a thermal event, due to other trauma to the system, etc.) and ceased delivering electrical power. Fault tolerance can be achieved by powering the on-board pump controller and on-board pump using redundant connectivity between the on-board pump controller and on-board pump and a single battery pack; fault tolerance can additionally or alternatively be achieved using redundant connectivity to the on-board pump controller and on-board pump from multiple battery packs.

In a specific example of a fault tolerant configuration, on-board pumps can be powered by two different halves of the battery pack via parallel sets of three phase windings (e.g., each electrically isolated subset of the same battery pack powers a different phase-set of the pump). In a second specific example of a fault tolerant configuration, the on-board pump is powered by a first battery pack and a second battery pack via distinct sets of three phase windings.

In fault tolerant configurations, the failsafe mode of operation of the on-board pumps can include operating the pumps on one set of three phase windings if a thermal event occurs in one of the cells of the battery pack associated with the other of the two sets of three phase windings. The pump can enter the failsafe mode (e.g., high flow rate) in response to various trigger events as described above, including the loss of power to one of the parallel motor drive electronics subsystems (e.g., due to a thermal event disrupting power delivery to one of the parallel motor drive electronics subsystems), the receipt of a failure trigger from the battery electronics (e.g., generated in response to a detected power surge or drop associated with a possible thermal event), and/or any other suitable trigger event.

However, the fluid loops can include any other suitable pump(s).

Figure 21:
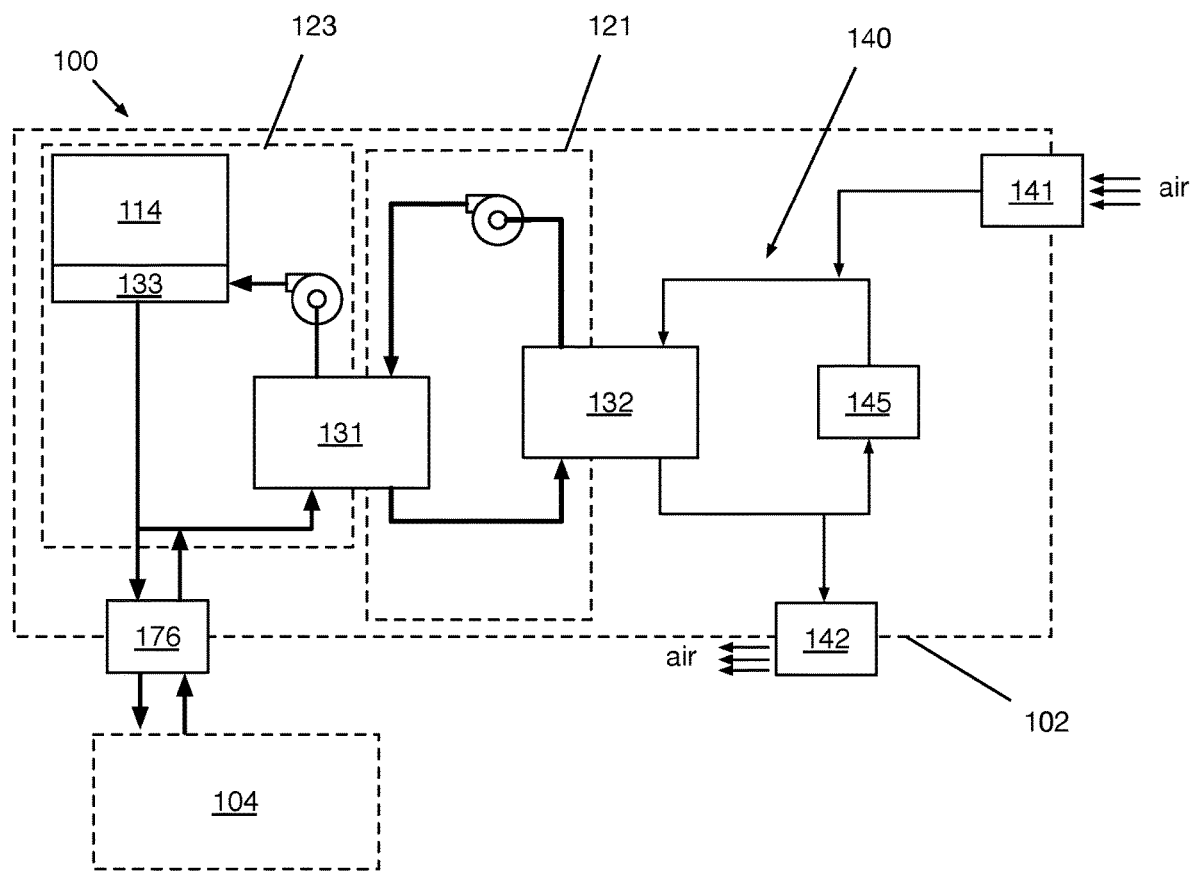
FIG. 21 depicts a schematic diagram of a variant of the system.

In a first variant of the cabin loop: in a cabin heating mode, the working fluid within the cabin loop (e.g., water/glycol mixture) is driven by the pump through the inlet of the battery heat exchanger. The working fluid passes from the inlet to the outlet through the interior of the heat exchanger while convectively absorbing a first portion of thermal energy through the thermal interface of the battery heat exchanger. From the outlet, the working fluid is transported to the cabin heat exchanger inlet, which is fluidly coupled to the battery heat exchanger by the fluid manifold of the cabin loop, thereby transporting the first portion of heat to the cabin heat exchanger. The working fluid passes from the cabin heat exchanger inlet to the outlet through the interior of the heat exchanger while convectively heating/transferring the first portion of thermal energy to the cabin air through the thermal interface of the cabin heat exchanger. The working fluid then returns to the inlet of the battery heat exchanger, completing a full circuit of the cabin loop. In this configuration, the thermal interface of the battery heat exchanger has a temperature which exceeds a temperature of the working fluid, and the working fluid has a temperature which exceeds a temperature of the cabin air. In a cabin cooling mode, the working fluid traces the same path, wherein the cabin air temperature exceeds a temperature of the working fluid, and the working fluid exceeds a temperature of the battery pack (and/or working fluid within the battery loop). Accordingly, in the cabin cooling mode, a second portion of thermal energy is transferred from the cabin air through the thermal interface of the cabin heat exchanger, and is convectively absorbed/stored by the working fluid. The heated working fluid is then transported from the outlet of the cabin heat exchanger to the inlet of the battery heat exchanger through the fluid manifold, thereby fluidly/thermally connecting the outlet of the cabin heat exchanger to the inlet of the battery heat exchanger. As the working fluid passes through the interior of the battery heat exchanger, the second portion of thermal energy is transferred through the thermal interface of the battery heat exchanger and is stored within a thermal mass of the battery (and/or battery loop). Alternately, the working fluid can exceed an ambient temperature, and can be cooled via a radiator or other heat sink arranged along an outlet path of the air manifold. A first example of the first variant is shown in FIG. 1. A second example of the first variant is shown in FIG. 21.

In a second variant, the on-board thermal management subsystem includes a refrigeration loop comprising a refrigerant within the refrigeration loop, a condenser, and an evaporator, wherein the refrigeration loop is configured to operate as a heat pump transporting thermal energy from the evaporator to the condenser.

Figure 22A:
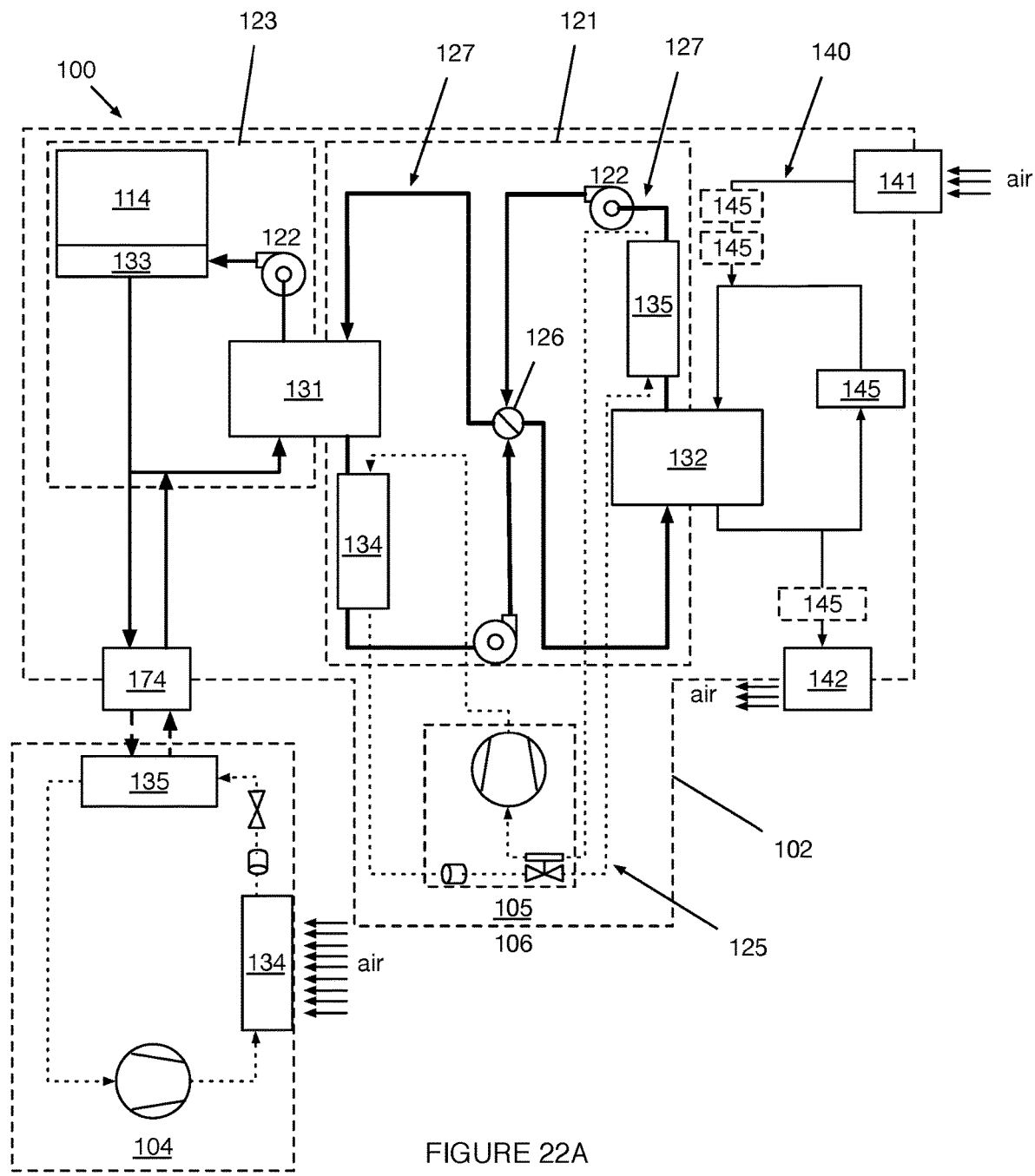
FIG. 22A depicts a schematic diagram of a variant of the system in a cabin cooling mode.
Figure 22B:
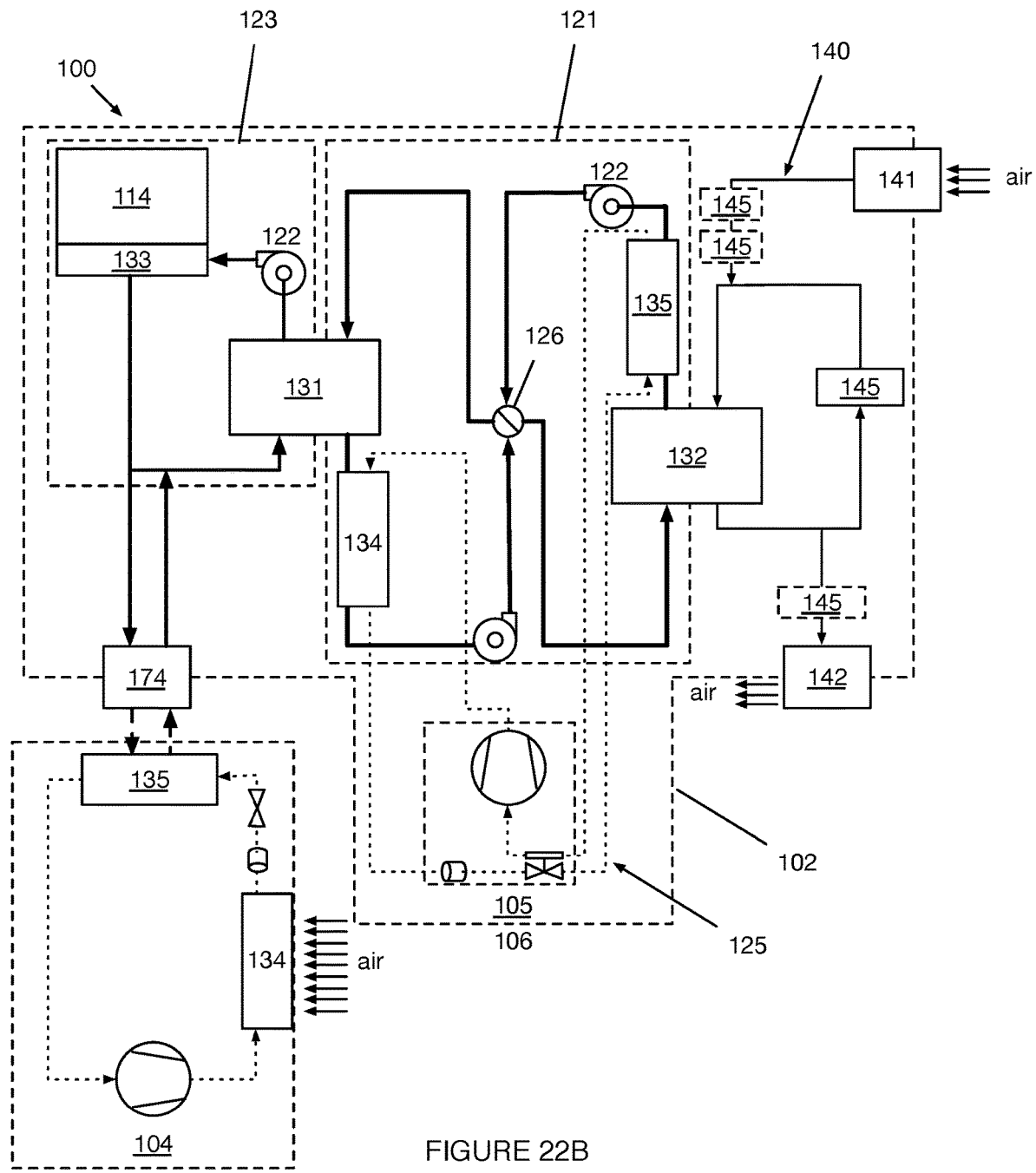
FIG. 22B depicts a schematic diagram of a variant of the system in a cabin heating mode.

In the second variant, the cabin loop optionally includes a 4-way valve defining a first, second, third, and first fourth port. The first port is fluidly connected to the battery heat exchanger inlet and a flow path of the working fluid extends from the first port to the battery heat exchanger inlet. The second port is fluidly connected to the battery heat exchanger outlet and a second flow path of the working fluid extends from the battery heat exchanger outlet to the second port. The third port is fluidly connected to the cabin heat exchanger inlet and a third flow path of the working fluid extends from the third port to the battery heat exchanger inlet. The fourth port is fluidly connected to the cabin heat exchanger outlet and a fourth flow path of the working fluid extends from the cabin heat exchanger outlet to the fourth port. In the cabin heating mode, the first port is fluidly connected to the fourth port, and the second port is fluidly connected to the third port. In the cabin heating mode a first portion of thermal energy can be transferred from the battery heat exchanger to the cabin heat exchanger in a manner similar to the first variant, since the battery heat exchanger is fluidly/thermally coupled to the cabin heat exchanger by the cabin loop. Additionally, the heat pump can transport a second portion of thermal energy from the evaporator to the condenser, thereby transferring thermal energy from the working fluid within an interior of the evaporator to the working fluid within an interior of the condenser (e.g., including a transient delay and/or losses). With the evaporator arranged within the fluid loop between the cabin heat exchanger outlet and the battery heat exchanger inlet (e.g., along the first or fourth flow path) and the condenser arranged within the fluid loop between the battery heat exchanger outlet and the cabin heat exchanger inlet (e.g., along the second or third flow path), the condenser can add the portion of thermal energy to the working fluid before it enters the cabin heat exchanger. Most preferably, the condenser is arranged within the second flow path (associated with the second port and the outlet of the battery heat exchanger) and the evaporator is arranged within the fourth flow path (associated with the fourth port and the outlet of the cabin heat exchanger). In this configuration, the net heating power transferred from the cabin loop to the cabin air (at the cabin heat exchanger) can be a third portion of energy which is equal to the sum of the first portion of energy and the second portion of energy (e.g., neglecting losses, transience, etc.). Examples of the cabin heating mode of the second variant are shown in FIG. 7 and FIG. 22B.

In the cooling mode of the second variant, the 4-way valve fluidly connects the first flow path to the second flow path and connects the third flow path to the fourth flow path. In this configuration, the first and second flow paths define a first subloop of the cabin loop and the third and fourth flow paths define a second subloop of the cabin loop, with the battery heat exchanger and the cabin heat exchanger arranged within the first and second subloops, respectively. The first subloop (and the battery heat exchanger) can be partially or fully fluidly isolated from the second subloop (and the cabin heat exchanger), with the first subloop containing a first portion of the working fluid and the second subloop loop containing a second portion of the working fluid. In this condition, the battery heat exchanger is thermally de-coupled from the cabin heat exchanger. The condenser (and a pump) is arranged within the first subloop, and the evaporator (and a pump) is arranged within the second subloop. Operating the heat pump between the evaporator and the condenser can drive transfer of a portion of thermal energy from the cabin air to the battery according to the following thermal circuit: the portion of thermal energy is transferred from the cabin air to the cabin heat exchanger; the second portion of working fluid transfers the portion of thermal energy from the cabin heat exchanger through the second subloop to the evaporator, the refrigeration loop (heat pump) transports the portion of thermal energy from the evaporator to the condenser, the first portion of working fluid transports the portion of thermal energy to the battery heat exchanger, the battery heat exchanger transfers the portion of thermal energy to the battery (e.g., where the portion of thermal energy is absorbed/stored—such as for a duration of the flight). Examples of the second variant in the cabin cooling mode are shown in FIG. 8 and FIG. 22A.

However, in the second variant the condenser and the evaporator can be otherwise suitably arranged and/or employed within the cabin loop.

In variants of the system including a battery loop, the collective thermal mass of the battery and battery loop can absorb the second portion of thermal energy as described in the first variant. In such instances, the battery loop contains a second working fluid, wherein the second working fluid is thermally coupled to the first working fluid by the battery heat exchanger. In the cabin heating mode, a second pump within the battery loop drives flow of the second working fluid through the fluidic interior of a heat exchanger (e.g., cold plate/hot plate) thermally connected to the battery pack. The first portion of thermal energy is transferred from the battery to the second working fluid at the thermal interface of the heat exchanger. The working fluid transports the first portion of the thermal energy from the heat exchanger to a second inlet of the battery heat exchanger, fluidly connected to the heat exchanger via the fluid manifold of the battery loop. The second working fluid passes from the second inlet of the battery heat exchanger to a second outlet through a second interior of the battery heat exchanger. The first portion of thermal energy is then transferred through the thermal interface of the battery heat exchanger from the second working fluid to the first working fluid, thereby establishing fluid communication between the first loop and the second loop. Examples are shown in FIG. 21, and FIG. 22B. In the cabin cooling mode, the second portion of thermal energy is received by the second working fluid at the battery heat exchanger. An example is shown in FIG. 22A. In variants of the system which precondition the second working fluid via the off-board infrastructure, a condition can exist where both the battery temperature and the temperature of the first working fluid exceed a temperature of the second working fluid (as may frequently occur given the transient nature of thermo-fluidic systems). In such cases, there can be a net heat flow into the second working fluid from both the heat exchanger and the battery heat exchanger. In a first example, the second portion of thermal energy can be stored by the thermal mass of the collective system of the battery loop (and working fluid therein) and the battery pack. In a second example, the second portion of thermal energy can decrease the effective thermal capacity of the second working fluid (e.g., defined by the specific heat of the second working fluid, multiplied by the mass of the second working fluid and the temperature delta between the second working fluid and the battery pack), and can ultimately result in a net heat gain of the battery (e.g., equal to the second portion of thermal energy). Accordingly, the second working fluid can transport the second portion of thermal energy to the battery pack by way of temporal effects and/or decreased thermal capacity. However, the second portion of thermal energy can be otherwise suitably transported to the battery pack in the cabin cooling mode.

However, the arrangement of the fluid manifold and components within the fluid loop can specify any suitable thermal and/or fluidic pathways through each of the fluid loops; and/or the cabin loop can be configured to transport thermal energy packets (e.g., a portion of thermal energy) between the cabin heat exchanger and the battery heat exchanger in any suitable manner.

The fluid loops can optionally include a reservoir which functions to store working fluid. The reservoir can be constructed of any suitable material, such as metal, plastic, composite and/or any other suitable material. Material choices for the reservoir can enable various advantages. Materials (e.g., aluminum, metals, etc.) can be selected to enable passive heat dissipation through the vehicle frame/body to the ambient environment. Materials can be selected to enable arbitrary arrangement of the reservoir—plastics (e.g., blow molded, injection molded) can provide a high degree of geometric variance at low cost, while composites can minimize weight and/or serve as structural elements of the vehicle.

Additionally, the reservoir can function as a heat reservoir (adding thermal mass to the system). The volume (and/or associated mass of working fluid), for a thermal reservoir can be selected based on a range tradeoff between thermal capacity (e.g., for the specific heat of the working fluid contained within the reservoir) and the added mass of the fluid. In variants, the pump can selectively increase and/or decrease the mass of working fluid contained within the reservoir before beginning a trip based on the temperature setpoint and/or other trip parameters before takeoff, ensuring the optimal efficiency and/or range for different trips.

However, the fluid loops can include any other suitable reservoir(s).

The fluid loops can optionally include a heater which functions to add thermal energy to the fluid loop. Heaters can receive power from any suitable power source. Heater power sources can include an electrical connection to the battery pack, a gas reservoir, and/or any other suitable power source. Heaters can be any suitable type of heater, such as a resistive heater (e.g., a positive temperature coefficient/PTC heater), inductive heater, gas heater, and/or any other suitable type of heater. The heater can be located within any suitable fluid loops, such as the battery loop (e.g., which can enable battery warming to avoid degradation during a cold start) and/or the cabin loop. Heaters within the cabin loop can be located: at the inlet port of the cabin heat exchanger, within a subloop including the battery heat exchanger, within a subloop including the cabin heat exchanger, thermally connected to and/or integrated with the battery heat exchanger, thermally connected to and/or integrated with the cabin heat exchanger, and/or otherwise suitably arranged.

The fluid loops can optionally include a cooler, which functions to remove thermal energy from the fluid loop. The coolers can be: heat pumps (e.g., pumping heat away from the fluid loop's working fluid), cold heat sinking elements (e.g., ice, nitrogen, etc.), phase change material (e.g., paraffin), and/or any other suitable element.

However, the fluid loops can otherwise add auxiliary thermal energy to the fluid loop(s) in any suitable manner, or exclude a heater.

In variants where the working fluid of the fluid loop is a refrigerant (e.g., refrigerant loop), fluid loops can include a compressor 192, and a thermal expansion valve (TXV) 194; and can optionally include: a drier and/or a refrigerant filter 196. Accordingly, such fluid loops can be employed in an onboard refrigeration system and/or heat pump. In some cases, it can be further advantageous to employ a reversing valve (or 4-way valve) to employ a refrigerant loop in a reversible-heat pump configuration.

Figure 16:
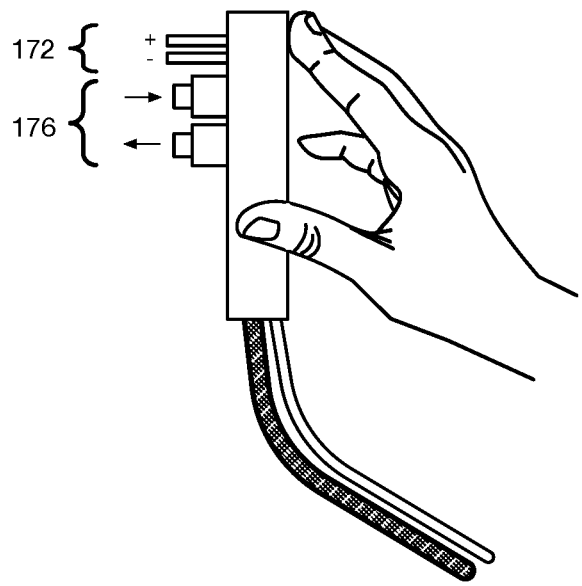
FIG. 16 depicts a schematic diagram of an example charger in a variant of the system.

The fluid loops can optionally include a hose coupling, which functions to fluidly connect the working fluid within the fluid loop onboard the vehicle to the extravehicular infrastructure (e.g., offboard cooling system). Preferably, the hose coupling establishes a dry connection (minimal leakage from connecting/disconnecting), but can alternately establish a wet connection and/or any other suitable fluid connection. The fluid coupling can be: threaded or unthreaded, gendered or ungendered, tapered or untapered, can optionally include a gasket, can optionally include a spring-loaded valve (e.g., dry connection), and/or can have any other suitable features. The hose coupling can include a: camlock, quick-connect, quick disconnect, flanged coupling, hoselink, express coupling, Storz coupling, tri-clamp connection, leverlock, and/or any other suitable hose coupling type. The hose coupling can be any suitable material such as brass, stainless steel, aluminum, plastic, and/or any other material with any appropriate material finish (e.g., corrosion resistance, etc.). The hose coupling can include a vehicle side (integrated with the vehicle, connected to the circulation subsystem) and an extravehicular side (e.g., mechanically connected to the infrastructure installation). In a first variant, the extravehicular side of the hose coupling 176 can be integrated with a charging connector 172 (e.g., part of a charging handle, as shown in the example in FIG. 16). In a first example, the fluid connection and electrical connections are established simultaneously. In a second example, the fluid connection can engage/disengage separately from the electrical connection. In a second variant, the vehicle side of the hose coupling is separate from electrical connector. In a third variant, the system includes a set of inflow and a set of outflow hose couplings, enabling round-trip circulation of the working fluid through the fluid loop. The system can include any suitable number of hose couplings: such as zero, one, two, three, four, more than four per: aircraft, pump, battery pack, reservoir, charging station, electrical connector, charger, fluid loop and/or suitable number of hose couplings.

The extravehicular infrastructure subsystem can optionally include a charging station, which functions to supply electrical energy to the battery packs. The charging station can be integrated with an offboard cooling system or can be separate. The electrical connector 172 (e.g., charger) and hose coupling 176 can be integrated into a single device (e.g., a charging handle) or can be separate devices. There can be any suitable number of charging stations such as one or more per: aircraft, battery pack, pump, hose coupling, or there can be multiple aircrafts, battery packs, pumps, and/or hose couplings associated with a single charging station. In a first variant, the system includes a single charger (e.g., with +/− sides) and a single (offboard side) hose coupling (e.g., with separate inlet and outlet tubes), which can connect to: the rear of the vehicle, front of the vehicle, side of the vehicle, wing of the vehicle, and/or other suitable endpoint. In a second variant, the system includes two (offboard side) hose couplings (e.g., with separate inlet and outlet tubes), which can connect to: the front/rear of the vehicle, left/right sides of the vehicle, left/right wings of the vehicle, and/or other suitable vehicle endpoints.

The extravehicular infrastructure subsystem can include an off-board cooling system preferably functions to exchange heat between the working fluid and the external environment, remove heat from the aircraft (e.g., offboard the aircraft), remove heat from the fluid loop (e.g., battery loop), and/or otherwise manage heat. In a first variant, an off-board heat exchanger directly exchanges heat from the working fluid to the surrounding air (e.g., by forced convection). In a second variant, the offboard heat exchanger indirectly exchanges heat to the external environment by thermally connecting the working fluid within on or more of the fluid loop to a sub-ambient cooling system (e.g., refrigeration cycle). In a third variant, the offboard cooling system replaces a first volume the working fluid within one or more of the fluid loops with a second, pre-cooled volume of the same working fluid. The first volume of working fluid can be subsequently cooled and/or reused for subsequent vehicle pre-conditioning/charging cycles. The offboard heat exchanger can cool the working fluid and/or heat the working fluid, depending upon the desired temperature set point of the battery pack. Because the offboard heat exchanger is preferably a component of the infrastructure installation, the type and configuration of heat exchanger is preferably not constrained by the available space and/or mass budget associated with the vehicle. The offboard heat exchanger is preferably an active heat exchanger (e.g., wherein the working fluid is actively flowed through a structure to increase the heat transfer from the working fluid to the external environment such as air, wherein the external fluid such as air is actively flowed to increase heat transfer to or from the working fluid, etc.), but can additionally or alternatively be a passive heat exchanger (e.g., a heat sink) that transfers the heat to or from the working fluid to an external fluid medium (e.g., the air). The offboard heat exchanger can include: a condenser, an evaporator, a radiator, a refrigeration system, a cooling system, and/or any other suitable component. An example is shown in FIG. 21. A second example is shown in FIGS. 22A-22B.

The system can optionally include an authorization mechanism which functions to ensure that authorized cooling and/or charging systems can charge/precondition the vehicle. In a first variant, the authorization system is mechanical. In a first example of the first variant, a proprietary key unlocks the fluid coupling. In a second example of the first variant, the fluid coupling has a proprietary interface. In a second variant, the authorization system is digital. In a first example of the second variant, the offboard fluid coupling head or offboard charging and/or cooling installation sends its identifier to controller (e.g., on-board controller), the controller verifies the offboard charging/cooling system (e.g., with an on-board database, with a central management system, with a proprietary cloud system, etc.), and the controller initiates cooling/charging in response to verification (e.g., by starting the pump, unlocking the fluid coupling, etc.). In a second example, the offboard charging and/or cooling system verifies the aircraft in the same or similar manner to the first example.

The system can include a controller. The controller can be distributed across multiple nodes (e.g., a computational node aboard the vehicle and a node coupled to the infrastructure installation) or centralized at a single point (e.g., a centralized controller that is communicatively coupled with controllable components of the system to command the set temperature, execute portions of the method 200, etc.). The controller functions to execute command instructions based on input data to control portions of vehicle cabin thermal management system. In examples, the controller can execute or implement the entirety or portions of the method 200; however, the controller can additionally or alternatively execute or implement any suitable functionality of the system components as described herein or otherwise suitably defined.

The system of the preferred embodiment and variations thereof can be embodied and/or implemented at least in part as a machine configured to receive a computer-readable medium storing computer-readable instructions. The instructions are preferably executed by computer-executable components preferably integrated with and/or part of the system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

4. Method

The method 200 includes: determining the temperature setpoint of the battery pack S100; adjusting the battery pack temperature to the temperature setpoint S150; and regulating the cabin air temperature using the cabin thermal management system S300. The method can additionally or alternatively include determining the temperature of the battery pack S200; and redistributing heat within the battery pack based on the temperature of the battery pack S250. The method 200 can additionally or alternatively include any other suitable processes.

The method 200 functions to prepare the cabin thermal management subsystem of a vehicle for operation and to facilitate cabin temperature regulation during vehicle operation. However, the method 200 can additionally or alternatively have any other suitable function.

Block S100 includes determining the temperature setpoint of the battery pack. Block S100 functions to determine a target temperature to which the battery pack should be conditioned. Block S100 is preferably performed prior to vehicle departure from the infrastructure installation, such that the active conditioning components of the extravehicular infrastructure installation can be used to condition the battery pack (e.g., in accordance with one or more variations of Block S150), but Block S100 can additionally or alternatively be performed at any other suitable time. Block S100 is preferably performed automatically by a controller substantially analogous to the controller of the system 100, but can be otherwise suitably performed by any suitable component of a suitable system and/or entity associated with such a system (e.g., a human operator).

The temperature setpoint is preferably the takeoff temperature setpoint, but can additionally or alternatively be the operational setpoint or any other suitable setpoint.

Block S100 is preferably performed based on the trip profile of the vehicle. The trip profile can include a duration, trip range, vehicle weight, time spent in various modes of operation (e.g., hover, forward/cruise, transition, takeoff, landing, etc.), ambient temperature (e.g., of locations along the trip), battery parameters (e.g., age, capacity, cell type/model, current temperature, current SoC, SoP, SoH, etc.), vehicle weight, cargo weight, weight distribution, and/or any other suitable parameters. Battery parameters can be determined for an individual cell, can be generic for cells with similar parameters, can be determined for a battery pack, can be generic for battery packs with similar parameters, or be otherwise determined. In examples wherein the vehicle is an aircraft, the trip profile can include a flight plan (e.g., for one or more flights or legs of a flight) and/or any other flight data (e.g., weather data, air traffic data, etc.). The trip profile can be received from a user, user device, on-board controller, a remote system and/or other suitable endpoint, and can include any other suitable set of parameters.

Block S100 can include determining an expected power consumption for the trip (e.g., flight). The expected power consumption can be determined based on the trip profile, a power consumption model, and/or other information. In a first variation, the expected power consumption can be determined based on a physical vehicle model, which can be theoretical or empirically determined based on testing data or historical trip data (e.g., for the vehicle, for a fleet of vehicles). In a second variation, the expected power consumption can be selected from a lookup table/chart for the trip profile and/or physical vehicle model. In a third variation, the expected power consumption can be determined based on a machine learning model trained to output expected power consumption. However, the expected power consumption for the trip can be otherwise determined.

Figure 19:
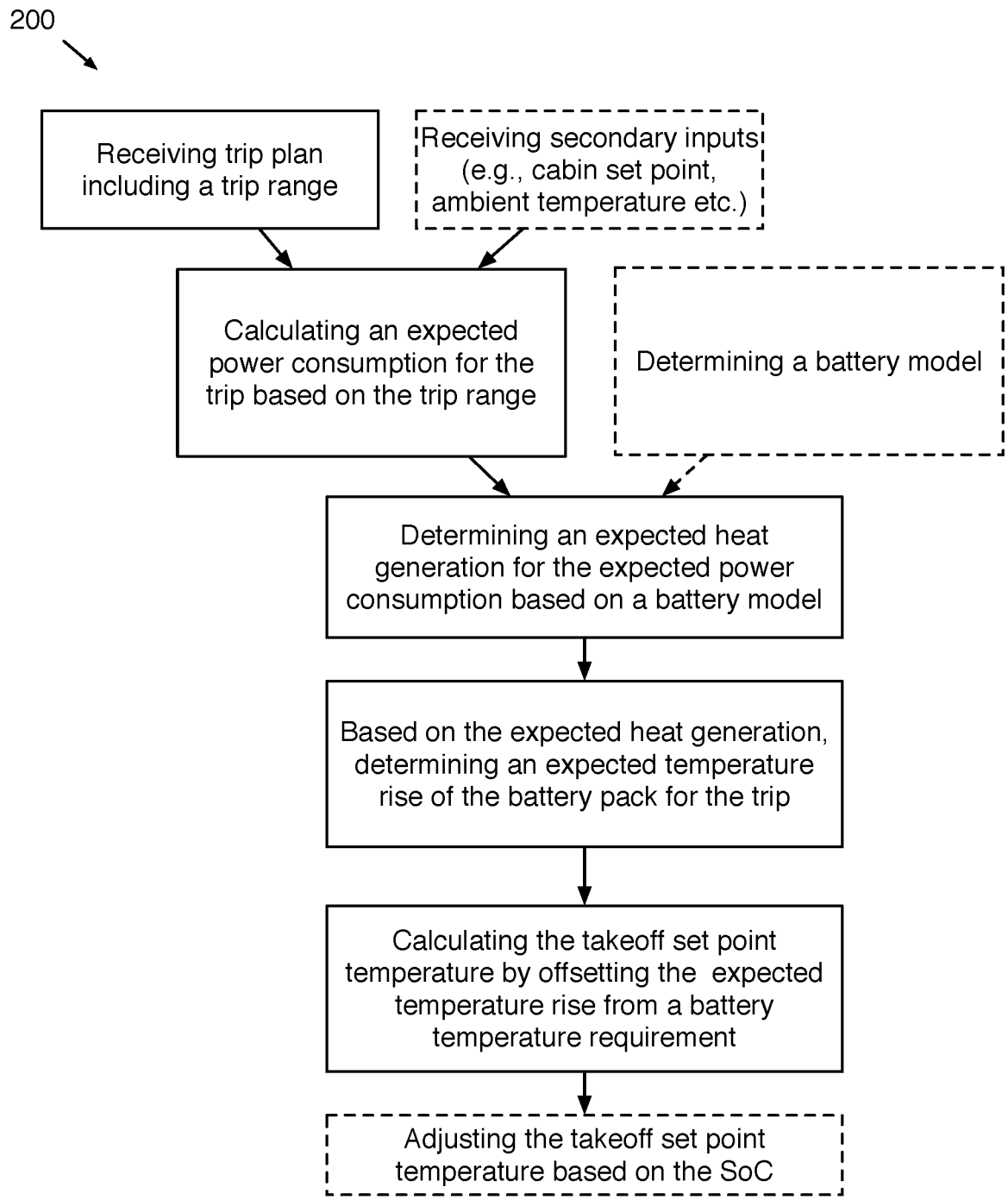
FIG. 19 depicts a flowchart diagram of an example of the method.

Block S100 can include determining the expected heat generation during the trip (e.g., the flight) based on a battery model (an example is shown in FIG. 19). The expected heat generation can be: the heat generation rate, heat generated between flight locations, rate of heat generation, and/or other heat generation parameter. The expected heat generation can be: selected (e.g., from a lookup table), calculated (e.g., from an equation, by a battery model, etc.), or otherwise determined. The battery model can be generated based on testing data (e.g., empirical testing for the battery cell, for the battery pack), historical flight data for a given battery pack, a predetermined model (e.g., received from the manufacturer or a battery characterization entity, etc.), or otherwise generated. The battery model can be predetermined, selected for use based on the battery cell type (e.g., class, manufacturer, model, etc.), or otherwise determined. The battery model can determine the expected heat generation based on the starting battery pack temperature (e.g., averaged across all cells, measured at a single temperature sensor for the pack, temperature of the working fluid, etc.), the estimated state of charge (e.g., at takeoff), the state of health (SoH) estimated for a battery pack or each battery cell, an expected power consumption (e.g., total power consumption, as a timeseries, power consumption rate, etc.) for the trip (e.g., determined from an aircraft model or simulation, a lookup table, etc.), battery specifications, and/or any other suitable parameters. In a first variant, the expected heat generation is selected from a lookup table/chart for the given input parameters. In a second variant, the expected heat generation is determined based on a machine learning model trained to output expected power consumption. However, the expected heat generation during the trip (e.g., flight) can be otherwise determined.

Block S100 can include, based on the expected heat generation, determining an expected temperature rise of the battery pack. The temperature rise can be the absolute temperature increase over an entirety of the trip (e.g., flight), a temperature increase for each segment of a mission (e.g., each leg of a flight), a rate of increase, or another parameter. The expected temperature rise can be determined based on: the thermal mass of the battery pack (e.g., specific heat), specific heat of the working fluid (e.g., for a known volume and/or temperature of working fluid), and/or expected heat loss during the trip (e.g., expected heat dissipation to the environment, to a remainder the vehicle, to the cabin, from heat sources/sinks, etc.). The thermal mass of the battery pack can be: empirically determined by testing, theoretically modeled (e.g., calculated), determined based on historical temperature changes during charging and/or discharging, retrieved from a database, and/or otherwise determined. The thermal mass of the battery pack can be: the absolute thermal mass of the battery pack, the available thermal mass of the battery pack (e.g., amount of heat the battery pack can absorb before reaching a maximum battery temperature, discussed below, given the current battery pack temperature and/or estimated battery pack temperature at takeoff), and/or other thermal parameter.

Based on the expected heat rise, Block S100 can optionally include determining an expected temperature difference between the battery cells and the working fluid, which can include: assuming a fixed offset (e.g., same temperature, 2 deg C. difference, etc.), dynamically modelling temperature transience based on material properties and flow rate, using historical/testing data, and/or otherwise determining the expected temperature difference. However, the expected temperature rise of the battery pack and/or cells can be otherwise determined.

Block S100 can include offsetting the expected temperature rise from battery temperature requirement to determine the temperature setpoint. The battery temperature requirement can be a maximum battery (pack or cell) temperature of: >65 deg C., 65 deg C., 60 deg C., 55 deg C., 50 deg C., 45 deg C., 40 deg C., <45 deg C., any range bounded by the aforementioned values, and/or any other suitable temperature. The battery temperature requirement can be determined based on testing data, battery specifications, battery efficiency ranges, battery lifetime (e.g., temperature at which battery starts to degrade), battery SoH, battery SoC, a likelihood of thermal runaway (e.g., at a given state of charge, absolute threshold for a given battery chemistry, battery manufacturer requirement, warranty requirement, etc.), a safety margin, the flight plan (e.g., wherein different battery temperature requirements are selected for each leg of a flight or each flight of a flight series), and/or otherwise determined. In a specific example, the expected temperature change during the flight can be subtracted from the battery temperature requirement to obtain the temperature setpoint.

Block S100 can include adjusting the temperature setpoint of the battery based on the battery SoC (e.g., current SoC, expected SoC at takeoff, expected SoC profile during flight), which functions to reduce or mitigate the risk of thermal runaway propagating at high battery SoC. Adjusting the temperature setpoint can include determining the likelihood of a thermal event at a given SoC and an expected power consumption, determined based on the current SoC, takeoff SoC, cooling rate, rate of thermal redistribution, estimated heat generated during charging, and/or any other suitable parameters. Determining the likelihood of a thermal event can be determined based on a probability of thermal propagation at a particular SoC, a lookup table, a machine learning model, and/or other suitable technique. The likelihood of a thermal event can be predicted once for a trip profile, over a timeseries model of an expected trip profile, periodically for an expected trip profile, for a continuous function approximation of a trip profile/SoC, and/or otherwise predicted. In a first example, the temperature set point for the battery, for a trip of 10 miles, is determined to be 40 deg C. The battery pack has a 95% SoC. Block S100 adjusts the temperature set point down to 30 deg C. to ensure that thermal events are unable to propagate given the high SoC.

Because the vehicle is preferably optimized for low mass and therefore lacks active conditioning equipment (e.g., for the battery) in some variants, the temperature set point is preferably determined in accordance with calculated temperature change during the trip (e.g., calculated based on the trip profile). However, the temperature set point can be determined based on desired aircraft component temperatures (e.g., wing temperatures, nacelle temperatures, hub temperatures, cabin temperatures), wherein the battery pack(s) can function as heat sources, other component heat generation, and/or other parameters. For example, the trip profile can include the takeoff weight of the vehicle, the trip distance, and the estimated time in flight at each phase of the trip and associated expected power expenditures. In this example, Block S100 can include calculating the discharge characteristics of the battery pack during a flight based on the trip profile (e.g., including a flight plan), and calculating the expected temperature rise during flight and determining a pre-flight temperature set point such that the battery pack temperature remains within a predetermined range (e.g., determined to prevent the occurrence of a thermal event). In related examples, the basis for determining the temperature set point can additionally or alternatively include the vehicle mass (loaded or unloaded), the drag profile of the vehicle, ambient temperature, expected thermal load from the cabin (e.g., based on the difference between the ambient temperature and current/setpoint cabin temperature), the energy discharge profile, and/or any other suitable predetermined or dynamically determined time-series quantifying aspects of vehicle travel (e.g., a trip).

In a second variant, the temperature setpoint can be heuristically determined (e.g., based on a flight plan).

In a third variant, the temperature setpoint for the battery pack can be predetermined (e.g., absolute maximum, static setpoint, etc.).

In a fourth variant, the temperature setpoint can be determined based on a user input (e.g., cabin temperature setpoint). For example, the temperature setpoint can be calculated based on the current cabin temperature, the cabin temperature setpoint, the amount of estimated heat generated by the passengers, the amount of estimated heat generated by the batteries during operation, the estimated ambient temperature during the flight, and/or other parameters.

In a fifth variant, the temperature setpoint can be determined from a lookup table (e.g., relating flight parameters, such as flight length or aircraft weight, with the temperature setpoint or expected temperature rise; relating the cabin temperature setpoint and optionally flight parameters with the battery temperature setpoint).

In a sixth variant, the temperature setpoint can be determined by a trained neural network. However, the temperature setpoint can be otherwise determined.

In seventh variant, the temperature set point can be determined based on an optimal discharge temperature associated with the particular chemistry of the battery pack (e.g., a temperature or temperature range at which power delivery is maximally efficient. The temperature set point can be equal to the optimal discharge temperature, but can additionally or alternatively be less than the optimal discharge temperature such that the battery pack is at the optimal discharge temperature for a desired time period during the trip (e.g., for a maximized time period, for a time period associated with higher risk vehicle operations such as takeoff and/or landing, etc.) as a result of warming of the battery pack during discharge. However, the temperature set point can additionally or alternatively be otherwise suitably determined.

In an eighth variant the expected temperature rise can be negative (e.g., a temperature change, a temperature decrease, etc.).

In a ninth variant, the temperature set point can be determined based on the cabin temperature setpoint. In a specific example, the difference between an ambient temperature and a cabin temperature setpoint can be used to determine an expected thermal load of maintaining the cabin setpoint temperature, and the temperature set point of the battery can be adjusted (e.g., according to the specific heat of the battery and/or increasing the thermal mass by at least the expected thermal load).

Block S150 includes adjusting the battery pack temperature to the temperature set point. In variants, vehicle operation (e.g., takeoff or flight) can be conditioned on the battery pack temperature satisfying the temperature set point. Block S150 functions to condition the battery pack, which can include heating and/or cooling the battery pack, in order to avoid the need for active temperature control and maximize performance of the battery pack during vehicle operation. The temperature setpoint is preferably the takeoff temperature setpoint, but can additionally or alternatively be the operational setpoint or any other suitable setpoint. Block S150 is preferably performed while the vehicular components (e.g., the battery pack and on-board circulation subsystem) are coupled to the extra-vehicular components (e.g., the offboard circulation subsystem, heat exchanger, offboard pump, etc.), which is preferably prior to vehicle operation on a trip (e.g., flight); however, Block S150 can additionally or alternatively be performed at any other suitable time. S150 is preferably performed during battery pack charging (e.g., to a predetermined SOC), but can additionally or alternatively be performed independent from battery pack charging (e.g., only the battery packs are cooled while the aircraft is grounded; the aircraft takes off only after the takeoff temperature setpoint is reached; etc.).

In variations, Block S150 can include connecting the circulation subsystem to the offboard cooling system, which can be performed manually (e.g., by a user), automatically (e.g., robotic and/or electromechanical connection), and/or otherwise performed.

In variations, Block S150 can include actively circulating working fluid through the combined on-board and offboard circulation subsystem using the offboard pump, such that heat is exchanged between the heat exchanger and the environment (e.g., to accept or reject heat to the environment) and between the battery pack and the working fluid (e.g., to heat or cool the battery pack to the set point temperature). In alternative variations, Block S150 can include allowing the battery pack to passively cool to the temperature of the environment (e.g., wherein the temperature set point is substantially equal to the temperature of the environment and it is determined that the battery pack will passively reach thermal equilibrium with the environment prior to initiation of a trip and operation of the vehicle). In a third variation, S150 can include cooling or warming the battery pack to a charging temperature range, and/or maintaining the battery pack temperature within the charging temperature range, by circulating fluid through the circulation subsystem. In this variation, S150 can optionally include cooling or warming the battery pack to the takeoff temperature setpoint after charging completion.

Block S150 can include controlling the offboard cooling system operation, which may be controlled: at the BMS (e.g., on-board BMS), at the battery electronics, at a vehicle controller, at the charging station, offboard the vehicle, on-board the vehicle, and/or at any other suitable endpoint. Block S150 can include controlling the circulation subsystem (e.g., circulating the working fluid), which can optionally include adjusting a flow rate through the pump (e.g., on-board and/or offboard). Block S150 can include actively circulating the working fluid, and can optionally include (actively) circulating a second working fluid (e.g., refrigerant). Block S150 can include actively removing heat from the working fluid, such as with an offboard refrigeration system (e.g., including a compressor, TXV, evaporator, and condenser; an example is shown in FIGS. 22A-B). In a specific example, S150 controls the flow rate of the working fluid during battery conditioning to be substantially the same as a flow rate (e.g., continuous, steady state pump operation, etc.) during the trip (e.g., takeoff, landing, forward flight, etc.).

In a specific example, the battery pack temperature can be reduced during cargo (e.g., passenger) loading/unloading and/or battery charging. The turnover time for unloading, loading, battery charging and/or conditioning can be: less than 3 minutes, 5 minutes, 7 minutes, 10 minutes, 12 minutes, 15 minutes, 20 minutes, 35 minutes, 30 minutes, 45 minutes, 1 hour, greater than 1 hour, any range bounded by the aforementioned values, and/or any other suitable turnover time. The temperature decrease during the vehicle turnover time can be: <5 deg C., 5 deg C., 10 deg C., 15 deg C., 25 deg C., 30 deg C., 35 deg C., >35 deg C., any range bounded by the aforementioned values, and/or any other suitable temperature change. In a first example, the battery pack temperature decreases (e.g., continuously, monotonically, etc.) during concurrent charging and conditioning (as shown in the example in FIG. 12 and FIG. 13). In a second example, the temperature increases and/or remains the same during concurrent charging and conditioning, and subsequently decreases. In a third example, the battery temperature is decreased below the temperature setpoint during conditioning, and then is subsequently held at or below the temperature setpoint during subsequent charging and conditioning.

In a first example, battery charging, concurrent with Block S150 or otherwise, can include: electrically connecting the battery pack to the charger (e.g., via electrical connector), determining a SoC threshold based on the expected power consumption for the trip profile and the battery power capacity, determining satisfaction of a charging condition (e.g., SoC equal to or greater than the SoC threshold), ceasing charging of the battery pack in response to satisfaction of the charging condition, and/or electrically disconnecting the battery pack from the charger.

Block S150 can optionally include disconnecting the circulation subsystem from the offboard cooling system, which can occur manually (e.g., by the user) and/or automatically via the lockout mechanism. In variants of the system including a fluid lockout mechanism, Block S150 can include determining satisfaction of a condition (e.g., decoupling condition) of the fluid circulation (e.g., by the BMS, vehicle controller, charger, or other endpoint) and, in response, disconnecting the offboard cooling system from the on-board cooling system (e.g., at the fluid lockout mechanism). The condition can be: completion of battery conditioning, flow rate mismatch (e.g., between flow rate commanded by the BMS and measured flow rate), flow temperature mismatch (e.g., between expected and measured flow temperature), and/or any other suitable condition of fluid circulation.

Block S200 includes determining the instantaneous temperature of the battery pack. Block S200 functions to determine the temperature of the battery pack for use in adjusting the temperature of the battery pack (e.g., towards a set point temperature as determined in accordance with one or more variations of Block S100, downward to avoid the risk or occurrence of a thermal event, etc.). Block S200 can include directly measuring the instantaneous temperature of the battery pack (e.g., with a temperature sensor), inferring or estimating the temperature of the battery pack (e.g., based on the output of another sensor that is not a temperature sensor, in accordance with a thermal model of the battery pack, etc.), calculating the temperature of the battery pack (e.g., based on the output power of the battery pack), and/or otherwise suitably determining the temperature. The temperature determined can be the temperature at a physical point within the battery pack (e.g., an arbitrary point, a point coupled to a sensor input, etc.), a temperature distribution (e.g., three dimensional distribution) within the battery pack (e.g., at a cell-by-cell resolution, at a finer or coarser resolution than cell-by-cell, etc.), the rate of temperature change of a point within the battery pack, the distribution of the rate of temperature change within the battery pack, and/or any other suitable quantification or derivative quantity of temperature.

Block S200 can be performed during battery conditioning (e.g., in accordance with one or more variations of Block S150); for example, the instantaneous temperature of the battery pack can be measured to determine whether the battery pack has reached the determined temperature set point. Block S200 can also be performed during vehicle operation (e.g., flight, driving, traversing water, etc.); for example, Block S200 can include monitoring the temperature and/or temperature-related data to determine the thermal state of the battery pack during use.

Block S200 can include detecting a thermal event. Detecting a thermal event can include determining that the temperature and/or temperature rise rate has exceeded a threshold value, based on a temperature or temperature change rate measurement. Block S200 can include inferring a thermal event, based on a signal that is indicative of a thermal event (e.g., a current spike or dropout, a power fluctuation, etc.) in addition to or alternatively to a direct measurement of the temperature or other fire detection measures (e.g., smoke detector, fire rope, etc.). For example, Block S200 can include detecting propagation of a thermal anomaly between multiple cells in the battery pack based on the measured temperature rise rate in a plurality of adjacent cells. In another example, Block S200 can include detecting a thermal event in a battery pack based on an output current dropout resulting from an internal short circuit. However, Block S200 can include otherwise suitably detecting a thermal event.

Block S200 can include predicting a thermal event. A thermal event can be predicted based on a thermal model of the battery pack, and Block S200 can include determining that a thermal event is likely to occur (e.g., associated with a quantifiable probability above a threshold value) based on vehicle operational data (e.g., flight data, trip data, etc.). For example, Block S200 can include predicting that a thermal runaway is likely based on flight data indicating an emergency landing has occurred (e.g., a shock sensor reading, a message from a flight computer, etc.).

Block S200 can optionally include notifying a user, pilot, remote server, third party of thermal event and/or a current temperature. Notification can occur: with any suitable timing, which can be before the trip, during conditioning, during battery charging, during the trip (e.g., periodically, continuously, etc.), in response to thermal event detection, and/or with any other suitable timing.

Block S200 can optionally include controlling the vehicle based on the temperature, which can include: continuing the trip plan execution if the temperature is within a predetermined temperature range (e.g., below absolute battery max, within threshold deviation from expected temperature profile, no current thermal event, etc.), in response to the temperature exceeding a threshold: reducing/cutting power draw from a battery pack, executing an emergency landing, dynamically adjusting the trip plan during the trip, and/or otherwise controlling the vehicle.

Block S200 can additionally or alternatively include determining a thermal event in any other suitable manner.

Block S250 includes redistributing heat within the battery pack based on the temperature of the battery pack. Block S250 functions to utilize the thermal mass of the battery pack as a whole to absorb excess heat resulting from a thermal event in a portion of the battery pack. Block S250 can also function to achieve temperature uniformity within the battery pack. Block S250 can also function to prevent the occurrence of a thermal event (e.g., transport heat away from a malfunctioning cell to prevent a thermal runaway) and/or the worsening of a thermal event (e.g., transport heat away from a cell experiencing thermal runaway to prevent propagation). S250 can be performed by the on-board pump, offboard pump, and/or any other suitable pump.

Block S250 can include controlling a flow rate of an on-board pump that is operable to circulate working fluid through a closed, on-board portion of the on-board circulation subsystem. Block S250 can include determining the flow rate based on received data (e.g., thermal event data, flight data, trip data, etc.) and controlling the on-board pump (e.g., by way of a pump controller) to implement the determined flow rate.

Block S250 is preferably performed during vehicle operation away (e.g., and decoupled) from the infrastructure installation, and thus preferably does not include active conditioning of the battery pack (e.g., to cool the battery pack as a whole, to warm the battery pack as a whole) but rather preferably includes redistributing the heat of the battery pack across the thermal mass of the battery pack (e.g., transporting excess heat from one cell to another cell or cells which are at or below a nominal temperature). However, Block S250 can additionally or alternatively include exchanging heat between the on-board system and the environment (e.g., through a radiator section of the on-board circulation subsystem) without the use of a dedicated, high-throughput heat exchanger such as that integrated with the infrastructure installation.

Block S250 can be performed in response to a detected thermal event or other system failure, as a mechanism for failsafe and/or failure-tolerant operation of the vehicle. For example, Block S250 can include operating the on-board pump (e.g., within the battery loop) at a maximum flow rate in response to a detected thermal event.

Block S250 can be performed based on contextual data. For example, the contextual data can include flight information such as altitude and an estimated time period and power profile required before executing an emergency landing, and Block S250 can include determining a maximum allowable flow rate based on the remaining energy in the battery pack (to power the on-board pump) and the contextual data, and operating the on-board pump at the determined maximum allowable flow rate. In a related example, Block S250 can include preventing activation of the on-board pump in spite of the occurrence of a thermal event in cases wherein on-board energy would be better utilized in powering propulsion systems (e.g., enabling an aircraft to land safely even while sustaining damage to the battery pack).

Block S250 can be performed based on a predicted thermal event. For example, Block S250 can include preemptively operating the on-board pump at a maximum flow rate in response to a prediction that a thermal runaway is probable (e.g., based on detection of a hard landing, the output of a shock sensor, an emergency switch being activated by a vehicle operator, etc.).

Block S250 can optionally include detecting a leak in the circulation subsystem. Block S250 can, in response to detecting a leak, automatically stop the pump to minimize the amount of fluid loss and/or likelihood of electrical shorting, sending a notification (e.g., to a user within the aircraft, a pilot, a central management system, etc.), or otherwise mitigate leak-caused failures. Leak detection can make use of resistive, capacitive, and/or optical sensors, and/or any other suitable set of sensors. Leaks can be detected as: loss of working fluid volume from the fluid envelope (e.g., based on a time series of sensor measurements) above a predetermined loss threshold (e.g., 0.5 L, 1 L, etc.), a change in the working fluid resistivity (e.g., increase, decrease), detecting an open circuit (e.g., by running current through the working fluid), and/or otherwise determined.

In a first variant, Block S250 does not remove substantial amounts of heat from the thermal system cooperatively defined by the battery pack and circulation subsystem during the trip. In a first example, less than 50%, 25%, 10%, 5%, 3%, 1%, of generated heat (or total heat) is rejected during the trip.

In a second variant, Block S250 does not remove substantial amounts of heat from the battery pack and/or vehicle system during the trip. In a first example, less than 10%, 5%, 1%, of generated heat, or total heat is removed during the trip. In a second example, the temperature of the battery pack (e.g., net temperature, highest individual cell temperature, etc.) increases monotonically (e.g., rate of temperature change can be uniform or non-uniform, but is strictly greater than zero; continuously; etc.) during the trip. In a third example, the thermal energy contained within the thermal system of the battery pack and working fluid increases continuously (e.g., rate of temperature change can be uniform or non-uniform, but is strictly greater than zero) during the trip. In a specific example, a total thermal energy of a thermal system comprising the battery pack, the first working fluid, the second working fluid, and the cabin air increases (e.g., continuously, sporadically, monotonically increases, etc.) during flight (e.g., during an operation session defined by a takeoff and landing).

In a third variant, Block S250 removes heat from the battery pack and/or vehicle system during the trip.

In a fourth variant, Block S250 redistributes heat continuously during a trip. In a specific example, the working fluid is circulated at a max flowrate (e.g., absolute maximum, maximum continuous flowrate) of the pump, on-board heat exchangers, and/or fluid manifold (or envelope). In a second specific example, the flow rate of circulation during the trip is substantially the same circulation during battery conditioning, such as within 50%, within 25%, within 10%, within 5%, within 3%, within 1%, exactly the same, and/or otherwise equivalent.

In a first specific example, active heating and/or cooling includes applying mechanical work to a working fluid in order to create a steady state temperature difference (e.g., of greater than: 5 deg C., 10 deg C., 15 deg C., 20 deg C., 25 deg C., 50 deg C., etc.) between the working fluid and the battery pack. In a second specific example, there is no active heat removal and/or active cooling of the battery pack during a trip, and there is active heat removal and/or active cooling of the battery after the trip. In a third specific example, there is no active cooling of the collective thermal system of the battery pack and the circulation subsystem (e.g., including the fluid manifold and the volume of working fluid on-board the aircraft). In the third specific example, there is no forced convection between the environment and the collective thermal system including the battery pack and the circulation subsystem.

Block S300 includes regulating the cabin temperature using the on-board thermal management subsystem of the vehicle during an operating session. Block S300 functions to modify and/or maintain the cabin temperature to be consistent with (e.g., within a threshold range of) a set cabin temperature, using the on-board thermal management subsystem (and, in some variations, the infrastructure subsystem). The set cabin temperatures that can be accessed can be restricted to a design range (e.g., 15-25° C., any other suitable range, etc.), be a cabin temperature setpoint, and/or unrestricted by a design range.

The cabin temperature setpoint can be: manually determined (e.g., by a passenger, by an operator, etc.), dynamically determined (e.g., automatically selected based on the design range, user preferences, the current battery temperature, the battery's thermal operation range, etc.; using an optimization, lookup table, etc.), or otherwise determined.

Figure 20:
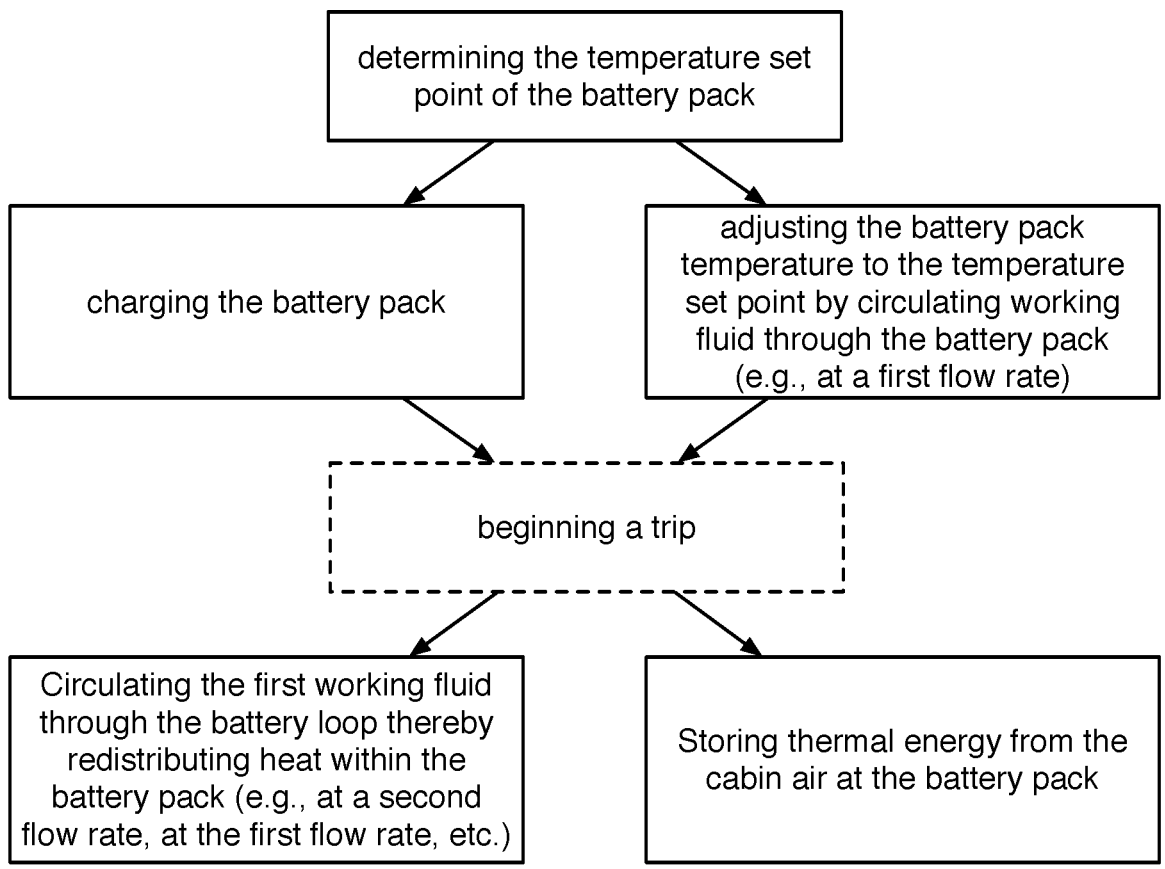
FIG. 20 depicts a flowchart diagram of an example of the method.

In one variant, achieving the cabin temperature setpoint can be prioritized over battery performance and/or lifetime during the cabin temperature setpoint determination and/or onboard thermal management subsystem operation. In a second variant, battery performance and/or lifetime can be prioritized over the cabin temperature setpoint. In a third variant, Block S300 can include storing thermal energy from the cabin air at the battery pack (an example is shown in FIG. 20) in a cabin cooling mode.

Block S300 can include circulating cabin air within the cabin via the air manifold (e.g., by controlling fans and/or valves of the air manifold) in any suitable manner. Circulating cabin air can include: recirculating cabin air (e.g., through interior vents and cabin air intakes), receiving external air (e.g., via inlet orifice), exhausting cabin air (e.g., via the outlet orifice).

Block S300 can include redistributing heat between the cabin air and the battery pack, which can include: controlling the on-board thermal management subsystem in the cabin cooling mode, controlling the on-board thermal management subsystem in the cabin heating mode, thermally decoupling the cabin air and the battery pack. The cabin air and the battery pack can be thermally decoupled by: terminating working fluid circulation through the cabin loop, ceasing pump operation within the cabin loop, engaging a valve (e.g., 4-way valve) isolating fluid on first half of working fluid loop (including battery heat exchanger) and second half (including cabin heat exchanger), and/or otherwise thermally decoupling the cabin air and the battery pack.

Block S300 can occur with any suitable timing. Block S300 can occur during operation (e.g., while vehicle is airborne, in a forward flight mode, in a hover flight mode), concurrently with charging the vehicle, while the vehicle is on the ground, while the vehicle is idle, and/or with any other suitable timing In some variations, the performance of the on-board thermal management subsystem (e.g., the precision and accuracy of the cabin temperature relative to the set temperature) can be dependent upon the ambient temperature. In a specific example of such a variation, the performance is dictated by the ambient temperature according to a trimodal methodology: in a first case, wherein the ambient temperature is between about −40° C. and about −10° C., the cabin temperature is permitted to deviate below the set temperature as long as it is greater than 0° C.; in a second case, wherein the ambient temperature is between about −10° C. and about 40° C., the cabin temperature is not permitted to substantially deviate from the set temperature (e.g., HVAC performance is preferably unaffected); and, in a third case, wherein the ambient temperature is between about 40° C. and about 50° C., the cabin temperature is permitted to deviate above the set temperature as long as it is less than 30° C. 4. In examples of the second case, Block S300 can include delivering up to about 3.5 kW of cooling power to the cabin and up to about 2.5 kW of heating power to the cabin, within the set temperature range of about −10° C. and about 40° C.

However, Block S300 can additionally or alternatively include managing the cabin temperature in any other suitable manner.

Although omitted for conciseness, the preferred embodiments include every combination and permutation of the various system components and/or method Blocks, which can be combined in any suitable permutation or combination and/or omitted in whole or in part from variations of the preferred embodiments.

As a person skilled in the art will recognize from the previous detailed description and from the figures and claims, modifications and changes can be made to the preferred embodiments of the invention without departing from the scope of this invention defined in the following claims.

What is claimed is:

1. A method, comprising:
while an electric aircraft is grounded, pre-conditioning the electric aircraft, wherein pre-conditioning the electric aircraft comprises rejecting heat from the electric aircraft at an off-board heat exchanger of a ground-infrastructure; and
while the electric aircraft is flying, cooling a cabin of the electric aircraft, wherein cooling the cabin of the electric aircraft comprises
at a first heat exchanger, transferring thermal energy from cabin air to a second working fluid,
at a second heat exchanger, transferring the thermal energy from the second working fluid to a first working fluid, the first working fluid in thermal communication with a battery pack, and
storing the thermal energy within a thermal mass of the battery pack.

2. The method of claim 1, wherein pre-conditioning the electric aircraft comprises replacing at least a portion of the first working fluid with working fluid from the ground-infrastructure.

3. The method of claim 2, wherein replacing at least the portion of the first working fluid with the working fluid from the ground-infrastructure comprises flowing at least the portion of the first working fluid through a hose coupling integrated with a charging connector for the electric aircraft.

4. The method of claim 1, wherein pre-conditioning the electric aircraft comprises flowing the first working fluid through the off-board heat exchanger of the ground-infrastructure.

5. The method of claim 4, wherein flowing the first working fluid through the off-board heat exchanger of the ground-infrastructure comprises flowing the first working fluid through a hose coupling integrated with a charging connector for the electric aircraft.

6. The method of claim 1, wherein pre-conditioning the electric aircraft comprises rejecting heat from the first working fluid to a refrigeration system of the ground-infrastructure thermally coupled to a fluid loop with the first working fluid.

7. The method of claim 1, wherein a temperature of the battery pack decreases during the pre-conditioning.

8. The method of claim 7, wherein a temperature of the battery pack decreases by no less than ten degrees Celsius during the pre-conditioning.

9. The method of claim 1, wherein pre-conditioning the electric aircraft comprises pre-conditioning the electric aircraft for no more than forty-five minutes.

10. The method of claim 1, wherein pre-conditioning the electric aircraft comprises pre-conditioning the electric aircraft for no more than twenty minutes.

11. The method of claim 1, further comprising charging the battery pack while pre-conditioning the electric aircraft.

12. The method of claim 11, wherein charging the battery pack comprises pre-charging the battery pack for no more than forty minutes.

13. The method of claim 1, further comprising circulating the first working fluid while pre-conditioning the electric aircraft.

14. The method of claim 1, further comprising circulating the first working fluid while the electric aircraft is flying in order to redistribute heat within the battery pack.

15. The method of claim 14, wherein less than fifty percent of heat within the battery pack is rejected from the battery pack while the electric aircraft is flying.

16. The method of claim 1, wherein a total thermal energy of a thermal system comprising the battery pack, the first working fluid, the second working fluid, and the cabin air increases monotonically while the electric aircraft is flying.

17. The method of claim 1, further comprising:
flowing external air into the cabin while the electric aircraft is flying; and
using a turbine driven by the external air flowing into the electric aircraft, regeneratively charging the battery pack.

18. The method of claim 17, further comprising equilibrating a pressure of the cabin air with an ambient pressure while the electric aircraft is flying.

19. The method of claim 1, further comprising ducting a portion of the cabin air across avionics equipment of the electric aircraft.

* * * * *